(12) United States Patent
Fujikawa et al.

(10) Patent No.: US 8,831,330 B2
(45) Date of Patent: Sep. 9, 2014

(54) PARAMETER DETERMINATION ASSISTING DEVICE AND PARAMETER DETERMINATION ASSISTING PROGRAM

(75) Inventors: Masahiro Fujikawa, Fukuchiyama (JP); Daisuke Mitani, Ayabe (JP); Masahiro Takayama, Kitakyushu (JP); Katsuhiro Shimoda, Otsu (JP); Yoshihiro Moritoki, Takatsuki (JP)

(73) Assignee: Omron Corporation, Kyoto (JP)

( * ) Notice: Subject to any disclaimer, the term of this patent is extended or adjusted under 35 U.S.C. 154(b) by 346 days.

(21) Appl. No.: 12/689,821

(22) Filed: Jan. 19, 2010

(65) Prior Publication Data

US 2010/0226561 A1 Sep. 9, 2010

(30) Foreign Application Priority Data

Jan. 21, 2009 (JP) ................................. 2009-011251
Sep. 30, 2009 (JP) ................................. 2009-227389

(51) Int. Cl.
*G06K 9/00* (2006.01)
*G06T 7/00* (2006.01)

(52) U.S. Cl.
CPC ............. *G06T 7/0002* (2013.01); *G06T 7/0004* (2013.01); *G06T 2207/30164* (2013.01)
USPC ........... 382/141; 382/294; 382/112; 348/116; 348/87; 414/806

(58) Field of Classification Search
USPC ................................. 382/141, 112, 142, 294; 356/237.2–237.6
See application file for complete search history.

(56) References Cited

U.S. PATENT DOCUMENTS

| 4,998,209 | A | | 3/1991 | Vuichard et al. | |
|---|---|---|---|---|---|
| 5,956,419 | A | * | 9/1999 | Kopec et al. | 382/159 |
| 7,373,017 | B2 | * | 5/2008 | Edwards et al. | 382/284 |
| 7,570,797 | B1 | * | 8/2009 | Wang et al. | 382/145 |

(Continued)

FOREIGN PATENT DOCUMENTS

| EP | 0 353 409 B1 | 2/1990 |
|---|---|---|
| JP | 08-101139 A | 4/1996 |

(Continued)

OTHER PUBLICATIONS

Caleb-Solly, P., et al.; Adaptive Surface Inspection Via interactive Evolution; Image and Vision Computing 25 (2007); pp. 1058-1072; Elsevier B.V.

(Continued)

*Primary Examiner* — Tarifur Chowdhury
*Assistant Examiner* — Isiaka Akanbi
(74) *Attorney, Agent, or Firm* — Foley & Lardner LLP

(57) ABSTRACT

This invention provides a parameter determination assisting device and a parameter determination assisting program enabling a more rapid and easy determination of a parameter to be set in a processing device, which obtains a processing result by performing a process using a set of parameters defined in advance on image data obtained by imaging a measuring target object. A user can easily select an optimum parameter set when a determination result and a statistical output are displayed in a list for each of a plurality of trial parameter candidates. For instance, while trial numbers "2", "4", and "5", in which the number of false detections is zero, can perform a stable process, the parameter set of the trial number "2" is comprehensively assumed as optimum since the trial number "2" can perform the process in the shortest processing time length.

18 Claims, 44 Drawing Sheets

(56) References Cited

U.S. PATENT DOCUMENTS

| | | |
|---|---|---|
| 8,081,158 B2 * | 12/2011 | Harris .................... 345/156 |
| 2008/0089609 A1 * | 4/2008 | Perlmutter et al. ........... 382/284 |
| 2011/0317906 A1 * | 12/2011 | Wallack et al. ............. 382/141 |

FOREIGN PATENT DOCUMENTS

| | | |
|---|---|---|
| JP | 09-120442 | 5/1997 |
| JP | 2002-008013 A | 1/2002 |
| JP | 2003-109003 A | 4/2003 |
| JP | 2006-085616 A | 3/2006 |
| JP | 2006-258535 A | 9/2006 |
| JP | 2007-303992 A | 11/2007 |
| JP | 2008-089574 A | 4/2008 |
| WO | WO 2006/129711 A1 | 12/2006 |
| WO | WO2007/126947 A2 | 11/2007 |

OTHER PUBLICATIONS

Japan Patent Office action on application 2009-227389 mailed Dec. 18, 2012; pp. 1-2.

* cited by examiner

FLUCTUATION SETTING

TRIAL NUMBER 2  NUMBER OF ADDITIONALLY SCHEDULED TRIALS 180

427 — DISPLAY SELECTION: ● STANDARD  ○ DETAILED        429 □ DISPLAY ONLY ADJUSTMENT TARGET        [ADD INDIVIDUAL TRIAL]   [ADD TRIAL]

| CLASSIFICATION | ITEM | ADJUST-MENT TARGET | CURRENT VALUE | FLUCTUATION START VALUE | FLUCTUATION END VALUE | STEP | FLUCTUATION MINIMUM VALUE | FLUCTUATION MAXIMUM VALUE |
|---|---|---|---|---|---|---|---|---|
| MODEL REGISTRATION | STABILITY (CORRELATION) | ☑ | 12 | 12 | 14 | 2 | 2 | 15 |
| | ACCURACY | ☑ | 2 | 2 | 2 | 1 | 1 | 3 |
| | STABILITY (SHAPE) | ☑ | 2 | 1 | 5 | 1 | 1 | 5 |
| MEASUREMENT PARAMETER | CANDIDATE POINT LEVEL | ☑ | 70 | 50 | 100 | 10 | 0 | 100 |
| | UPPER LIMIT OF MEASUREMENT COORDINATE X | □ | 99999.9999 | 99949.9999 | 99999.9999 | 10 | -99999.9999 | 99999.9999 |
| | LOWER LIMIT OF MEASUREMENT COORDINATE X | □ | -99999.9999 | -99999.9999 | -99949.9999 | 10 | -99999.9999 | 99999.9999 |
| | UPPER LIMIT OF MEASUREMENT COORDINATE Y | □ | 99999.9999 | 99949.9999 | 99999.9999 | 10 | -99999.9999 | 99999.9999 |
| | LOWER LIMIT OF MEASUREMENT COORDINATE Y | □ | -99999.9999 | -99999.9999 | -99949.9999 | 10 | -99999.9999 | 99999.9999 |
| | UPPER LIMIT OF MEASUREMENT ANGLE | □ | 180 | 160 | 180 | 10 | -180 | 180 |
| | LOWER LIMIT OF MEASUREMENT ANGLE | □ | -180 | -180 | -160 | 10 | -180 | 180 |
| | UPPER LIMIT OF CORRELATION VALUE | □ | 100 | 80 | 100 | 10 | 0 | 100 |
| | LOWER LIMIT OF CORRELATION VALUE | □ | 60 | 40 | 80 | 10 | 0 | 100 |

EXPLANATION OF PARAMETER: DIFFER ACCORDING TO TYPE AND NUMBER OF PIXELS OF MEASUREMENT IMAGE

[RESET]   [CLOSE]

FLUCTUATION SETTING

TRIAL NUMBER 2    NUMBER OF ADDITIONALLY SCHEDULED TRIALS 180

DISPLAY SELECTION: ○ STANDARD  ● DETAILED           429

☐ DISPLAY ONLY ADJUSTMENT TARGET        [ADD INDIVIDUAL TRIAL]   [ADD TRIAL]

| CLASSIFICATION | ITEM | ADJUST-MENT TARGET | CURRENT VALUE | FLUCTUATION START VALUE | FLUCTUATION END VALUE | STEP | FLUCTUATION MINIMUM VALUE | FLUCTUATION MAXIMUM VALUE |
|---|---|---|---|---|---|---|---|---|
| MODEL REGISTRATION | UPPER LIMIT OF ROTATIONAL ANGLE | ☐ | 180 | -180 | 180 | 30 | -180 | 180 |
| | LOWER LIMIT OF ROTATIONAL ANGLE | ☐ | -180 | -180 | 180 | 30 | -180 | 180 |
| | INTERVAL ANGLE | ☐ | 5 | 1 | 30 | 5 | 1 | 30 |
| | SMART MODE | ☐ | 1 | 0 | 1 | 1 | 0 | 1 |
| | STABILITY (CORRELATION) | ☑ | 12 | 4 | 14 | 2 | -7 | 15 |
| | ACCURACY | ☑ | 2 | 2 | 2 | 1 | 0 | 3 |
| | STABILITY (SHAPE) | ☐ | 2 | 1 | 5 | 1 | 0 | 5 |
| MEASUREMENT PARAMETER | SUB-PIXEL | ☑ | 0 | 0 | 1 | 1 | 0 | 1 |
| | CANDIDATE POINT LEVEL | ☐ | 70 | 50 | 100 | 10 | 0 | 100 |
| | DETAILED SEARCH CANDIDATE POINT LEVEL | ☐ | 75 | 0 | 100 | 10 | 0 | 100 |
| | NUMBER OF DETECTION DETERMINATION UPPER LIMIT | ☐ | 32 | 26 | 32 | 2 | 0 | 32 |
| | NUMBER OF DETECTION DETERMINATION LOWER LIMIT | ☐ | 0 | 0 | 6 | 2 | 0 | 32 |
| | UPPER LIMIT OF MEASUREMENT COORDINATE X | ☐ | 99999.9999 | 99949.9999 | 99999.9999 | 10 | -99999.9999 | 99999.9999 |
| | LOWER LIMIT OF MEASUREMENT COORDINATE X | ☐ | -99999.9999 | -99999.9999 | -99949.9999 | 10 | -99999.9999 | 99999.9999 |
| | UPPER LIMIT OF MEASUREMENT COORDINATE Y | ☐ | 99999.9999 | 99949.9999 | 99999.9999 | 10 | -99999.9999 | 99999.9999 |
| | LOWER LIMIT OF MEASUREMENT COORDINATE Y | ☐ | -99999.9999 | -99999.9999 | -99949.9999 | 10 | -99999.9999 | 99999.9999 |
| | UPPER LIMIT OF MEASUREMENT ANGLE | ☐ | 180 | 160 | 180 | 10 | -180 | 180 |
| | LOWER LIMIT OF MEASUREMENT ANGLE | ☐ | -180 | -180 | -160 | 10 | -180 | 180 |
| | UPPER LIMIT OF CORRELATION VALUE | ☐ | 100 | 80 | 100 | 10 | 0 | 100 |

[RESET]            [CLOSE]

EXPLANATION OF PARAMETER: DIFFER
ACCORDING TO TYPE AND NUMBER OF PIXELS
OF MEASUREMENT IMAGE

FLUCTUATION SETTING

TRIAL NUMBER  2    NUMBER OF ADDITIONALLY SCHEDULED TRIALS  180

DISPLAY SELECTION  ● STANDARD  ○ DETAILED                    429  ☑ DISPLAY ONLY ADJUSTMENT TARGET    [ADD INDIVIDUAL TRIAL]  [ADD TRIAL]

| CLASSIFICATION | ITEM | ADJUST-MENT TARGET | CURRENT VALUE | FLUCTUATION START VALUE | FLUCTUATION END VALUE | STEP | FLUCTUATION MINIMUM VALUE | FLUCTUATION MAXIMUM VALUE |
|---|---|---|---|---|---|---|---|---|
| ▲ MODEL REGISTRATION | STABILITY (CORRELATION) | ☒ | | | | | | |
| | ACCURACY | ☒ | 12 | 4 | 14 | 2 | | 15 |
| | STABILITY (SHAPE) | ☒ | 2 | 2 | 2 | 1 | 1 | 3 |
| MEASUREMENT PARAMETER | CANDIDATE POINT LEVEL | ☒ | 2 | 2 | 5 | 1 | 1 | 5 |
| | | | 70 | 50 | 100 | 10 | 10 | 100 |

[RESET]                                                                     [CLOSE]

EXPLANATION OF PARAMETER: DIFFER
ACCORDING TO TYPE AND NUMBER OF PIXELS
OF MEASUREMENT IMAGE

| IMAGE NUMBER | IMAGE FILE NAME | 1011 |
|---|---|---|
| 1 | c:¥data¥111¥OK¥data01.jpg | |
| 2 | c:¥data¥111¥OK¥data02.jpg | |
| 3 | c:¥data¥111¥OK¥data03.jpg | |
| ⟩ | ⟩ | |
| N | c:¥data¥111¥NG¥data99.jpg | |

FIG. 25B

| IMAGE NUMBER | EXPECTED VALUE | 1012 |
|---|---|---|
| 1 | OK | |
| 2 | OK | |
| 3 | OK | |
| ⟩ | ⟩ | |
| N | NG | |

FIG. 25C  1035

| TRIAL [0] | | |
|---|---|---|
| IMAGE NUMBER | CHARACTERISTIC AMOUNT | DETERMINATION RESULT |
| 1 | 97.6 | OK |
| 2 | 87.8 | OK |
| 3 | 92.3 | OK |
| ⟩ | ⟩ | ⟩ |
| N | 60.4 | NG |

FIG. 25D  1042

| TRIAL [0] | |
|---|---|
| IMAGE NUMBER | EVALUATION RESULT |
| 1 | OK-OK |
| 2 | OK-OK |
| 3 | OK-OK |
| ⟩ | ⟩ |
| N | NG-NG |

PLEASE SELECT ITEM TO PRIORITIZE IN
                   DETERMINING PARAMETER

[  1  ▼]  NUMBER OF FALSE DETECTIONS: FEW

[     ▼]  NUMBER OF NON-DEFECTIVE IMAGE
                      FALSE DETECTIONS: FEW

[     ▼]  NUMBER OF DEFECTIVE IMAGE FALSE
                      DETECTIONS: FEW

[  2  ▼]  MAXIMUM MEASUREMENT TIME LENGTH:
                      SHORT

[     ▼]  NON-DEFECTIVE IMAGE CORRELATION
                      VALUE AVERAGE: HIGH

[     ▼]  DEFECTIVE IMAGE CORRELATION VALUE
                      AVERAGE: LOW
```

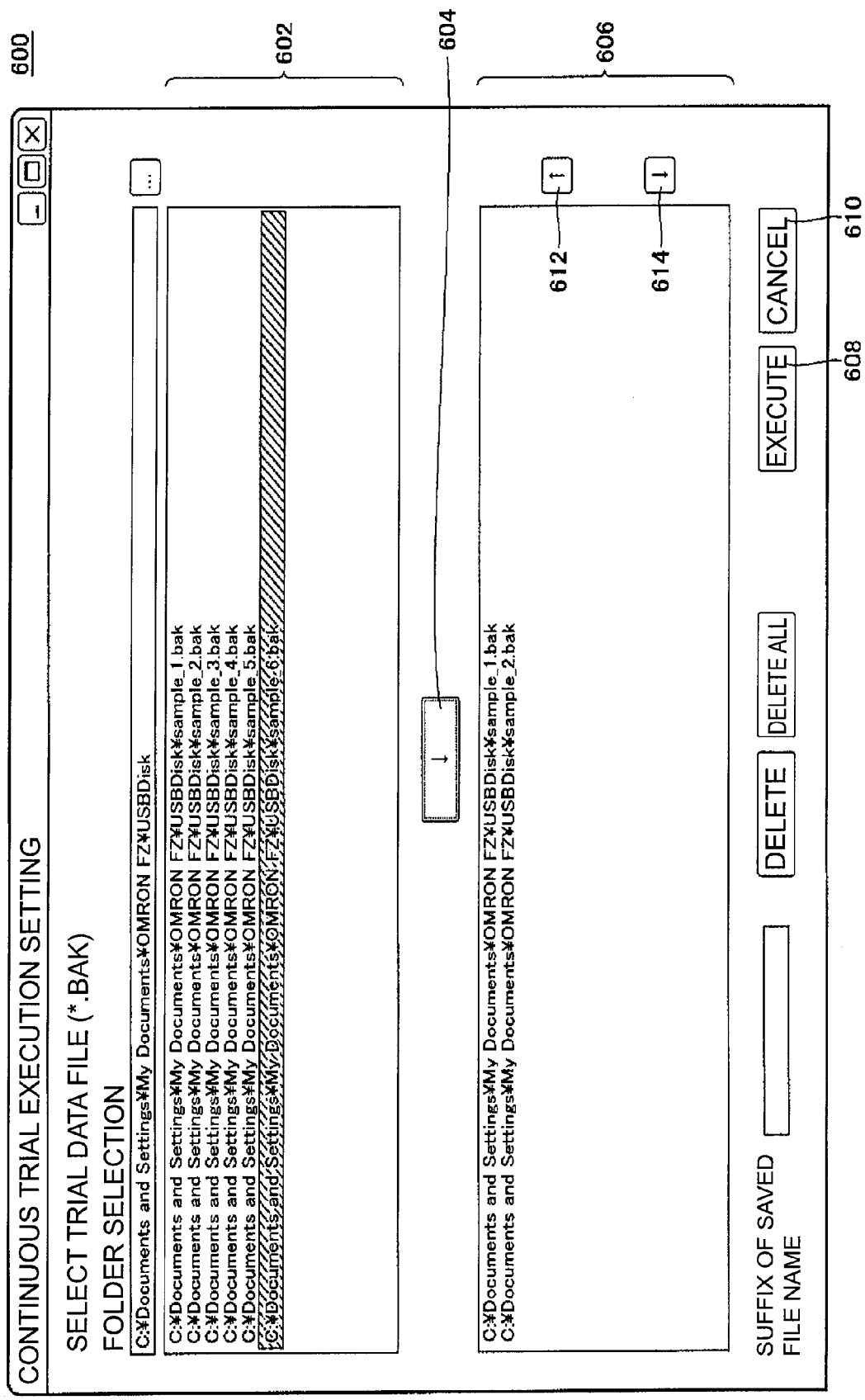

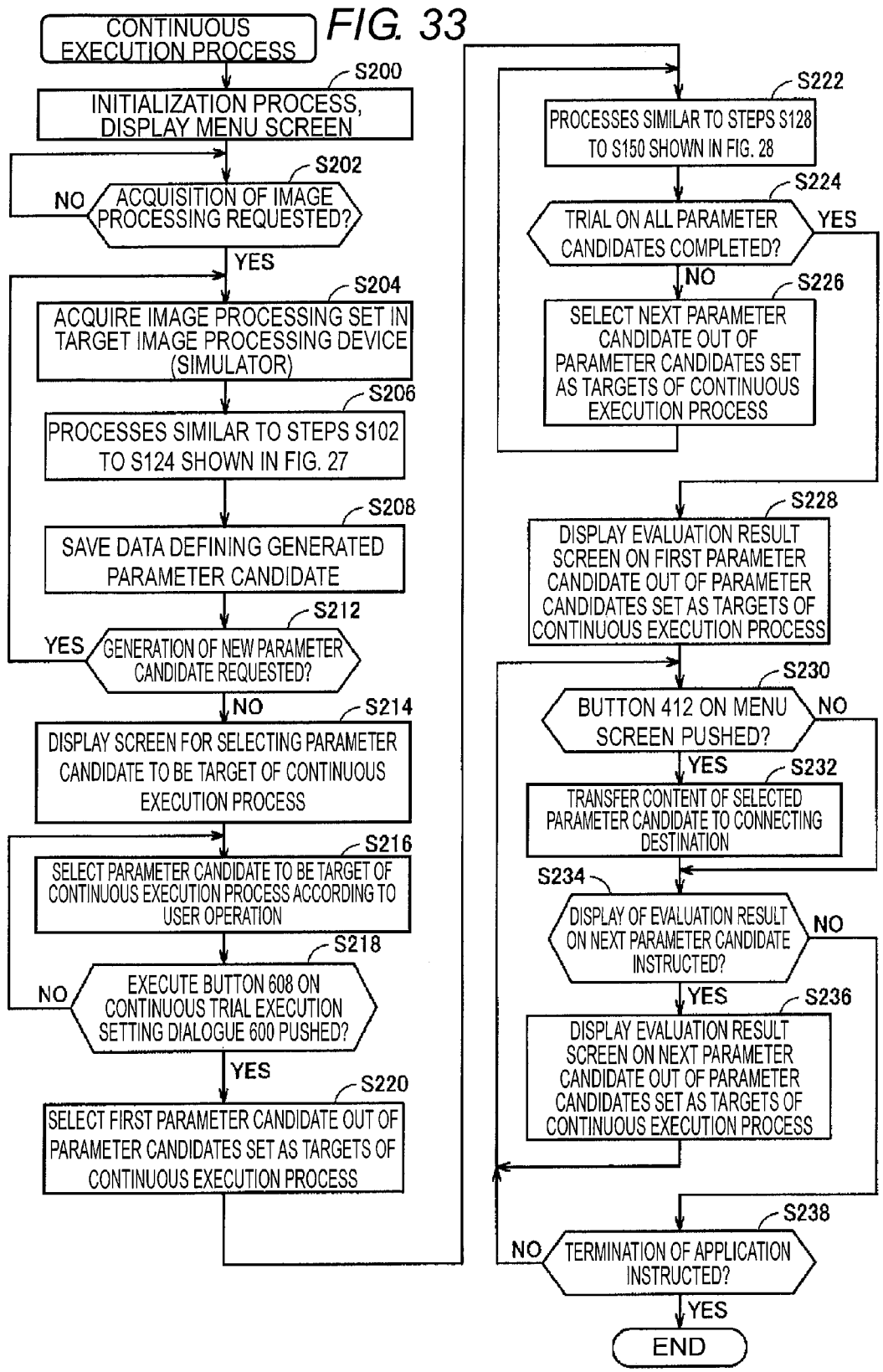

# PARAMETER DETERMINATION ASSISTING DEVICE AND PARAMETER DETERMINATION ASSISTING PROGRAM

This nonprovisional application claims priority under 35 U.S.C. §119(a) on Patent Applications No. 2009-011251 filed in Japan on Jan. 21, 2009, and No. 2009-227389 filed in Japan on Sep. 30, 2009, the entire contents of which are hereby incorporated by reference.

BACKGROUND OF THE INVENTION

1. Technical Field

The present invention relates to an image processing device for obtaining a processing result through a process using a set of parameters defined in advance on image data obtained by imaging a measuring target object.

2. Related Art

In the field of FA (Factory Automation) and the like, signal processing and the like are performed on various types of data acquired with use of various types of sensors from a measuring target object such as a half-completed product in the manufacturing process or a product before shipment, and tests, measurements, discrimination and the like on the measuring target object are often carried out based on the signal processed data. Typically, there is widely used an image processing device for acquiring image data by imaging the measuring target object with an imaging device or the like, and optically testing defects in the measuring target object, optically measuring the size of a specific portion of the measuring target object, and detecting a character string appearing in the measuring target object based on the acquired image data (see e.g., Japanese Unexamined Patent Publication No. 08-101139).

Japanese Unexamined Patent Publication No. 2002-008013, for example, discloses an outer appearance test program used in an outer appearance testing device for determining defects of the outer appearance of an article using image data. More specifically, Japanese Unexamined Patent Publication No. 2002-008013 has an object to perform an accurate and highly reliable test of an outer appearance.

Japanese Unexamined Patent Publication No. 2006-085616 discloses an image processing algorithm evaluation method using an evaluation value reflecting a separation capacity between an extraction target site and a non-extraction target side in an image. More specifically, disclosed is a technique of performing a performance evaluation of the image processing algorithm for extracting only an extraction target portion by quantifying the degree of separation on a characteristic amount between the extraction target portion and the non-extraction target portion.

When installing such an image processing device on a production line or the like, optimization of a set of parameters related to image processing, test processing, measurement processing, discrimination processing, and the like is a very troublesome task. In other words, in the image processing device described above, the result on the measuring target object appearing in the image data is judged in a comprehensive manner after performing a similar process on one piece of input image data a plurality of times. Furthermore, the number of parameters related to image processing in the image processing device is relatively large, and the result of image processing sometimes greatly fluctuates only by one parameter being changed. Moreover, the parameters need to be optimized so that a stable result not to cause false determination is obtained by actually performing tests, measurements, discriminations, and the like on the measuring target object.

An actual setting procedure for a set of parameters includes actually performing tests, measurements, discriminations and the like on the measuring target object after setting the set of parameters to a certain set of values, and judging whether or not the set of parameters having been set is appropriate. If judged as inappropriate, the set of parameters is changed to a different set of values, and then tests, measurements, discriminations and the like on the measuring target object are again performed. The setting of the set of parameters, and the evaluation of the processing result based on the actually acquired image data are iteratively repeated until an optimum set of parameters is obtained.

Since such iterative procedures need to be performed, the parameter setting requires a great amount of manpower and many days. Not limited to image data as described above, the parameter setting on various other types of data is also troublesome. The optimum set of parameters is difficult to rapidly obtain by a non-skilled person with sufficient experience.

In the methods described in Japanese Unexamined Patent Publication No. 2002-008013 and Japanese Unexamined Patent Publication No. 2006-085616, there is disclosed the technique of automatically determining a set value related to image processing including necessary parameters according to an evaluation logic defined in advance, but the predefined evaluation logic itself may not necessarily be optimum for all measuring target objects. In other words, since the techniques disclosed in Japanese Unexamined Patent Publication No. 2002-008013 and Japanese Unexamined Patent Publication No. 2006-085616 automatically determine numerous parameters according to an evaluation criteria defined in advance, such techniques may be applied to an image processing device used in a specific purpose, but cannot be applied to a universal (multi-functional) image processing device.

SUMMARY

The present invention has been devised to solve the problems described above, and an object thereof is to provide a parameter determination assisting device and a parameter determination assisting program enabling a more rapid and easy determination of a set of parameters to be set in an image processing device, which obtains a processing result through a process using a set of parameters defined in advance on image data obtained by imaging a measuring target object.

In accordance with an aspect of the present invention, there is provided a parameter determination assisting device for an image processing device which obtains a processing result by performing a process using a set of parameters defined in advance on image data obtained by imaging a measuring target object. The parameter determination assisting device includes: an input unit for accepting the image data and an expected result corresponding to the image data; a candidate generation unit for generating a plurality of parameter candidates in which at least one parameter value contained in the set of parameters is differed from each other; an acquiring unit for acquiring a plurality of processing results respectively using the plurality of parameter candidates on the image data; an evaluation unit for generating an evaluation result for each of the plurality of processing results by comparing each of the plurality of processing results with the corresponding expected result; and an output unit for outputting the evaluation result for each of the plurality of parameter candidates.

Preferably, the evaluation unit includes: a portion for accepting a condition to be satisfied by the evaluation result; and a portion for determining a processing result most adapted to the condition out of the plurality of processing results respectively using the plurality of parameter candidates, and the output unit outputs the determined processing result.

The candidate generation unit preferably includes: a portion for accepting a specification of at least one of a fluctuation step and a fluctuation range of the parameter value; and a portion for generating the plurality of parameter candidates according to the specified fluctuation step and/or the fluctuation range of the parameter value.

More preferably, the candidate generation unit accepts a specification only on a specific parameter defined in advance out of the parameter values contained in the set of parameters.

Alternatively, more preferably, the image processing device provides a user interface for accepting a setting of the set of parameters on the process performed on the image data, the parameters contained in the set of parameters being displayed in a visually sectionalized manner on the user interface, and the candidate generation unit displays each of the parameters contained in the set of parameters so as to correspond to a visual section displaying the parameter in the user interface.

Preferably, the input unit accepts the plurality of image data respectively acquired from a plurality of measuring target objects and the expected results respectively corresponding to the plurality of image data, and the acquiring unit acquires a processing result group including the evaluation results on the plurality of image data for the plurality of parameter candidates, respectively.

More preferably, the expected results each include an expected class indicating whether the corresponding measuring target object is a non-defective article or a defective article; the acquiring unit outputs a value indicating either the non-defective article or the defective article as the processing result, the evaluation unit includes a portion for calculating a degree of coincidence with the corresponding expected class out of the plurality of processing results contained in each of the processing result group, and the output unit outputs the degree of coincidence.

The degree of coincidence is further preferably the number of processing results that do not match the corresponding expected class out of the plurality of processing results contained in each of the processing result group.

When the number of processing results that do not match the corresponding expected class exceeds a tolerable upper limit defined in advance during generation of the processing result group for one of the parameter candidates, the evaluation unit more preferably cancels generation of the processing result on the remaining image data for the parameter candidate.

Alternatively, the evaluation unit more preferably calculates a statistic value on the processing result contained in the corresponding processing result group for each of the plurality of parameter candidates.

Further alternatively, the output unit more preferably outputs the processing result contained in the processing result group for each of the corresponding image data.

Alternatively more preferably, the acquiring unit includes a portion for measuring a processing time length required to generate the processing result; and the output unit outputs the measured processing time length together with the evaluation result.

When the processing time length exceeding a permissible time length provided in advance is measured during the process on the plurality of image data for one of the parameter candidates, the acquiring unit more preferably cancels acquisition of the processing result on the remaining image data for the parameter candidate.

Alternatively, more preferably, the acquiring unit includes: a portion for calculating a characteristic amount on the image data by performing the process on the image data; and a portion for generating the processing result by comparing the characteristic amount with a threshold value provided in advance, and the output unit outputs a distribution state of the characteristic amounts corresponding to the processing results contained in the processing result group.

More preferably, the processing result contains information indicating a portion that matches an image pattern defined in advance in the image data, and the output unit displays a position extracted as the portion that matches the image pattern on a two-dimensional coordinate corresponding to the image data.

Alternatively, the acquiring unit more preferably repeats the process of acquiring the processing result on each of the plurality of image data for each of the plurality of parameter candidates by the number of the plurality of parameter candidates.

Alternatively, the acquiring unit more preferably repeats the process of acquiring the processing result on each of the plurality of parameter candidates for each of the plurality of image data by the number of the plurality of image data.

Preferably, the candidate generation unit includes a portion for generating a first parameter candidate group including a plurality of parameter candidates, and a second parameter candidate group having a fluctuation step smaller than a fluctuation step between the parameter candidates contained in the first parameter candidate group, and the acquiring unit determines a parameter value to be a fluctuation target out of the acquired processing results after acquiring the processing result on the parameter candidate contained in the first parameter candidate group, and acquires the processing result on the parameter candidate contained in the second parameter candidate group corresponding to the determined parameter value.

Preferably, the input unit accepts image data of a first group obtained by imaging a first measuring target object and an expected result of a first group corresponding to the image data of the first group, and image data of a second group obtained by imaging a second measuring target object and an expected result of a second group corresponding to the image data of the second group, the candidate generation unit generates a plurality of parameter candidates of a first group in which at least one parameter value contained in a set of first parameters related to a process performed on the image data of the first group is differed from each other, and generates a plurality of parameter candidates of a second group in which at least one parameter value contained in a set of second parameters related to a process performed on the image data of the second group is differed from each other, the acquiring unit and the evaluation unit acquire a plurality of processing results of a first group using each of the plurality of parameter candidates of the first group on the image data of the first group and generates a first evaluation result on the plurality of processing results of the first group by comparing each of the plurality of processing results of the first group with the corresponding expected result out of the expected results of the first group, and then acquire a plurality of processing results of a second group using the plurality of parameter candidates of the second group on the image data of the second group and generates a second evaluation result on the plurality of processing results of the second group by comparing each of the plurality of processing results of the second group with the corresponding expected result out of the expected results of the second group, and the output unit outputs at least one of the first evaluation result and the second evaluation result after the processes by the acquiring unit and the evaluation unit are completed.

In accordance with another aspect of the present invention, there is provided a program determination assisting program for an image processing device which obtains a processing result by performing a process using a set of parameters defined in advance on image data obtained by imaging a measuring target object. The parameter determination assisting program causes a computer to function as: an input unit for accepting the image data and an expected result corresponding to the image data; a candidate generation unit for generating a plurality of parameter candidates in which at least one parameter value contained in the set of parameters is differed from each other; an acquiring unit for acquiring a plurality of processing results respectively using the plurality of parameter candidates on the image data; an evaluation unit for generating an evaluation result for each of the plurality of generated processing results by comparing each of the plurality of generated processing results with the expected result; and an output unit for outputting the evaluation result for each of the plurality of parameter candidates.

With the parameter determination assisting device according to one aspect of the present invention, it is possible to determine more rapidly and easily a set of parameters to be set in the image processing device, which obtains a processing result by performing a process using a set of parameters defined in advance on image data obtained by imaging a measuring target object.

BRIEF DESCRIPTION OF THE DRAWINGS

FIG. 12 is a view showing one example of a user interface in the parameter determination assisting device according to the embodiment of the present invention;

FIGS. 15A to 15C are views for describing change in a display mode of the user interface shown in FIG. 13;

FIGS. 25A to 25D are diagrams showing a structure of a file generated in the parameter determination assisting device shown in FIG. 24;

FIG. 26 is a view showing one example of an interface for condition input in the parameter determination assisting device according to the embodiment of the present invention;

FIG. 32 is a diagram showing one example of a user interface at the time of the continuous execution process in the parameter determination assisting device according to the embodiment of the present invention; and FIG. 33 is a flowchart at the time of the continuous execution process in the parameter determination assisting device according to the embodiment of the present invention.

DETAILED DESCRIPTION OF THE PREFERRED EMBODIMENTS

Figure 1:
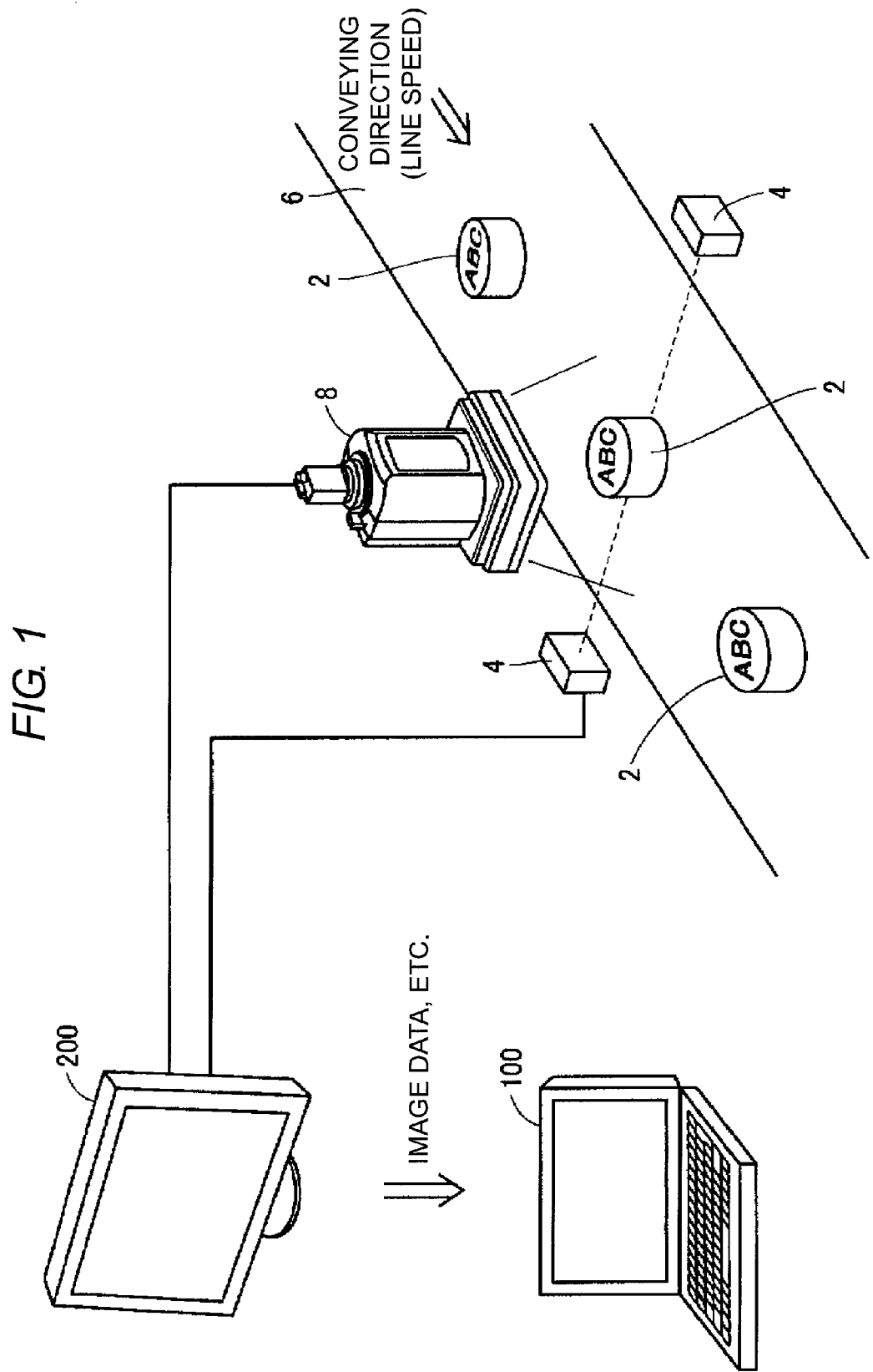
FIG. 1 is a diagram showing an entire system according to an embodiment of the present invention.

Hereinafter, preferred embodiments of the present invention will be described with reference to the drawings. The same reference numerals will be given for the same or corresponding portions in the figures, and the description thereof will not be repeated.

<A. Outline>

In the embodiment of the present invention, an image processing device for obtaining a processing result by performing a process using a set of parameters defined in advance on target data, which is acquired from the measuring target object and which reflects the physical quantity of the measuring target object, is illustrated. As a typical example of such a processing device, an image processing device for FA for performing image processing on the image data obtained by imaging the measuring target object is illustrated.

In other words, the image processing device described in the present embodiment is a so-called visual sensor, and typically accepts the image data obtained by imaging the measuring target object (hereinafter also referred to as "work") flowing through the production line and the like, and optically executes various types of processes such as a defect test, size measurement, character string discrimination, and pattern matching on the work based on the image data. In the image processing device according to the present embodiment, the image data optically acquired from the work and reflecting the physical state of the surface of the work is used. In such a image processing device, the "process using a set of parameters defined in advance" in the present invention includes all or some of a series of processes such as pre-processing on the input image data, measurement processing of a characteristic amount in the image data of after the pre-processing, and determination processing on the measured characteristic amount.

In addition to a case of using the image data obtained by imaging the work as target data, a physical quantity of the measuring target object (work) may be acquired, and the acquired physical quantity itself or the temporal change of the physical quantity, a one-dimensional array or multi-dimensional array corresponding to the physical quantity, as well as the temporal change in such an array and the like may be used as the target of the parameter determination assisting device according to the present invention. More specifically, data in which a physical size of the work and the like are acquired by a displacement sensor, data indicating the temporal change of an ON/OFF signal detected by each element of a sensor group in which a plurality of light projecting elements and light receiving elements are linearly arranged, data indicating the distribution of a temperature signal detected by a plurality of temperature sensors arranged in an array form, and the like, may be applied to the processing device for performing test, measurement, and discrimination on the work, and the like after being processed using a statistical method and the like.

The parameter determination assisting device according to the embodiment of the present invention accepts the image data input to the image processing device, and an expected result corresponding to the image data. The determination on the optimum set of parameters related to image processing in the image processing device is assisted by the processing to be hereinafter described.

Here, the "expected result" refers to the content of the processing result to be generated when the corresponding image data is input to the image processing device (correspond to image processing device according to the present invention). The "expected result" typically includes "expected value" and "expected class".

Here, the "expected value" includes an original coordinate to be detected, that is, position information of a characteristic point of (or assumed to be of) the work appearing in the corresponding image data in pattern matching and the like. In another example, the "expected value" includes a width of the work to be detected, that is, a size of the width at a specific position of (or assumed to be of) the work appearing in the corresponding image data in measuring the size and the like. In another further example, the "expected value" includes an original character string to be discriminated, that is, values of the characters configuring the character string printed etc. on the work appearing in the corresponding image data in discriminating the character string appearing on the work. In another further example, the "expected value" includes an original character string to be discriminated, that is, values of the characters configuring the character string printed etc. on the work appearing in the corresponding image data in discriminating the character string appearing on the work. In another further example, the "expected value" includes actual number of pins of the work in testing the number of pins of an IC (Integrated Circuit).

The "expected class" includes presence of defect to be detected, that is, attribute indicating whether the work appearing in the corresponding image data is "non-defective article" or "defective article" in testing defects on the work. In another example, the "expected class" includes an attribute indicating which rank it corresponds (e.g., rank A, B, C, . . . ) in discriminating the class on the work.

Since a plurality of image processing is often executed in parallel on one piece of image data, the "expected result" ("expected value" and/or "expected class") may not necessarily include only the value of a specific type (e.g., "non-defective article" or "defective article" etc.). In other words, considering a case in which each image processing is independently executed on different regions of one piece of image data, the result of the first image processing may be "non-defective article" but the result of the second image processing may be "defective article".

When accepting such an "expected result", the parameter determination assisting device determines parameter candidates to be used in various types of image processing. The parameter determination assisting device then evaluates the result obtained by performing image processing on the image data according to the set of parameters for each parameter candidate based on the corresponding "expected result". In other words, the parameter candidates are evaluated each other such that the parameter candidate, in which the result obtained when image processing is performed on each image data matches the "expected result" corresponding to the corresponding image data as much as possible, is selected and determined. The parameter determination assisting device outputs an evaluation result for each of these parameter candidates.

In the present invention, "output" means providing the content to the user or the device that actually determines the set of parameters, and typically includes representing the content on the display device such as a display, representing the content on a paper medium by a printer device and the like, transmitting data representing the content to an external device, and storing data representing the content in a storage device and the like.

According to the above-described configuration, an appropriate value can be rapidly and easily determined even if the parameter has a wide range of values.

In the following description, the concept of including the "expected value" and the "expected class" is collectively described as the "expected result", for the sake of simplifying the description, but description is sometimes made using the term "expected value" or the "expected class" in a more specific description.

<B. Overall Device Configuration>

FIG. 1 is a schematic view showing an entire system according to an embodiment of the present invention.

With reference to FIG. 1, the system according to the present embodiment include a parameter determination assisting device (hereinafter also simply referred to as "assisting device") 100 and an image processing device 200.

The image processing device 200 is electrically connected to an imaging unit 8 and a photoelectric sensor 4. The imaging unit 8 generates image data, in which a work 2 is shown, by imaging the work 2 that is conveyed on a conveyance line 6 such as a belt conveyor. The image processing device 200 stores the image data acquired by the imaging unit 8 and performs image processing on each image data according to a set of parameters set in advance, and outputs the processing result (e.g., judgment on non-defective article or defective article).

The imaging timing of the work 2 by the imaging unit 8 is detected by the photoelectric sensor 4 (light receiving unit and light projecting unit) arranged on both sides of the conveyance line 6. In other words, the photoelectric sensor 4 includes a light receiving unit and a light projecting unit arranged on the same optical axis, where a trigger signal indicating the imaging timing is output when the light receiving unit detects that the light radiated from the light projecting unit is shielded by the work 2. The imaging unit 8 includes an imaging element such as a CCD (Coupled Charged Device) and a CIS(Complementary-metal-oxide-semiconductor Image Sensor) sensor, in addition to an optical system such as a lens. The image data generated by the imaging unit 8 may be a monochrome image or may be a color image.

The assisting device 100 receives the image data stored in the image processing device 200, and executes a process for determining the optimum set of parameters. The method of exchanging image data between the assisting device 100 and the image processing device 200 includes a method using a communication means such as an USB (Universal Serial Bus) and an Ethernet (registered trademark), and a method using a removable storage medium such as an SD (Secured Digital) card.

As hereinafter described, all or some of the functions of the assisting device 100 may be incorporated in the image processing device 200, but the process of searching for the optimum set of parameters can be executed on the desk in an office distant from the work site by providing the assisting device 100 and the image processing device 200 as separate bodies.

<C. Installation Procedure>

First, a work flow upon operating the visual sensor applied with the assisting device 100 according to the present embodiment on the production line will be described.

Figure 2:
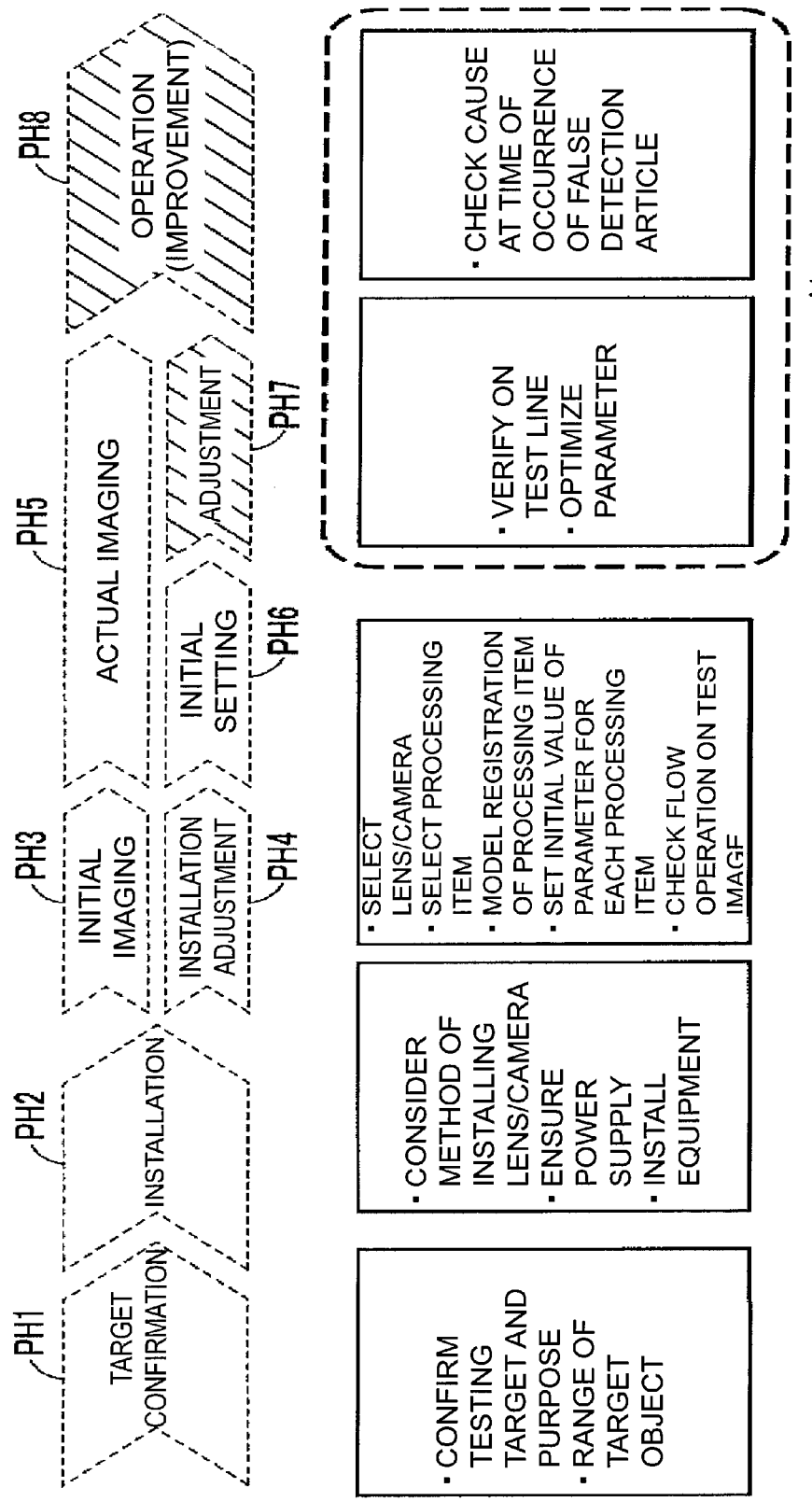
FIG. 2 is a diagram showing one example of a work flow upon operating a visual sensor on a production line.

FIG. 2 is a diagram showing one example of a work flow upon operating the visual sensor on the production line. As shown in FIG. 2, the procedure until installing the visual sensor on the production line includes a target confirming phase PH1 and an installing phase PH2. The procedure of after the visual sensor is installed on the production line includes an initial imaging phase PH3, an installation adjustment phase PH4, an actual imaging phase PH5, an initial setting phase PH6, adjustment phase PH7, and an operation (improvement) phase PH8. The initial imaging phase PH3 and the installation adjustment phase PH4 proceed in parallel, and the actual imaging phase PH5, the initial setting phase PH6, and the adjustment phase PH7 also proceed in parallel.

In the target confirming phase PH1, the operator determines what kind of work to test, and which test items to perform o the work. The work also determines which range of the entire work is to be tested.

In the following installing phase PH2, the operator considers the method of installing the lens and the camera according to the installing environment, and installs the necessary equipment after ensuring the power supply for driving the imaging unit, and the like.

In the initial imaging phase PH3, the installation adjustment phase PH4, the actual imaging phase PH5, and the initial setting phase PH6, the operator selects the type of lens and camera for the image processing device, and selects the item to be processed in the image processing device. When executing pattern matching process and the like, model registration corresponding to the processing item is also performed. The operator further sets the initial value of the parameter for each processing item. After various types of setting is completed, a series of flow operation is checked on the image data obtained by test imaging.

Through the above tasks, a series of setting (selection of imaging unit, imaging environment etc.) for imaging the work is completed. The parameter to be set in the image processing device is then optimized through trial and error. This is the adjustment phase PH7, in which phase, the operator verifies the result obtained by image processing in the test line and the like, and optimizes the parameter based on the verification content.

After the parameters are adjusted in the adjustment phase PH7, the phase transitions to the operation (improvement) phase PH8 and the operation of the visual sensor starts, but the parameters are improved if some kind of false detection article is produced after checking the cause thereof. The false detection article is that in which the work, which is a non-defective article, is falsely determined as a defective article, or that in which the work, which is a defective article, is falsely determined as a non-defective article. In the present embodiment, the term "stable" means a state in which occurrence of such a false detection article is small.

The assisting device 100 according to the present embodiment aims to make the processes in the adjustment phase PH7 and the operation (improvement) phase PH8 of the phases more efficient. Although the parameters need to be readjusted if lot fluctuation and the like occur during the operation once after the adjustment of the parameters is completed, the assisting device 100 according to the present embodiment can be utilized in such a case as well. Furthermore, the parameters can be dynamically changed according to the state in the production line by using the assisting device 100 according to the present embodiment in-line in the operation (improvement) phase PH8.

The procedures of the outline for determining the set of parameters using the assisting device 100 according to the present embodiment will now be described with reference to FIG. 3A to FIG. 3C.

Figure 3A:
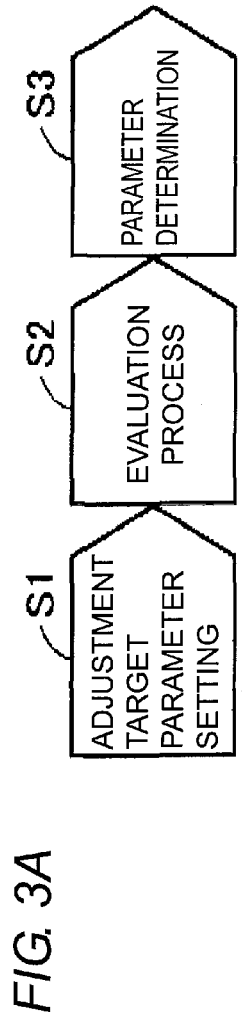
FIGS. 3A to 3C are conceptual views showing a procedure for determining parameters according to the embodiment of the present invention.
Figure 3B:
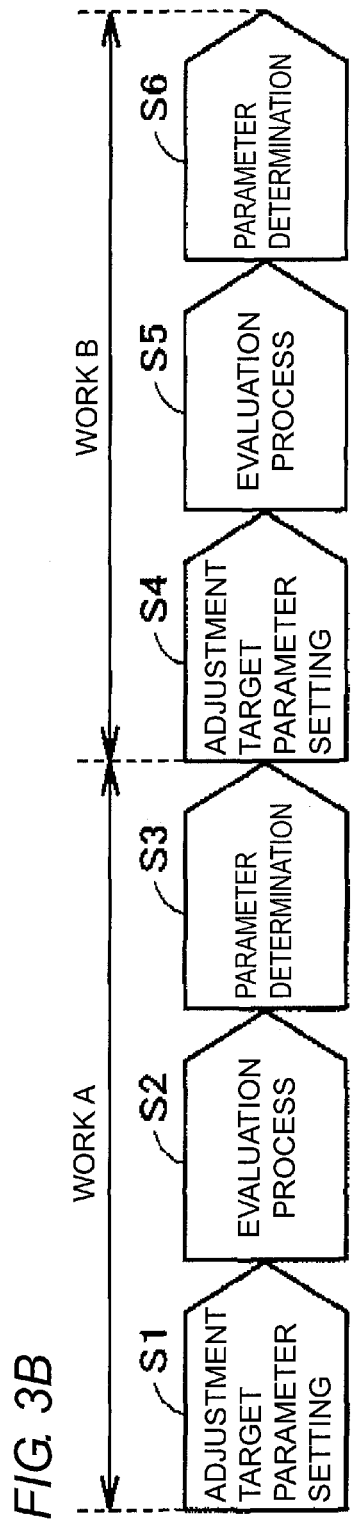
Figure 3C:
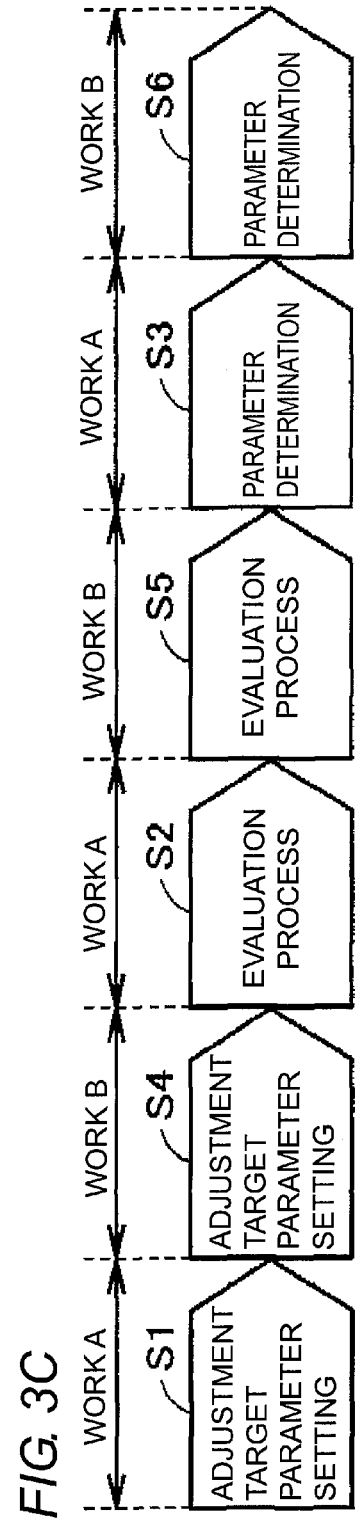

FIGS. 3A to 3C are conceptual views showing the procedure for determining the parameters according to the embodiment of the present invention. FIG. 3A shows a case of determining the set of parameters for one specific work. In this case, the user first sets an adjustment target parameter (step S1). The image data to be evaluated and the executed result corresponding to such image data are set on the assisting device 100. This process will be described later with reference to FIG. 11.

After such set values are input, the assisting device 100 generates a plurality of parameter candidates, and performs an evaluation process on each parameter candidate (step S2). The content of the evaluation process will be described later with reference to FIG. 16.

Finally, the user determines the parameter (or set of parameters) suited for the target image processing while referencing the evaluation result output at the assisting device 100.

A plurality of types of work often flow on the same production line. In such a case, the parameter (or set of parameters) suited for the image processing for each work is determined according to the procedure shown in FIG. 3B. In other words, as shown in FIG. 3B, when determining the parameters for the work A and the work B, the adjustment target parameter setting (step S1), the evaluation process (step S2), and the parameter determination (step S3) are performed on the work A, and then the adjustment target parameter setting (step S4), the evaluation process (step S5), and the parameter determination (step S6) are performed on the work B.

However, although the evaluation processes (steps S2 and S5) are automatically executed by the assisting device 100, as described above, other processes need to be operated by the user. Thus, the task efficiency of the user may lower if the process of parameter determination is performed on numerous works according to the procedure shown in FIG. 3B. In other words, the user may perform a different task during the evaluation process (steps S2 and S5) executed by the assisting device 100, but needs to frequently interrupt such a different task to perform the following evaluation process (steps S3 and S6).

The assisting device 100 according to the present embodiment thus supports the procedure shown in FIG. 3C. In the procedure shown in FIG. 3C, the user first sets the adjustment target parameter for each of a plurality of target works (steps S1 and S4). The assisting device 100 then sequentially executes the evaluation process (steps S2 and S5) in addition to the work set with the adjustment target parameter. Finally, the user sequentially determines the parameter (or set of parameters) (steps S3 and S6) suited for image processing on each work while referencing the evaluation result on each work output at the assisting device 100.

Thus, for the user operating the assisting device 100, significant time length can be ensured at the time of execution of the evaluation process and thus the user can perform a different task by having the assisting device 100 continuously execute the evaluation process. In other words, the user can ex-post obtain all necessary evaluation processes by setting the adjustment target parameter for each work and operating the assisting device 100, whereby the efficiency enhances the greater the number of target works.

In the following description, the processes and configurations for implementing the procedure shown in FIG. 3A will be described in detail, and thereafter, the processes and configurations for implementing the procedure shown in FIG. 3C will be described in detail (<P. continuous execution process> section described hereinafter).

<D. Hardware Configuration>
(1. Parameter Determination Assisting Device)

The assisting device 100 according to the present embodiment is typically embodied when a computer executes an installed program. Alternatively, some or all functions provided when the computer executes the program may be embodied as a dedicated hardware circuit.

Figure 4:
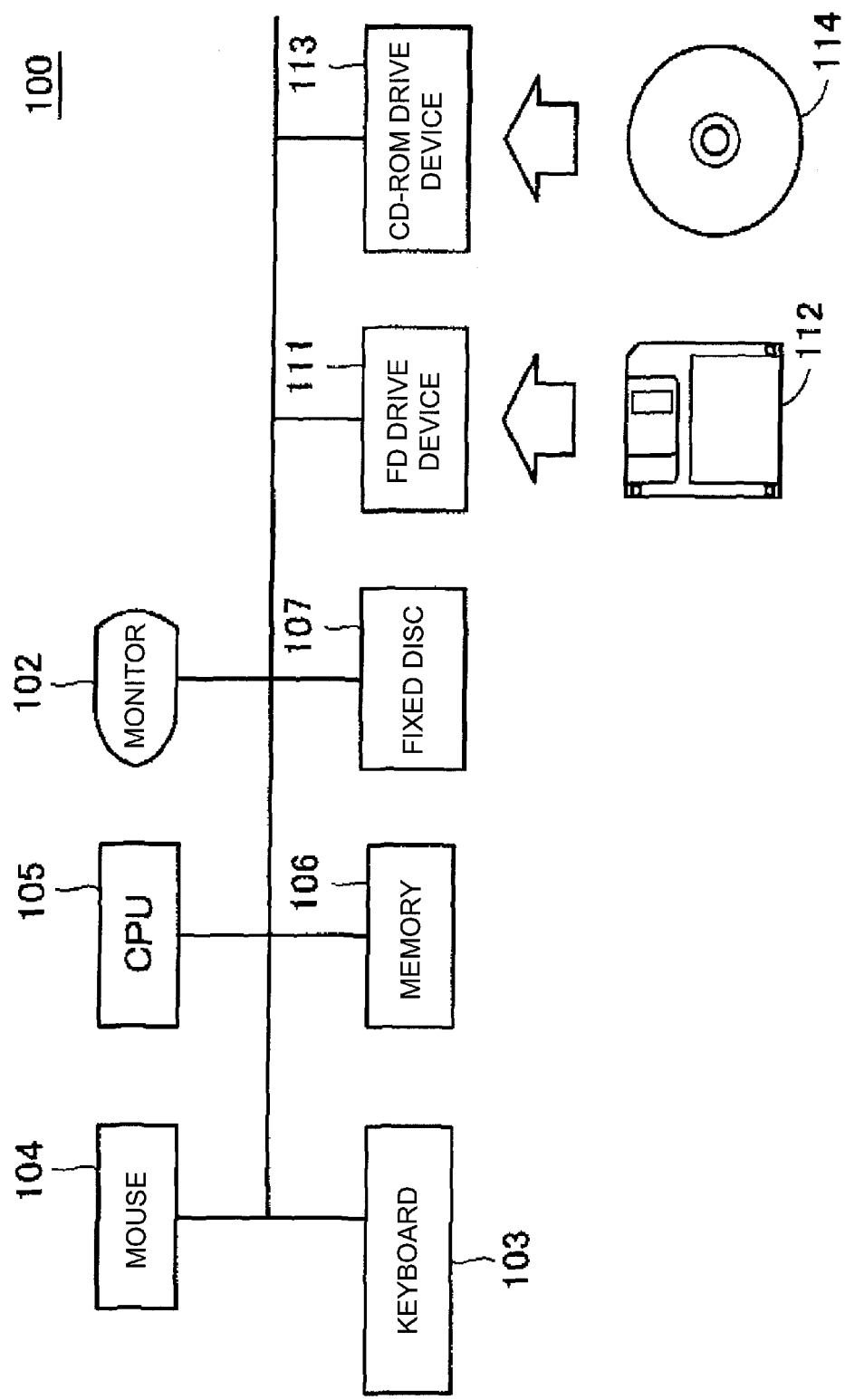
FIG. 4 is a schematic configuration diagram of a computer for implementing a parameter determination assisting device according to the embodiment of the present invention.

FIG. 4 is a schematic configuration diagram of a computer for implementing the parameter determination assisting device 100 according to the embodiment of the present invention.

With reference to FIG. 4, the computer for implementing the assisting device 100 includes a monitor 102 serving as a display device, a keyboard 103 and a mouse 104 serving as an input device, a CPU (Central Processing Unit) 105 serving as a calculation device (processor), a memory 106 and a fixed disk 107 serving as a storage device, and an FD drive device 111 and a CD-ROM drive device 113 serving as a data readout device from a recording medium. Each unit is data communicably connected to each other by way of a bus.

The program executed by the assisting device 100 (computer) is typically distributed by being stored in a flexible disk (FD) 112 or a CD-ROM (Compact Disk Read Only Memory) 114, or distributed in a form of being downloaded from a network connected distribution server device and the like. The program stored in the flexible disk 112 and the CD-ROM 114 is read out from the FD drive device 111 and the CD-RPM drive device 113, respectively, and once stored in the fixed disk 107. The program is then developed from the fixed disk 107 to the memory 106, and executed by the CPU 105.

The CPU 105 sequentially executes the programmed commands to carry out various types of calculations. The memory 106 also temporarily stores various types of information according to the execution of the program in the CPU 105. The fixed disk 107 is a non-volatile storage device for storing image data to be processed, various set values, and the like other than the program to be executed by the CPU 105.

The keyboard 103 accepts a command from the user corresponding to the input key. The mouse 104 accepts a command from the user corresponding to the operation such as click and slide. The command accepted by the keyboard 103 and the mouse 104 is then provided to the CPU 104.

Other output devices such as a printer may be connected to the assisting device 100, as necessary.

(2. Image Processing Device)

Similar to the assisting device 100, the image processing device 200 according to the present embodiment is typically embodied when the computer executes an installed program. Alternatively, some or all functions provided when the computer executes the program may be embodied as a dedicated hardware circuit.

Figure 5:
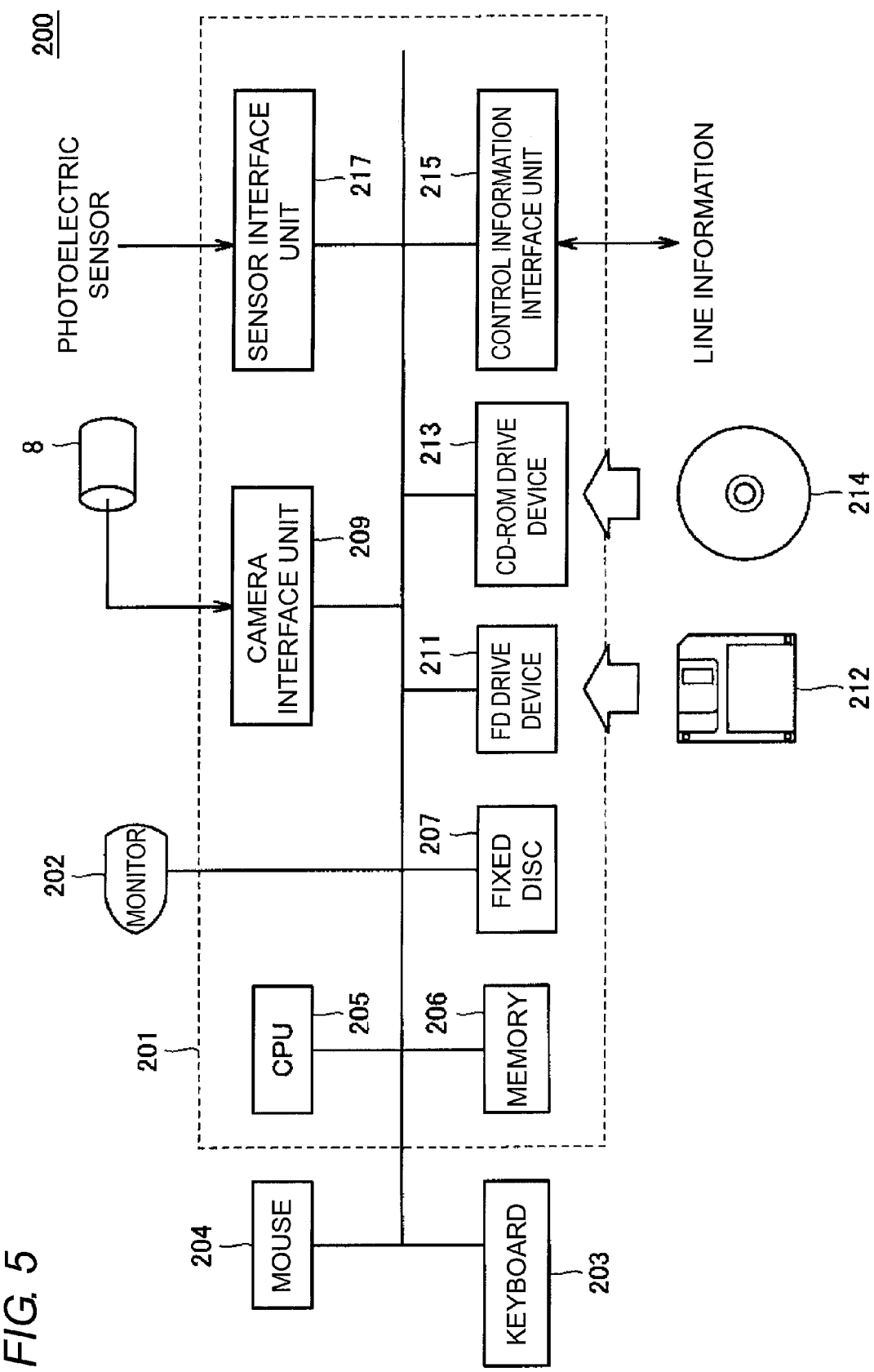
FIG. 5 is a schematic configuration diagram of a computer for implementing an image processing device according to the embodiment of the present invention.

FIG. 5 is a schematic configuration diagram of a computer for implementing the image processing device 200 according to the embodiment of the present invention.

With reference to FIG. 5, the computer for implementing the image processing device 200 includes a main body 201, a monitor 202 serving as a display device, and a keyboard 203 and a mouse 204 serving as an input device. The main body 201 includes, a CPU 205 serving as a calculation device (processor), a memory 206 and a fixed disk 207 serving as a storage device, and an FD drive device 211 and a CD-ROM drive device 213 serving as a data readout device from a recording medium. The main body 201 also includes a camera interface unit 209, a control information interface unit 215, and a sensor interface unit 217 as an interface for exchanging signals with the exterior of the main body 201. Each unit is data communicably connected to each other by way of a bus.

The program executed by the image processing device 200 (computer) is also typically distributed by being stored in a flexible disk (FD) 212 or a CD-ROM 214, or distributed in a form of being downloaded from a network connected distribution server device and the like. The program stored in the flexible disk 212 and the CD-ROM 214 is read out from the FD drive device 211 and the CD-RPM drive device 213, respectively, and once stored in the fixed disk 207. The program is then developed from the fixed disk 207 to the memory 206, and executed by the CPU 205.

Among the configurations of the main body 201, the CPU 205, the memory 206, the fixed disk 207, the FD drive device 211, and the CD-ROM drive device 213 are similar to the assisting device 100, and thus the detailed description thereof will not be repeated.

The camera interface unit 209 mediates data communication between the CPU 205 and the imaging unit 8. More specifically, the camera interface unit 209 includes an image buffer, so that image data imaged and continuously transmitted by the imaging unit 8 is once accumulated, and the accumulated data is transferred to the memory 206 or the fixed disk 207 when transfer of the image data worth at least one frame is accumulated. The camera interface unit 209 provides an imaging command to the imaging unit 8 according to an internal command generated by the CPU 205.

The control information interface unit 215 mediates data communication between the CPU 205 and the control device (typically a PLC (Programmable Logic Controller) etc.) (not shown) for controlling the production line. The control information interface unit 215 accepts line information and the like from an external control device, and outputs to the CPU 205. The sensor interface unit 217 receives a trigger signal from the photoelectric sensor and the like, described above, and outputs to the CPU 205.

Other configurations are similar to the assisting device 100 described above, and the detailed description thereof will not be repeated.

<E. Example of User Interface of Image Processing Device>

First, one example of a user interface in the image processing device 200 in the initial setting phase PH6 shown in FIG. 2 will be described to facilitate the understanding on the parameter related to image processing.

Figure 6A:
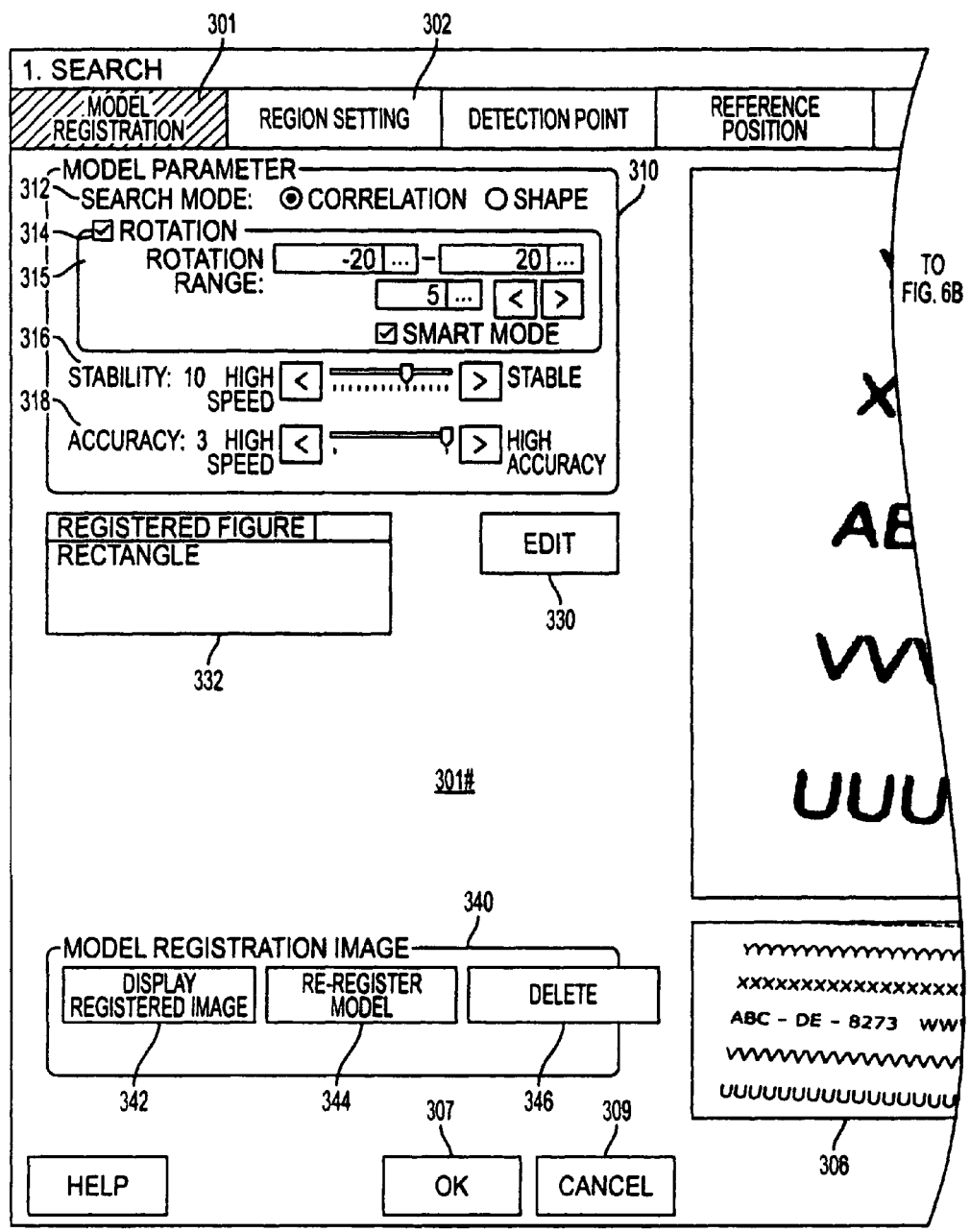
FIGS. 6A and 6B are diagrams showing a screen display example (1) displayed on a monitor of the image processing device according to the embodiment of the present invention.
Figure 6B:
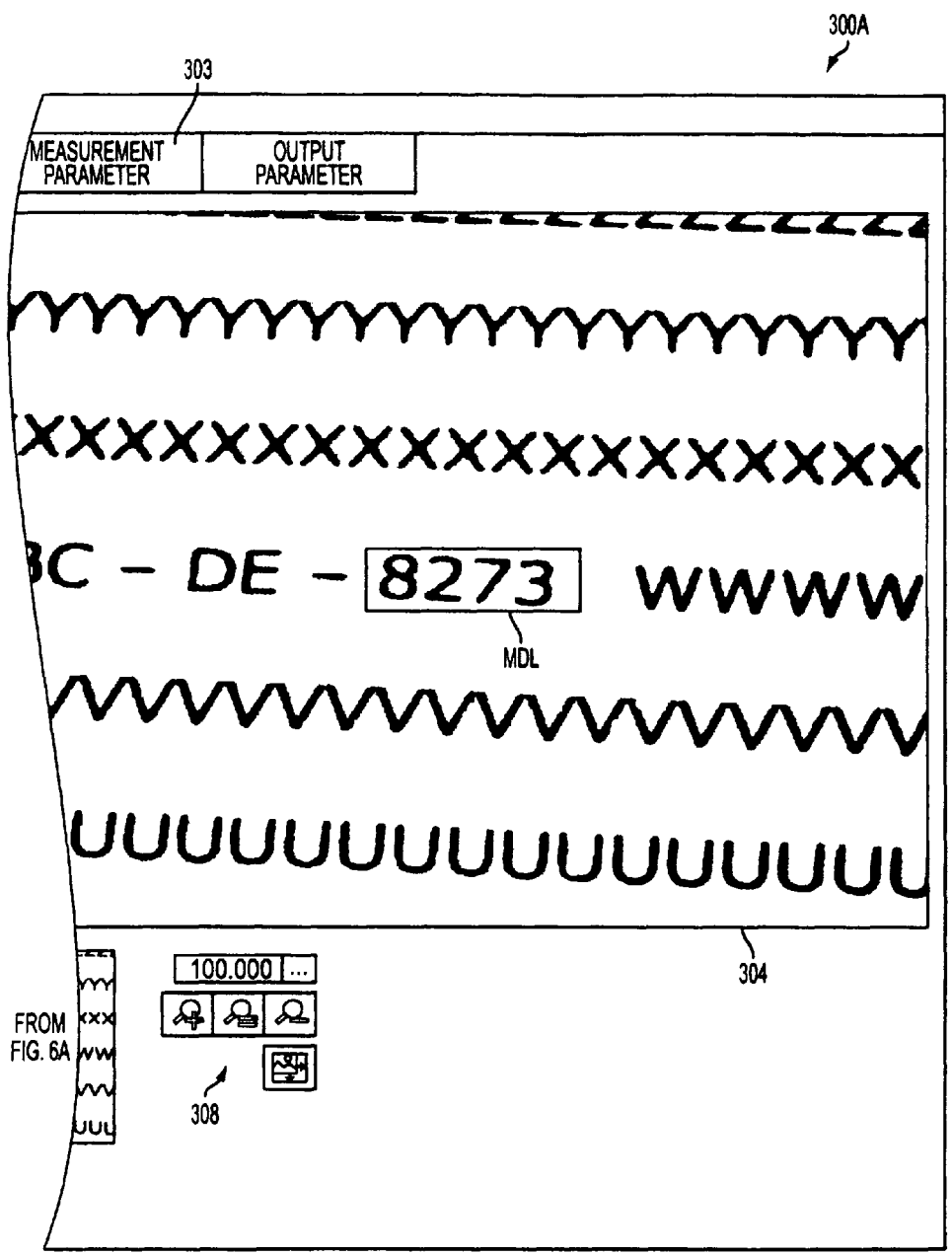
Figure 7A:
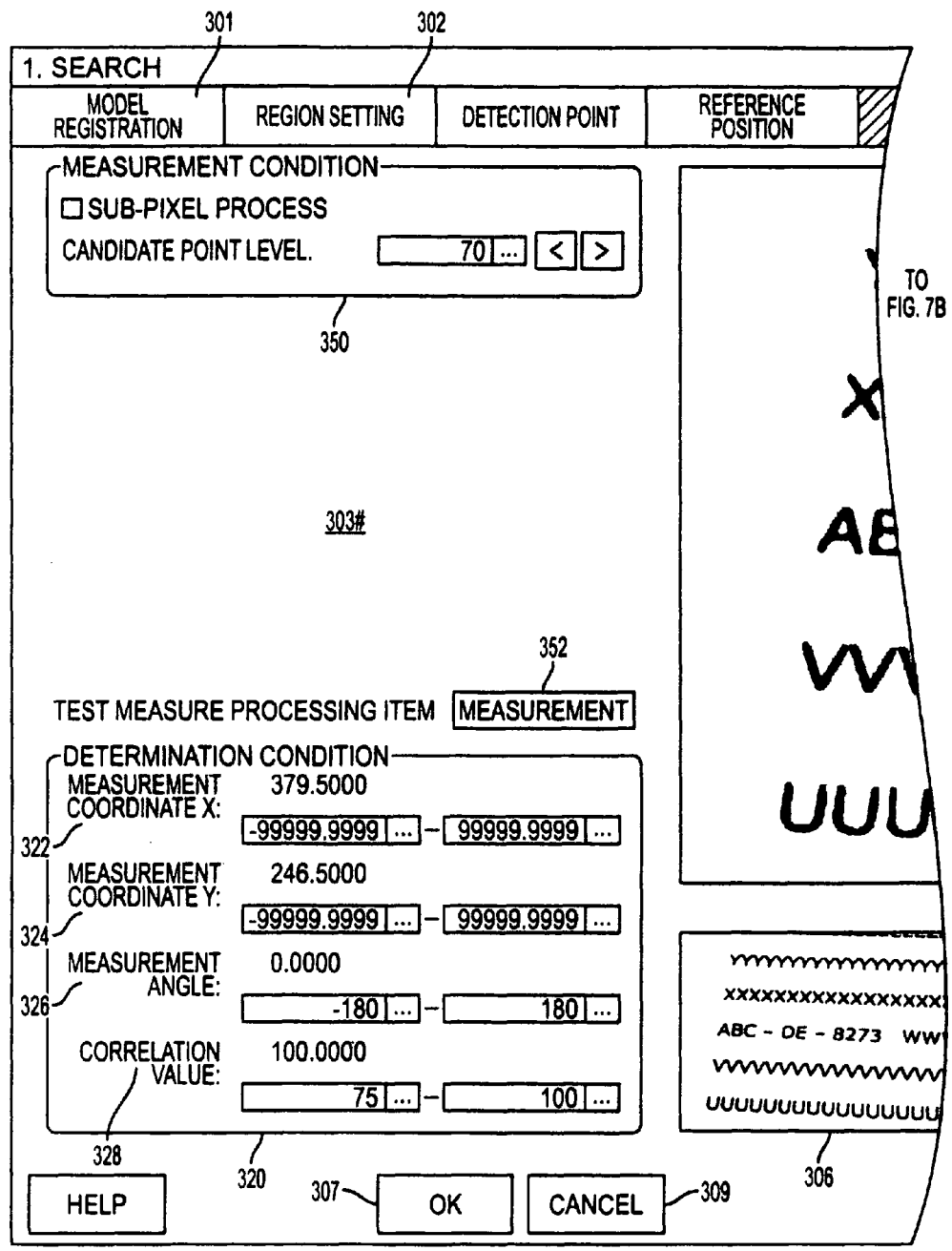
FIGS. 7A and 7B are diagrams showing a screen display example (2) displayed on the monitor of the image processing device according to the embodiment of the present invention.
Figure 7B:
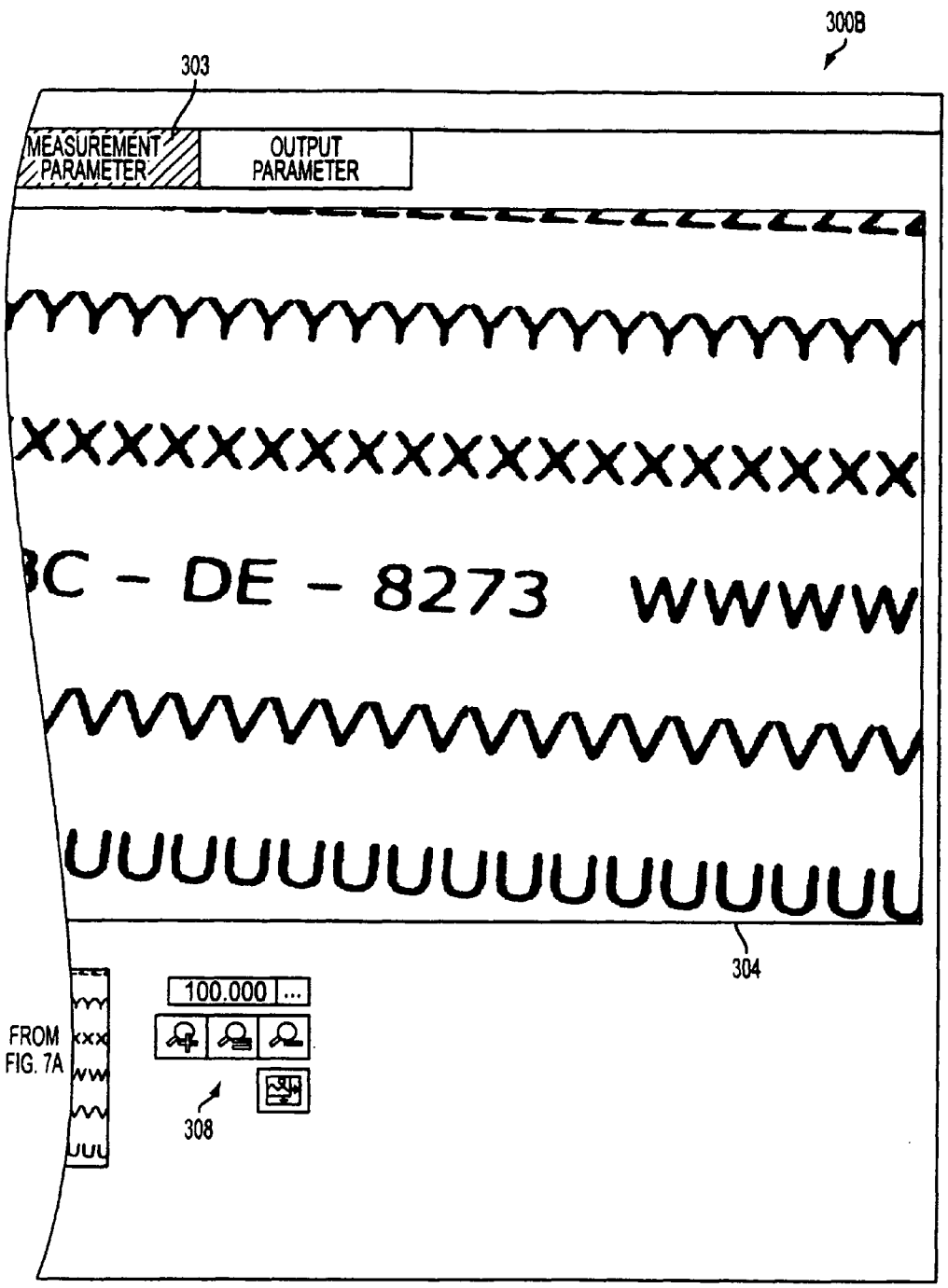

FIGS. 6 and 7 are diagrams showing a screen display example displayed on a monitor of the image processing device 200 according to the embodiment of the present invention. FIGS. 6 and 7 show an example of a case in which the search process is the processing item, as one example of image processing. The screen shown in FIGS. 6 and 7 is displayed by cooperatively operating the CPU 205 of the image processing device 200 and a graphic board (not shown) etc. Such screen display is implemented by a GUI (Graphical User Interface) program incorporated as one part of the OS (Operating System), and the GUI also provides an environment for performing various user settings using a cursor on the screen operated by the user with the keyboard 203 and the mouse 204.

The "search process" is a process of registering in advance the characteristic portion to be detected of the work as an image pattern (model), searching the portion most similar to the registered model from the image data, and specifying the position (coordinate value on image data). In this process, the degree of similarly (correlation value) indicating the extent of similarly, the position of the specified model, the tilt of the specified model, and the like are also output as characteristic amount. Such a search process is used in a process of detecting if a work of a certain type is mixed in a work of a different type, or detecting the work where correct printing etc. is not performed.

As shown in FIGS. 6 and 7, in the mode of performing the setting on the search process, a screen where a total of six tabs corresponding to the setting items of "model registration", "region setting", "detection point", "reference position", "measurement parameter", "output parameter" can be selected is displayed by way of example. Among such items, at least three items of "model registration", "region setting", and "measurement parameter" require setting by the user.

With reference to FIG. 6, when a tab 301 of "model registration" is selected, a setting screen 300A is displayed. The setting screen 300A includes a model registration area 301#, an image display area 304, an entire display area 306, and a display control icon group 308.

In the image display area 304, the image data acquired by the imaging unit 8 is displayed. The synthesized image displayed in the image display area 304 is updated in real time during the various settings. The image data acquired by the imaging unit 8 is displayed in the entire display area 306, similar to the image display area 304. The entire target image data is displayed in the entire display area 306 independent from the display range in the image display area 304. Furthermore, the display range and the display accuracy of the image data to be displayed in the image display area 304 are changed according to the user operation (enlarge, reduce, etc.) on the display control icon group 308.

Displayed in the model registration area 301# are a model edit button 330, a registered figure display box 332, a model parameter setting area 310, and a model registration image area 340.

When the user registers the model to be searched, a reference object including the model is acquired in advance using the imaging unit 8, and the operation is performed with the acquired image data displayed in the image display area 304 and the entire display area 306.

First, a drawing tool dialogue (not shown) is displayed when the user pushes the model edit button 330 by operating the mouse 204 and the like. The user then operates the drawing tool dialogue to specify the range to register as the model overlapping the image data displayed in the image display area 304. FIG. 6 shows a case in which a rectangular range including a character string "8273" is set as a model MDL on the image display area 304. If some kind of model is already registered, the shape of the registered model is displayed in the registered figure display box 332 ("rectangle" in the case of FIG. 6). The model registering shape is not limited to a rectangle, and may be any shape such as a circle, a fan-shape, or an arbitrary polygon.

When performing setting change of the registered model and the like, the user pushes the necessary button of the model registered image area 340. The image data used in model registration is saved, and only the parameters related to the registered model can be changed afterwards. More specifically, when the registered image display button 342 is pushed, the image data used in the model registration is displayed. When such a registered screen display button 342 is again pushed, the display switches to the display of the image data currently being input. When the re-register model button 344 is pushed, it is again registered as the model with the registered model image as is and the other parameters changed. When the delete button 346 is pushed, the registered model is deleted.

The model parameter setting area 310 accepts the selection of the search mode as a setting item. The search mode is the selection of an algorithm for evaluating to what extent it is similar to the model. For the search mode, either "correlation" or "shape" can be selected by operating a radio button 312. The "correlation" is an algorithm for measuring the degree of similarity by calculating the correlation value with the model after normalizing the brightness of the input image data. The "shape" is an algorithm for measuring the degree of similarity based on the degree of coincidence with the contour shape of the model. Generally, a more stable measurement can be performed in the "correlation" mode.

If the "correlation" is selected in the search mode, the setting of "rotation", "stability", and "accuracy" can be made. If "shape" is selected in the search mode, "the setting of "rotation range" and "stability" can be made.

In the "rotation", when the work rotates, a plurality of models in which the registered model is rotated by a predefined angle is internally generated, and the parameter related to the process of measuring the degree of similarity based on the respective generated models is specified. In other words, when the rotation checkbox 314 is checked, the process of rotation is validated. When the rotation range (rotation angle upper limit and rotation angle lower limit) and the interval angle are respectively input to the numerical box 315, generating a model rotated by the interval angle over the range of the rotation range is specified. Generally, although the stability becomes higher the smaller the interval angle, the processing time length becomes long. A smart mode in which rotation search can be performed at high-speed can also be set.

In the "stability", either to prioritize the stability or the processing speed of the measurement is set. In other words, a slide bar 316 is set to any value in the range of a predetermined width (e.g., 1 to 15), where the processing time length is shorter the smaller the set value, and the stability is higher the larger the value.

In the "accuracy", either to prioritize the position accuracy or the processing speed of the measurement is set. In other words, a slide bar 318 is set to any value in the range of a predetermined width (e.g., 1 to 3), where the processing time length is shorter the smaller the set value, and the accuracy is higher the larger the value.

After the above-described content is set by the user, such a content is reflected as the internal parameter of the image processing device 200 by pushing an OK button 307. When a cancel button 309 is pushed, the non-reflected parameter is reset. When the "region setting" tab 302 is selected following the model registration, a setting screen for specifying a range for searching the model is displayed (not shown). In such a setting screen, the user can set an arbitrary range as the search range on the image display area 304. The entire input image data may be the search range, but the search range is preferably limited to a specific range from the standpoint of reducing the processing time length.

With reference to FIG. 7, a setting screen 300B is displayed when the "measurement parameter" tab 303 is selected following the input of the region setting. The setting screen 300B includes a measurement parameter setting area 303#, the image display area 304, the entire display area 306, and the display control icon group 308. Displayed in the measurement parameter setting area 303# are a determination condition setting area 320, a measurement condition setting area 350, and a measurement button 352.

The measurement condition setting area 350 accepts validation/invalidation of a sub-pixel process as the setting item. The sub-pixel process measures the position information in units of sub-pixels, although the processing time length becomes long. When the items of the measurement condition setting area 350 is set/changed, the user judges whether or not the search process can be correctly executed by pushing the measurement button 352.

The determination condition setting area 320 accepts the condition for determining as matching with the registered model ("OK") of the degree of similarly (correlation value) at each measured coordinate. More specifically, four items of a measurement coordinate X, a measurement coordinate Y, a measurement angle, and a correlation value can be set as the setting items. In the measurement coordinate X and the measurement coordinate Y, the respective coordinate range to which the measured coordinate value (X coordinate value and Y coordinate value) is to be included is set by inputting the numerical value range to the numerical boxes 322 and 324, respectively. In the measurement angle, an angular range to which the rotation angle of the measured model is to be included is set by inputting a numerical value range to a numerical box 326. In the correlation value, a numerical value range to which the correlation value with the measured model is to be included is set by inputting a numerical value range to a numerical box 328.

In the search process described above, at which position (coordinate) of the input image the degree of similarity is high is searched by sequentially updating the region for calculating the degree of similarity with the registered model in the input image. Therefore, the respective degree of similarity at a plurality of coordinates in the input image is calculated as an actual internal process. In addition to that having the highest value of all the calculated degrees of similarities, that having the second and third highest degrees of similarity may also be output as a detection result.

As described above, a relatively large number of setting items exist, as apparent from one example of the search process. The set of parameters necessary for a series of processes is hereinafter also referred to as "parameter set".

<F. Expected Result of Image Data>

In the visual sensor and the like, detection OK is output for the image data including substantially the same content as the registered model, and detection NG is output for the image data including a content similar to but essentially different from the registered model.

Figure 8A:
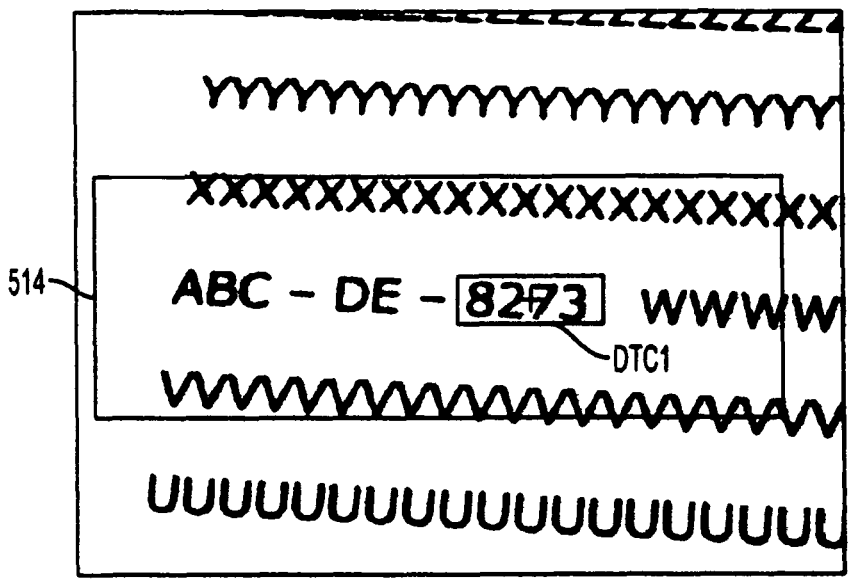
FIGS. 8A and 8B are views showing one example of image data handled in the image processing device according to the embodiment of the present invention.
Figure 8B:
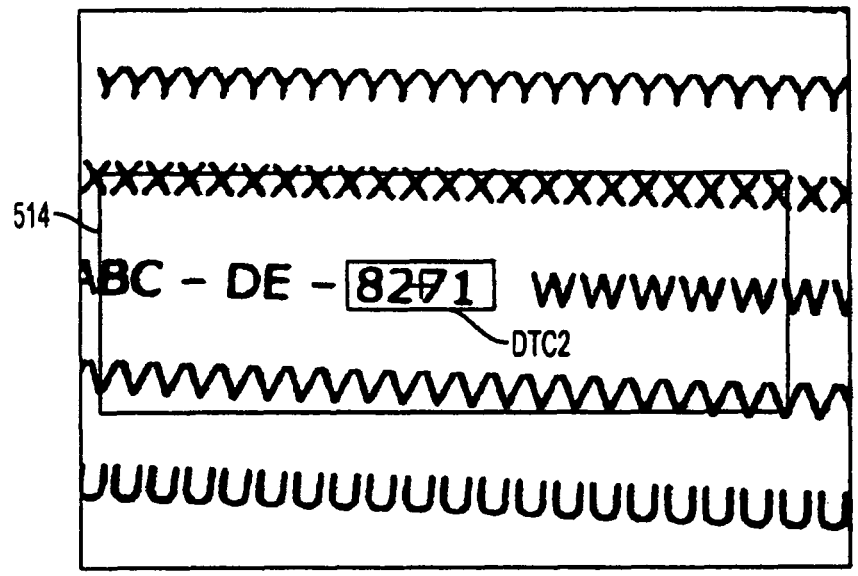

For instance, assume that the model MDL including the character string "8273" is registered, as shown in FIG. 6. Assume that the image data shown in FIGS. 8A and 8B is input in such a case. As shown in FIG. 8A, if the image data including substantially the same content as the character string "8273" contained in the registered model is input, a region DTC1 corresponding to the model in the measurement range 514 is extracted as a region having the highest degree of similarity (correlation value). In this case, the degree of similarity (correlation value) measured for the region DTC1 must satisfy the determination condition.

As shown in FIG. 8B, if the image data including a character string "8271" different from the character string "8273" contained in the registered model by one character is input, a region DTC2 including the character string "8271" in the image data is extracted as a region having the highest degree of similarity (correlation value). In this case, the degree of similarity (correlation value) measured for the region DTC2 must not satisfy the determination condition.

In other words, when the model MDL including the character string "8273" is registered, the expected result (in this case, expected class) of the image data shown in FIG. 8A is "OK" or "non-defective article", and the expected result of the image data shown in FIG. 8B is "NG" or "defective article".

Therefore, the assisting device 100 according to the present embodiment is premised on a state in which the expected result of being either a non-defective article or a defective article is known for each image data.

In the adjustment phase of the parameter of the image processing device 200, a method of actually acquiring the image data includes flowing the test work on the production line and continuously imaging the relevant work. In hits case, the expected result may be input for each acquired image data after the user checks the content. Alternatively, from the standpoint of saving power, a method of distinguishing in advance a work to be detected as a "non-defective article" and a work to be detected as a "defective article", continuously photographing only the work of "non-defective article", and then continuously photographing only the work of "defective article" is efficient. When such a method is used, the image data obtained by imaging the work of the "non-defective article" and the image data obtained by imaging the work of the "defective article" are respectively stored in different folders so as to be easily distinguished.

<G. Outline Process>

The outline of the process in the assisting device 100 according to the present embodiment will now be described with reference to FIG. 9.

Figure 9:
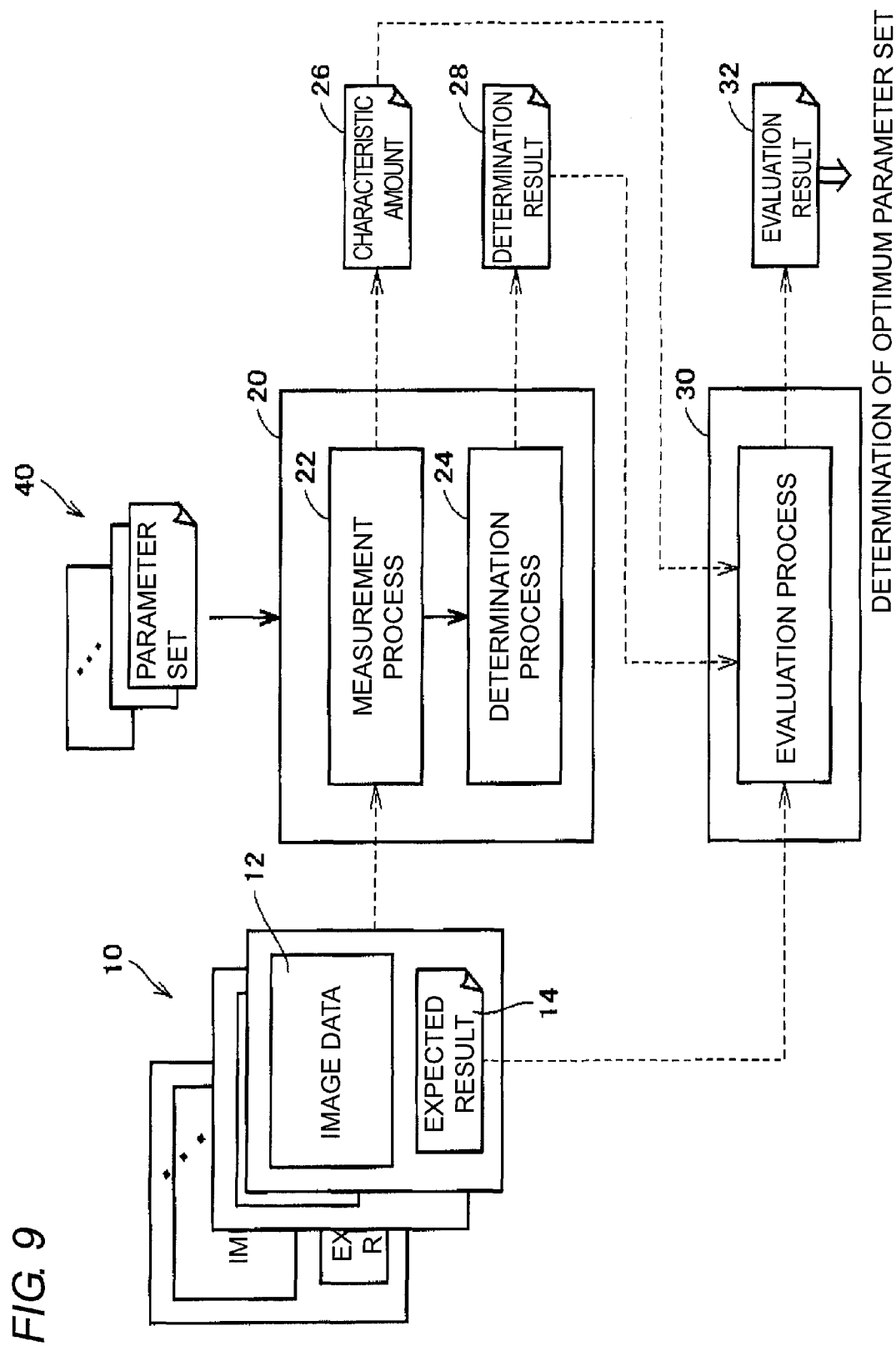
FIG. 9 is a view for describing an outline of a process in the parameter determination assisting device according to the embodiment of the present invention.

As shown in FIG. 9, in the assisting device 100, the image processing application 20 for the image data and the evaluation processing application 30 for the result of image processing (characteristic amount and determination result) mainly cooperatively execute the process. The optimum parameter set is determined based on the evaluation result 32 output by the evaluation processing application 30.

More specifically, the user inputs a data set 10 including the image data 12 acquired by the image processing device 200, and the expected result 14 corresponding to the image data. As hereinafter described, the user also inputs the item of the parameter to be adjusted, and the fluctuation step, the fluctuation range thereof to generate the parameter candidates 40 including a plurality of parameter sets to be evaluated. The image processing application 20 is an application (simulator) for executing the process same as the image processing in the image processing device 200, and repeatedly executes the measurement process 22 and the determination process 24 on each image data according to each parameter set contained in the generated parameter candidates 40. According to the measurement process 22, the characteristic amount 26 upon performing the process according to each parameter candidate is calculated for the respective image data. According to the determination process 24, the determination result 28 or the result of performing the determination process based on the determination condition is calculated on the respective characteristic amount calculated by the measurement process 22.

The evaluation processing application 30 evaluates the characteristic amount 26 and/or the determination result 28 obtained by processing the respective image data based on the expected result 14 corresponding to each image data. More specifically, if the expected result 14 is a value indicating whether the "non-defective article" or the "defective article", whether or not the determination result 28 obtained from the image data given the expected result of "non-defective article" matches the result of "non-defective article" is judged. If the expected result 14 is a character string and the like appearing in the image data, whether or not such a character string matches the character string obtained as a characteristic amount is judged. The evaluation result evaluated by the evaluation processing application 30 is then output so as to be comparable for each of the parameter set. In other words, the assisting device 100 assists the evaluation of each of a plurality of parameter candidates, and the selection of the optimum parameter set therefrom.

The image processing application 20 may not necessarily mounted as long as the assisting device 100 can communicate with the image processing device 200. In other words, the assisting device 100 may evaluate the parameter candidate by providing the content of the parameter candidate to the image processing device 200 to cause the execution of the image processing on the image data, and receiving the result of image processing from the image processing device 200. The process thus can be carried out by synchronizing the assisting device 100 and the image processing device 200.

<H. Example of User Interface of Parameter Determination Assisting Device>

One example of a user interface in the assisting device 100 will now be described with reference to FIGS. 10 to 23. The screens shown in FIGS. 10 to 23 are displayed when the CPU 105 of the assisting device 100 and the graphic board (not shown) etc. cooperatively operate. Such screen display is implemented by the GUI (Graphical User Interface) program incorporated as one part of the OS (Operating System), and the GUI also provides an environment for performing various user settings using a cursor on the screen operated by the user with the keyboard 103 and the mouse 104.

(1. Fluctuation Setting)

Figure 10:
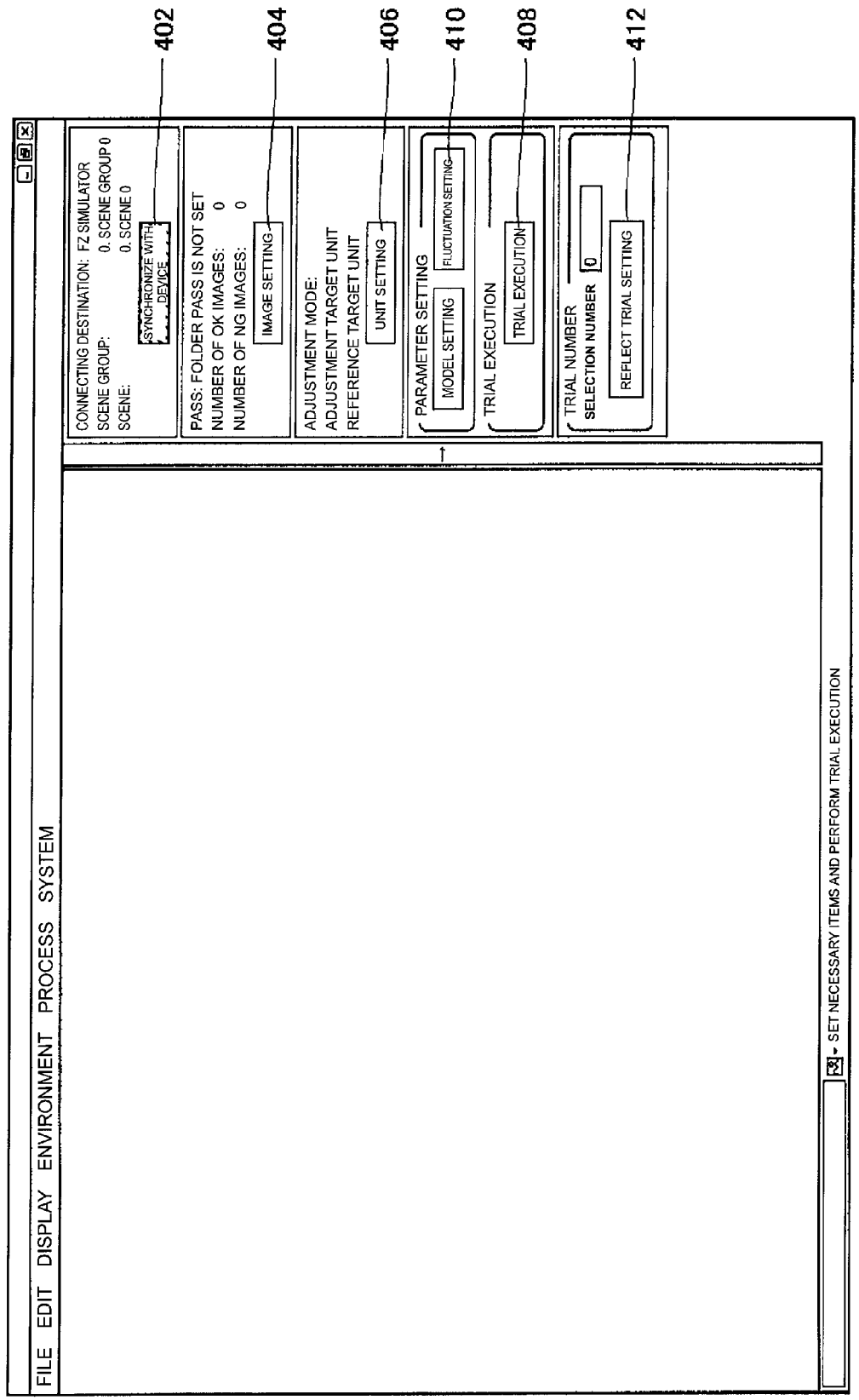
FIG. 10 is a view showing one example of a user interface in the parameter determination assisting device according to the embodiment of the present invention.

First, when the execution of the evaluation processing application 30 (FIG. 9) is instructed by the user in the assisting device 100, an input screen 400A shown in FIG. 10 is displayed. In the input screen 400A, a button 402 for setting the image processing device 200 or the image processing application 20, a button 404 for inputting the image data and the expected result corresponding to the image data, and a button 406 for specifying the adjustment target are selectably displayed.

When the user pushes the button 402 by operating the mouse 104 and the like, a setting dialogue (not shown) is displayed. The user selects the image processing device 200 or the image processing application 20 of the target for adjusting the parameter on the setting dialogue. Synchronization between the evaluation processing application 30 and the image processing device 200 or the image processing application 20 is thereby established.

Figure 11:
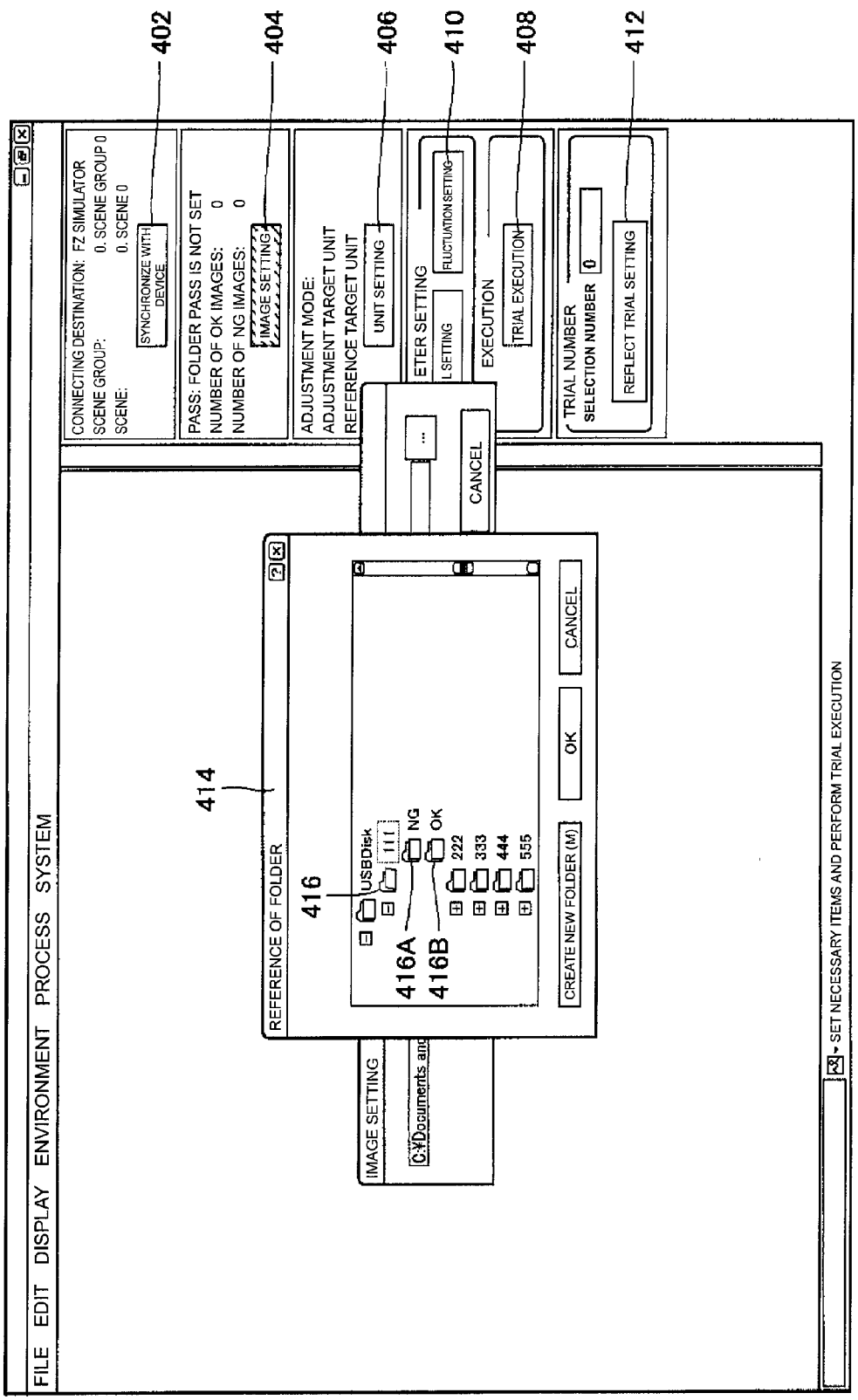
FIG. 11 is a view showing one example of a user interface in the parameter determination assisting device according to the embodiment of the present invention.

With reference to FIG. 11, when the user pushes the button 404 by operating the mouse 104 and the like, a dialogue 414 etc. for inputting the target image data and the expected result corresponding to the image data are displayed. Here, each image data exists as one file and the respective files are stored in folders 416A and 416B distinguished by the expected result (in this example, two ways of "non-defective article" (OK) or "non-defective article (NG)). In this case, when the user specifies the folder 416 (in the example shown in FIG. 11, folder name "111") of higher level where the target image data is stored, specification that the image data in the "OK" folder 416A of lower level of the "111" folder 416 is corresponding to the expected result of "non-defective article" and the image data in the "NG" folder 416B is corresponding to the expected result of "defective article" is made. In the following description, the image corresponding to the expected result of "non-defective article" is referred as a non-defective image, and the image corresponding to the expected result of "defective article" is referred as a defective image.

Another mode in the method of inputting the image data and the expected result corresponding to the image data will be hereinafter described.

Furthermore, when the user pushes the button 406 by operating the mouse 104 and the like, a setting dialogue (not shown) is displayed. The user selects the content (processing item) of image processing for adjusting the parameter on the setting dialogue. A list of adjustable parameters and the current set value are thereby acquired. If the assisting device 100 is data communicably connected with the image processing device 200, the content set in the image processing device 200 is transferred to the evaluation processing application 30, and the current value etc. of the parameter is judged based on the transferred content.

After the setting of content described above is completed, a button 410 for setting the parameter candidate, a button 408 for instructing the start of parameter adjustment, and a button 412 for reflecting the selected parameter candidate in the image processing device 200 and the like are selectably displayed.

First, with reference to FIG. 12, when the user pushes the button 410 by operating the mouse 104 and the like, a dialogue 420 for inputting the conditions for generating the parameter candidate for performing adjustment of the parameter is displayed. Assume that the parameter adjustment for the search process shown in FIGS. 6 and 7 is selected by the previous selecting operation.

In the dialogue 420, a table including a number field 432, an item field 434, a current value field 436, an adjustment target field 438, a fluctuation minimum value field 440, a fluctuation maximum value field 442, a step field 444, and a comment field 446 is displayed. Among such fields, the adjustment target field 438, the fluctuation minimum value field 440, the fluctuation maximum value field 442, the step field 444, and the comment field 446 can be arbitrarily set by the user.

In the number field 432 and the item field 434, the respective contents contained in the parameter set of the corresponding processing content (search process in this case) is displayed in a list. The number (ID) displayed in the number field 432 is the number specifying the content of the parameter in the internal process, and is uniquely defined for every parameter. The item name displayed in the item field 434 is defined to match the content displayed in the user interface shown in FIGS. 6 and 7. In the current value field 436, the currently set value is displayed for every parameter contained in the parameter set.

The adjustment target field 438 includes a checkbox indicating whether or not the adjustment target for each parameter contained in the parameter set. In other words, the parameter candidate is generated by fluctuating the value on the parameter given a check in the checkbox.

In the fluctuation minimum value field 440 and the fluctuation maximum value field 442, the fluctuation range of the parameter for generating the parameter candidates is specified. In the step field 444, the fluctuation step of the parameter for generating the parameter candidates is specified.

In the example shown in FIG. 12, the checkbox of the adjustment target field 438 is checked for two items of "stability (correlation)" and "accuracy", and thus the parameter candidates in which the values on the two items are changed are generated from the current parameter set. More specifically, the fluctuation minimum value and the fluctuation maximum value is "10" and "14" for the "stability (correlation)", and the parameter candidates in which the "stability (correlation)" is fluctuated in three ways of "10", "12", and "14" are generated since the step is "2". The fluctuation minimum value and the fluctuation maximum value is "2" and "3" for the "accuracy", and the parameter candidates in which the "accuracy" is fluctuated in two ways of "2", and "3" are generated since the step is "1".

As a result, six parameter candidates in total are generated for the combination of "stability (correlation") and "accuracy".

A series of processes including the image processing on the image data and the evaluation of the image processing result for one parameter candidate is also referred to as "trial". The number of trials is "six" if the above setting is made. Since longer processing time length is required the greater the number of generated parameter candidates, the number of trials scheduled to be added according to the set content is displayed (number of trial display 426) to serve as an indication on which parameter the user is to fluctuate in the range of what extent. When the user pushes the trial addition button 422 by operating the mouse 104 and the like, the parameter candidates are generated according to the content of the fluctuation setting. A trial number is internally assigned to the generated parameter candidate. The dialogue 420 is closed when the close button 424 is pushed.

When the user pushes 408 by operating the mouse 104 and the like, the evaluation process of the parameter starts according to the fluctuation setting input to the dialogue 420.

(2. Variant of Fluctuation Setting)

A user-friendlier user interface may be adopted in place of the user interface shown in FIG. 12. A variant of such a user interface will be described below with reference to FIGS. 13 to 15.

Figure 13:
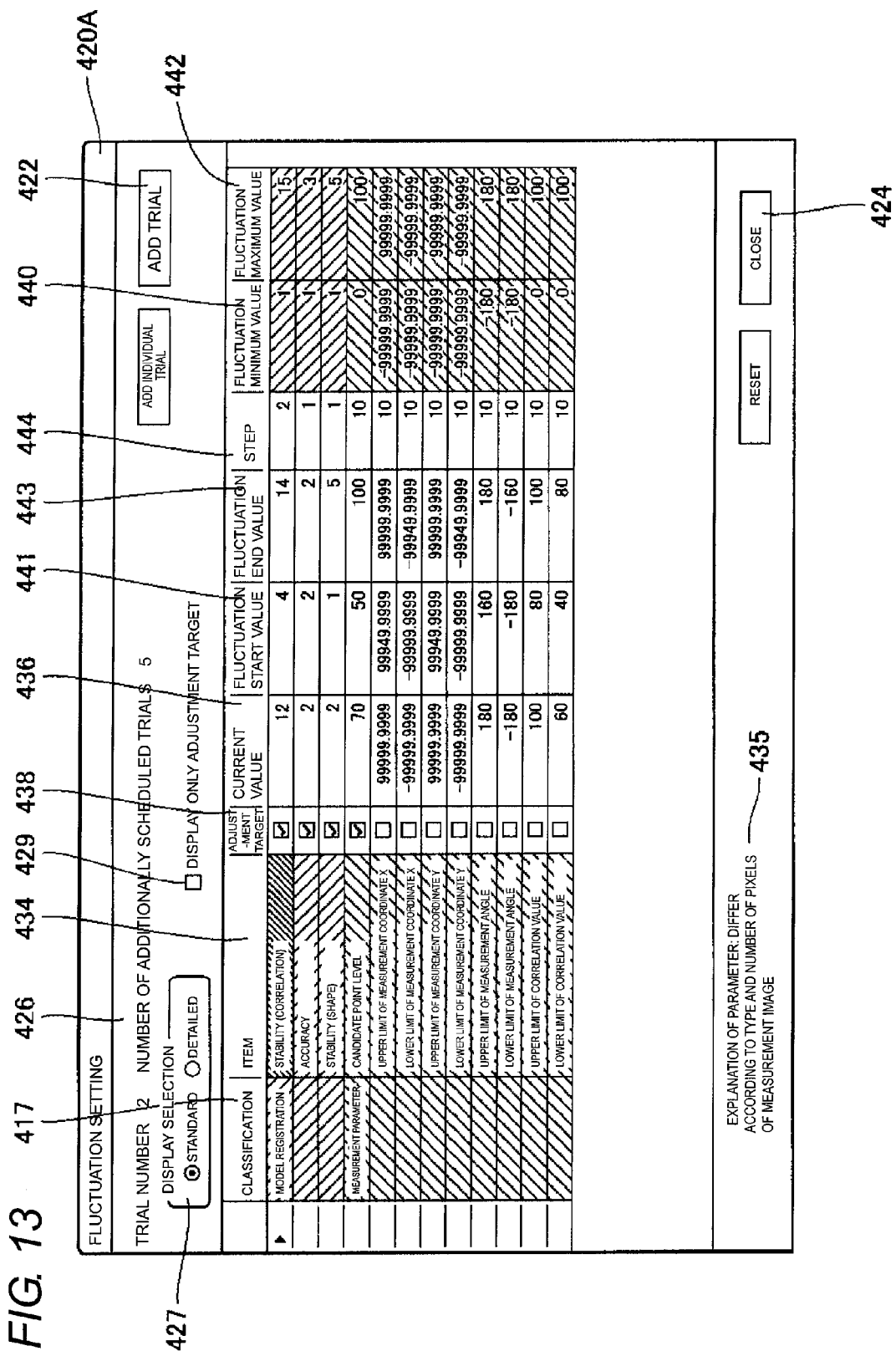
FIG. 13 is a view showing another example of a user interface in the parameter determination assisting device according to the embodiment of the present invention.
Figure 14:
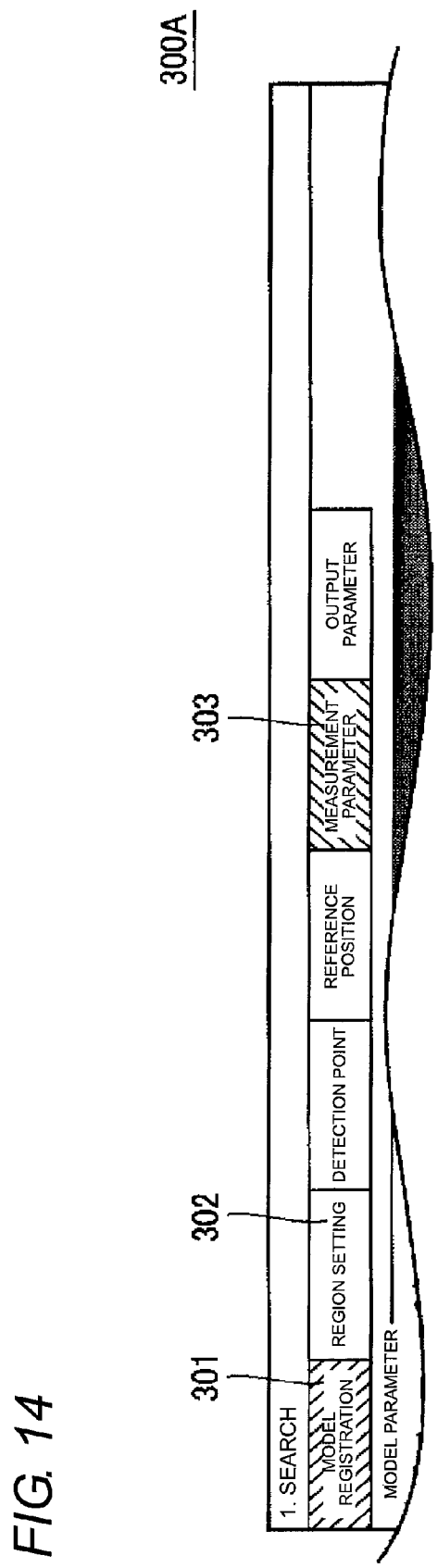
FIG. 14 is a view showing main parts of a user interface corresponding setting screen shown in FIG. 13.

FIG. 13 is a view showing another example of the user interface in the parameter determination assisting device according to the embodiment of the present invention. FIG. 14 is a view showing the main parts of the user interface corresponding setting screen shown in FIG. 13. FIG. 15 is a view for describing change in display mode of the user interface shown in FIG. 13.

A dialogue 420A shown in FIG. 13 basically differs from the dialogue 420 shown in FIG. 12 in that the items contained in the item field 434 are displayed in correspondence to the classification to which each item belongs (change 1), a radio button 427 for changing the display mode is added (change 2), and a checkbox 429 for selectively displaying only the adjustment target is added (change 3). Such changes will be described in detail below.

First, the change 1 aims to clarify the correspondence with the setting item when the user performs a setting related to image processing using the setting screens 300A and 300B so that the user can understand the content of each parameter at a glance. In other words, in the dialogue 420A, a classification field 417 and the item field 434 are displayed such that an item contained in the setting screen 300A (see FIG. 6) displayed when the tab 301 of "model registration" is selected in the setting screen and an item contained in the setting screen 300B (see FIG. 7) displayed when the tab 303 of "measurement parameter" is selected in the setting screen can be distinguished. Thus, for example, the user can grasp at a glance that the items ("stability (correlation)", "accuracy" and "stability (shape)") corresponding to "model registration" of the classification field 417 are items that can be set in the setting screen 300A shown in FIG. 6.

Furthermore, the tabs that can be selected by the user at the upper part of the setting screen may be represented so as to be visually identifiable, and the dialogue 420A may be displayed in such a visual identification mode. For instance, as shown in FIG. 14, each tab at the upper part of the setting screen is expressed with display attributes ("color", "pattern", "pattern" etc.) different from each other, and the classification field 417 and the item field 434 of the dialogue 420A are expressed with the display attribute same as the display attribute given to each tab. The user can intuitively grasp the content and can generate the parameter candidates in a shorter period of time by sectionalizing the classification and the item belonging to each classification by such a display mode.

In the dialogue 420A, the adjustment target field 438, the current value field 436, a fluctuation start value field 441, a fluctuation end value field 443, and the step field 444 can be arbitrarily set by the user, and the fluctuation minimum value field 440 and the fluctuation maximum value field 442 are set with a fixed value determined under the condition defined in advance. Therefore, in the dialogue 420A, the items that can be arbitrarily set by the user are further expressed in a different display mode to indicate the same. In other words, the fluctuation minimum value field 440 and the fluctuation maximum value field 442 are expressed in the display mode same as the corresponding classification field 417 and the item field 434, whereas the adjustment target field 438, the current value field 436, the fluctuation start value field 441, the fluctuation end value field 443, and the step field 444 are expressed in the display mode different from the corresponding classification field 417 and the item field 434.

The changes 2 and 3 aim to perform a more efficient setting by selectively displaying only the necessary items according to the needs of the user.

In other words, either "standard" or "detailed" can be selected with the radio button 427, where only the item assumed in advance as being set a relatively great number of times is displayed when the "standard" is selected, and all items that can be set are displayed when the "detailed" is selected. For instance, in normal use, the user selects "standard" and sets the parameter as the fluctuation target for items having high usage frequency. When sufficient results cannot be obtained in the normal setting or the experienced user and the like selects "detailed" and sets the parameter as the fluctuation target for items necessary depending on the situation.

For instance, FIG. 15A shows a case in which the "standard" display mode is selected, and FIG. 15B shows a case in which the "detailed" display mode is selected. As apparent from comparison between these figures, the item that is not displayed in the dialogue 420A shown in FIG. 15A is selectably displayed in the dialogue 420A shown in FIG. 15B.

The checkbox 429 then accepts the selection on whether or not to selectively display only the item given a check to the adjustment target field 438. In other words, when the checkbox 429 is selected, only the items given a check to the adjustment target field 438 are displayed.

For instance, FIG. 15A shows a case in which the adjustment target field 438 is not checked (invalidated), and FIG. 15C shows a case in which the adjustment target field 438 is checked (validated). As apparent from comparison between these figures, only the items given a check to the adjustment target field 438 of the items displayed in the dialogue 420A shown in FIG. 15A are selectably displayed in the dialogue 420A shown in FIG. 15C.

The radio button 427 and the checkbox 429 each function as one type of filter independent from each other. Thus, the item selected according to the selection at the radio button 427 is determined, and then the item to be displayed is further extracted according to the presence of check in the checkbox 429.

Furthermore, in the dialogue 420A, an explanation display 435 on the items selected by the user may be displayed. With such an explanation display 435, the user can more easily grasp the technical meaning and the like of the selected items.

(3. Evaluation Result)

Figure 16:
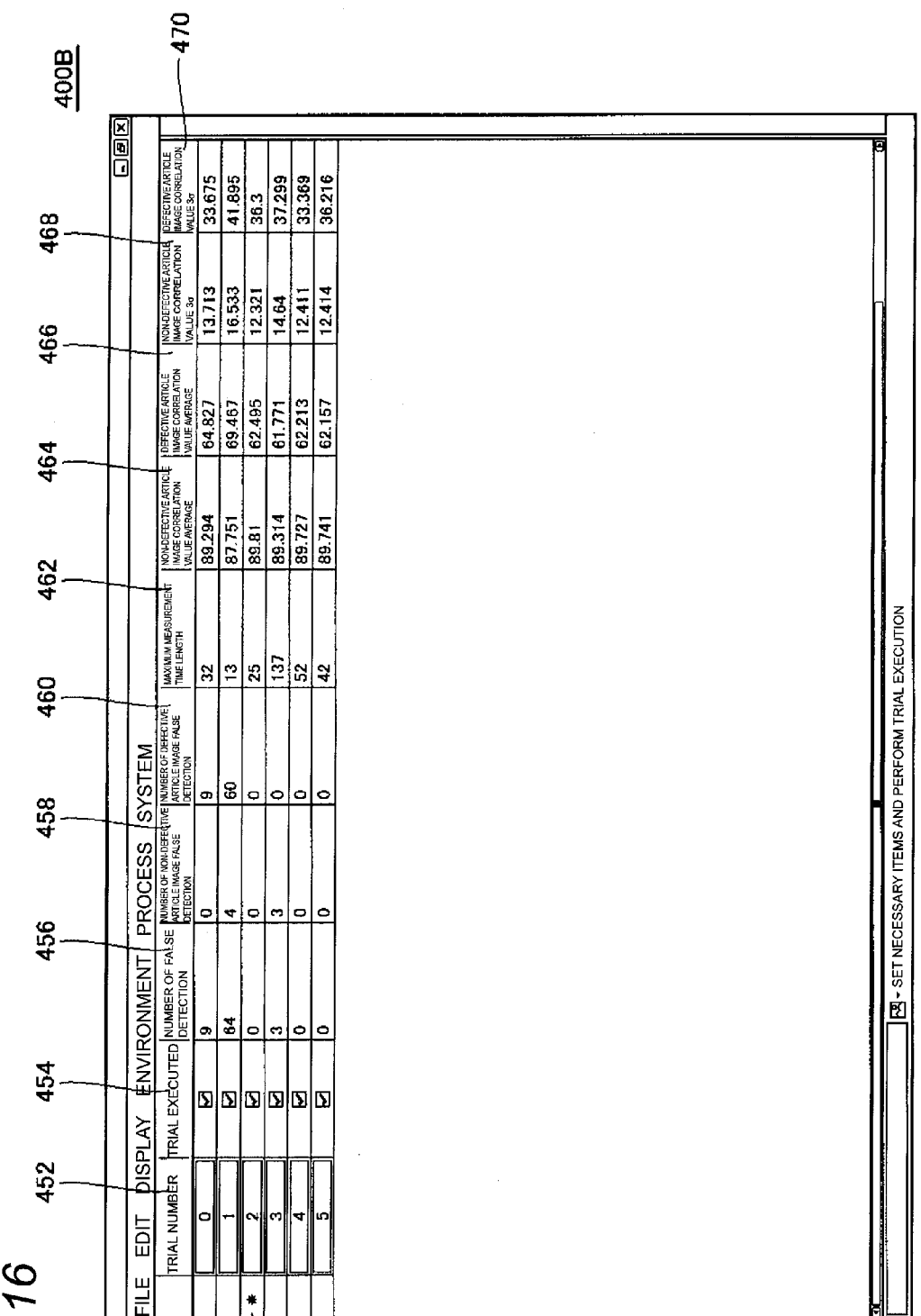
FIG. 16 is a view showing one example of a user interface in the parameter determination assisting device according to the embodiment of the present invention.

FIG. 16 shows an evaluation result screen 400B displayed when all trials are completed. FIG. 16 show a result that all trials are completed, but in place of a mode of displaying the results all at once after the completion of the trials, the frame itself may be displayed at the start and the corresponding numerical value may be sequentially displayed along with the progress of the trial.

In the evaluation result screen 400B, the evaluation result is output for each of the parameter candidates. More specifically, in the evaluation result screen 400B, a table including a trial number field 452, a trial executed field 454, a false detection field 456, a non-defective article image false detection field 458, a defective article image false detection field 460, a maximum measurement time length field 462, a non-defective article image correlation value average field 464, a defective article image correlation value average field 466, a non-defective article image correlation value 3σ field 468, and a defective article image correlation value field 470.

In the trial number field 452, the trial number assigned to each parameter candidate generated beforehand is displayed in ascending order. In the trial executed field 452, a checkbox indicating whether or not the trial on the corresponding parameter candidate is executed is displayed.

Displayed in the false detection field 456, the non-defective article image false detection field 458, and the defective article image false detection field 460 is a total number of falsely detected evaluation results out of the evaluation results on the corresponding parameter candidates. More specifically, the total number of non-defective article image falsely determined as "defective article" is displayed in the non-defective article image false detection field 458, and the total number of defective article image falsely determined as "non-defective article" is displayed in the defective article image false detection field 460. The value of the sum of two of the number of false detections is displayed in the false detection field 456.

In the maximum measurement time length field 462, the maximum value of the processing time length measured at the trial execution stage on each parameter candidate is displayed. This processing time length is measured in the assisting device 100, and is not equal to the time length actually measured in the image processing device 200 but corresponds to the processing time length assumed to be required to generate the image processing result in the image processing device 200. The time length displayed in the maximum measurement time length field 462 becomes an index for taking into consideration the tact time and the like of the actual production line when selecting an optimum parameter from the parameter candidates.

In the non-defective article image correlation value average field 464, the defective article image correlation value average field 466, the non-defective article image correlation value 3σ field 468, and the defective article image correlation value 3σ field 470, a statistical output value on the degree of similarity (correlation value) measured as the characteristic amount for the respective image data is displayed. In other words, an average value of the entire correlation value measured for a plurality of input non-defective article images is displayed in the non-defective article image correlation value average field 464, and an average value of the entire correlation value measured for a plurality of input defective article images is displayed in the defective article image correlation value average field 466. Furthermore, a 3σ value indicating the degree of variation of the entire correlation value measured for a plurality of input non-defective article images is displayed in the non-defective article image correlation value 3σ field 468, and a 3σ value indicating the degree of variation of the entire correlation value measured for a plurality of input defective article images is displayed in the defective article image correlation value 3σ field 470.

In the evaluation result screen 440B, the parameter candidate in which the characteristic amount contained in the corresponding processing result group is relatively high out of the parameter candidates is output in a mode different from other parameter candidates. In the example shown in FIG. 16, an asterisk mark 453 is displayed for the trial number "2" in which the non-defective article image correlation value average is the highest.

The item shown in FIG. 16 is that in which the characteristic amount and the like calculated by a typical search item is reflected, where the displayed item is increased and decreased depending on the content of image processing.

As shown in FIG. 16, the user can easily select the optimum parameter set when the determination result and the statistical output are displayed in a list for each of a plurality of parameter candidates subjected to trial. For instance, in the example shown in FIG. 16, although a stable process can be performed in the trial numbers "2", "4", and "5" in which the number of false detection is zero, the processing time length is the shortest in the trial number "2", and thus comprehensively, the parameter set of trial number "2" can be said as optimum.

When the user operates the mouse 104 and the like to input the trial number of the determined parameter candidate after the optimum parameter set is determined, and then pushes the button 412 (FIG. 11), the content of the selected parameter is reflected on the image processing device 200.

Through the series of procedures, the user can more rapidly and easily determine the parameter of the image processing device 200.

If the lot number, the date and time, and the like are added as the expected result, the determination result may be statistically analyzed in units of lots or time.

(4. Detailed Evaluation Result I)

Figure 18A:
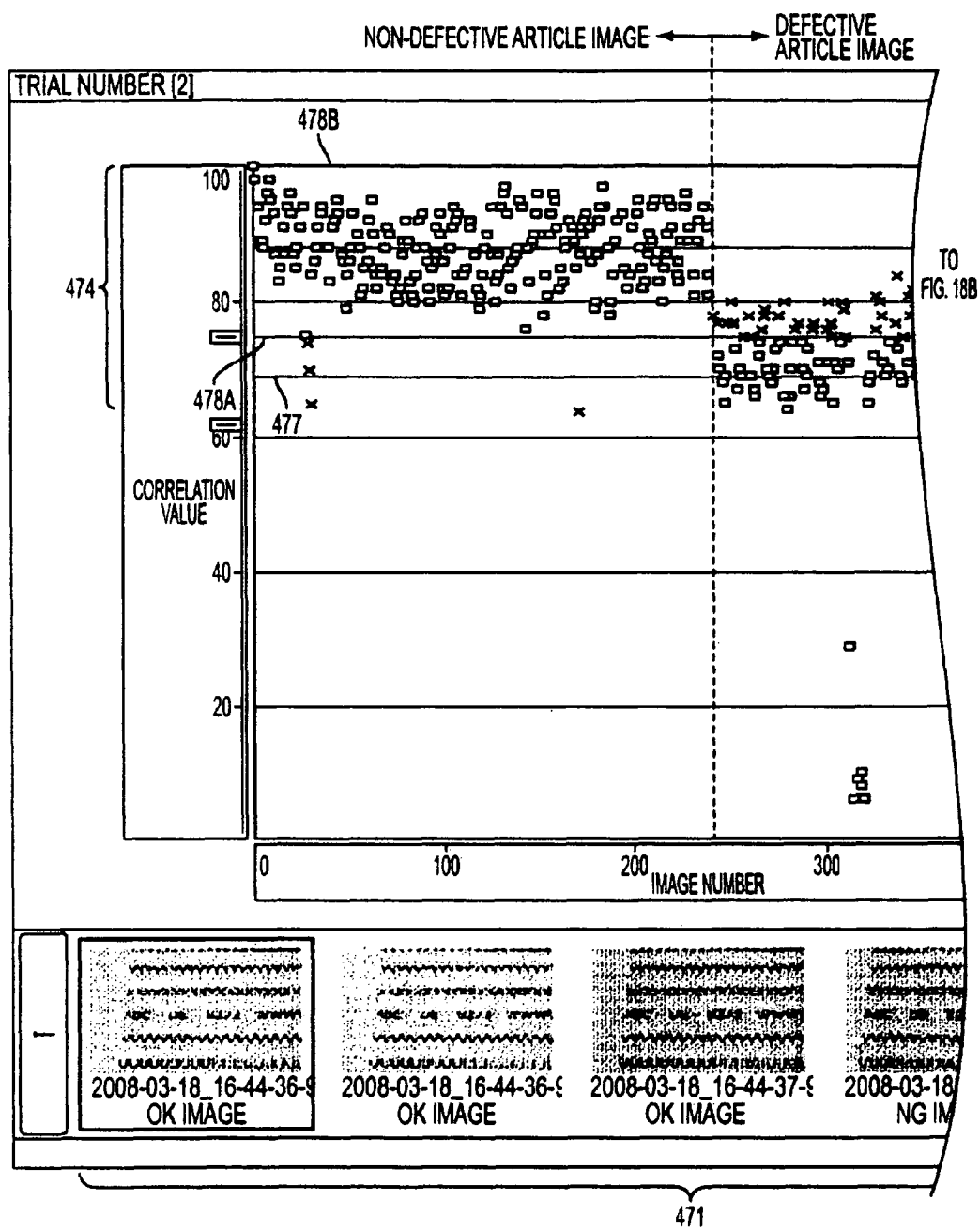
FIGS. 18A and 18B are views showing one example of a user interface in the parameter determination assisting device according to the embodiment of the present invention.
Figure 18B:
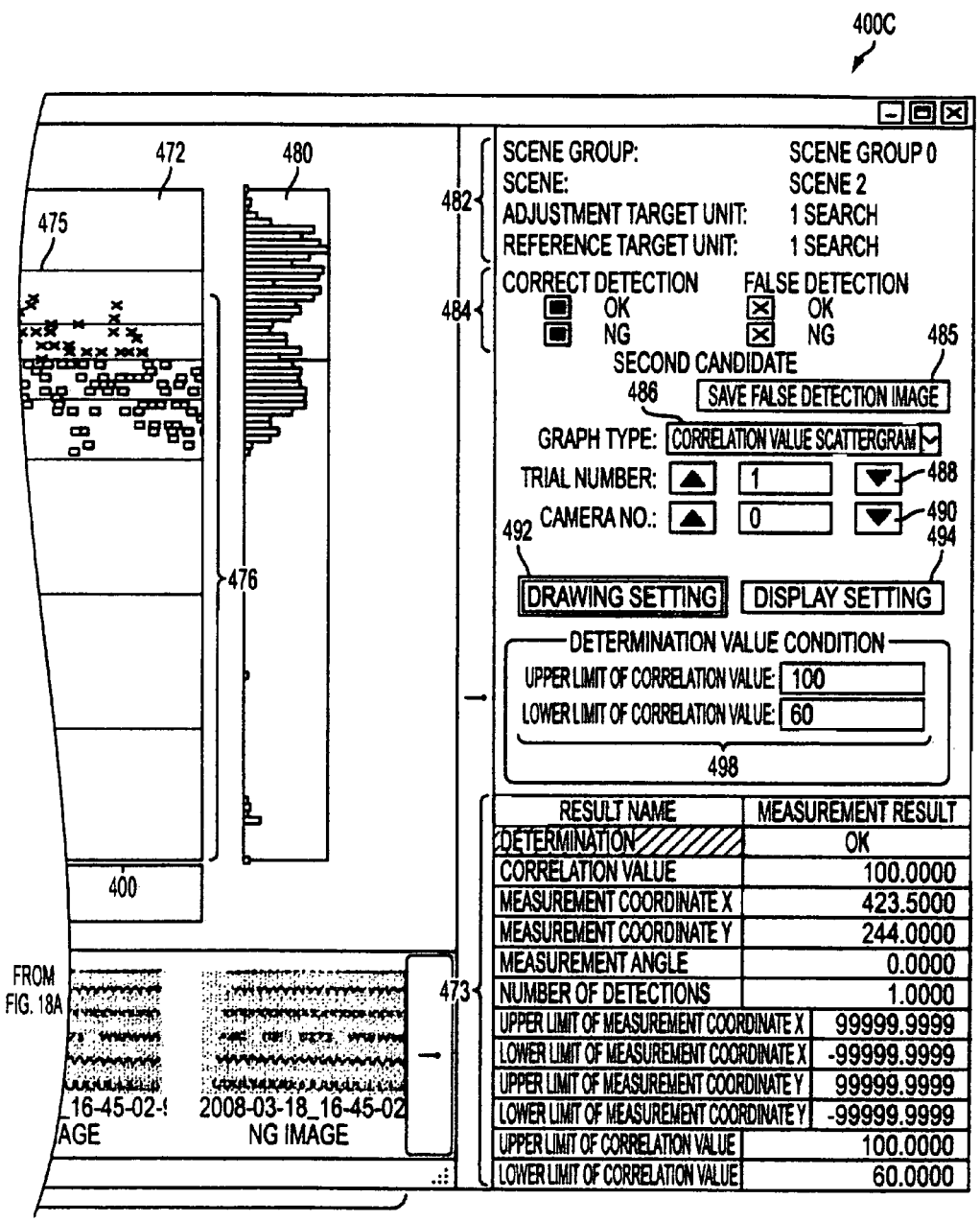
Figure 19A:
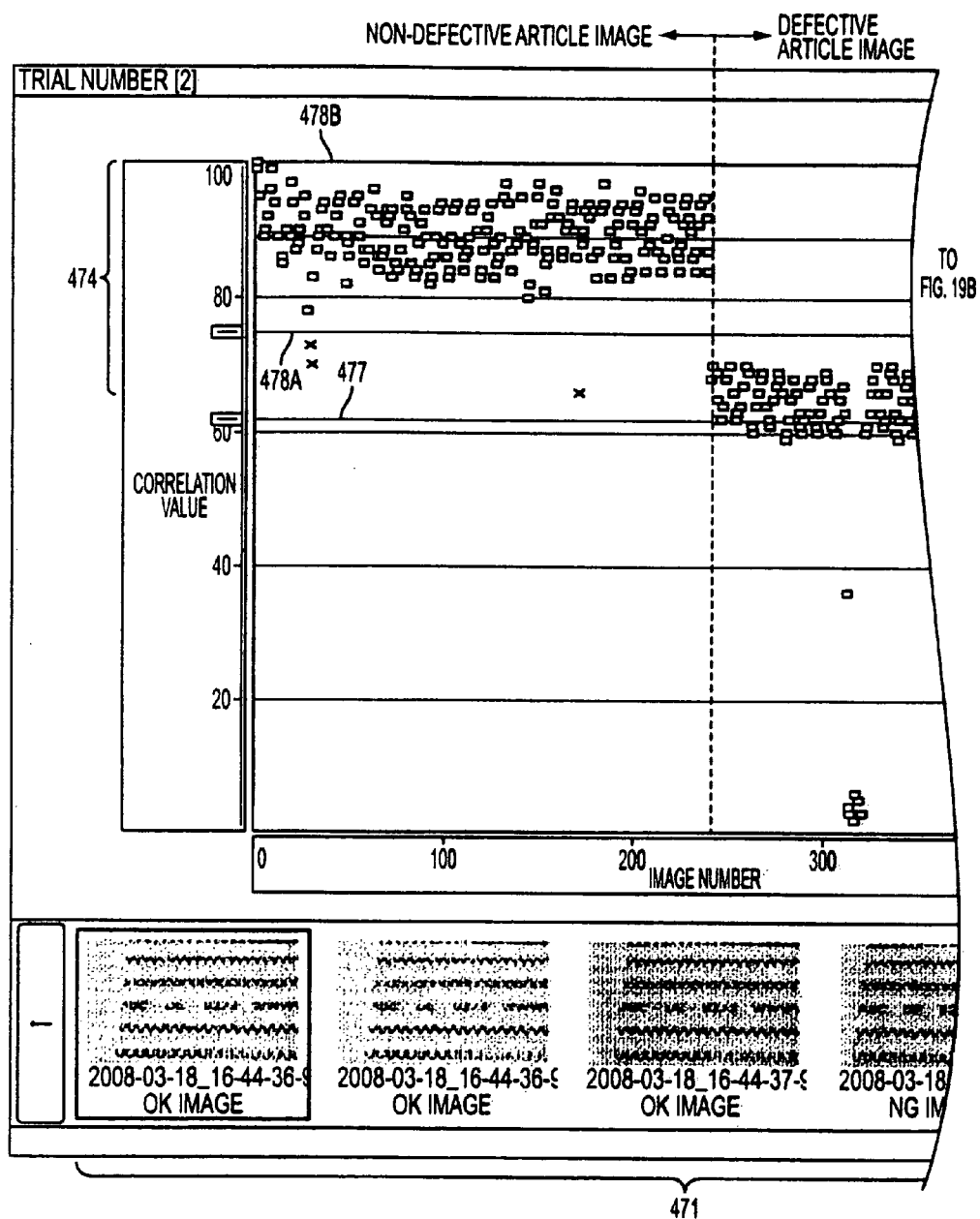
FIGS. 19A and 19B are views showing one example of a user interface in the parameter determination assisting device according to the embodiment of the present invention.
Figure 19B:
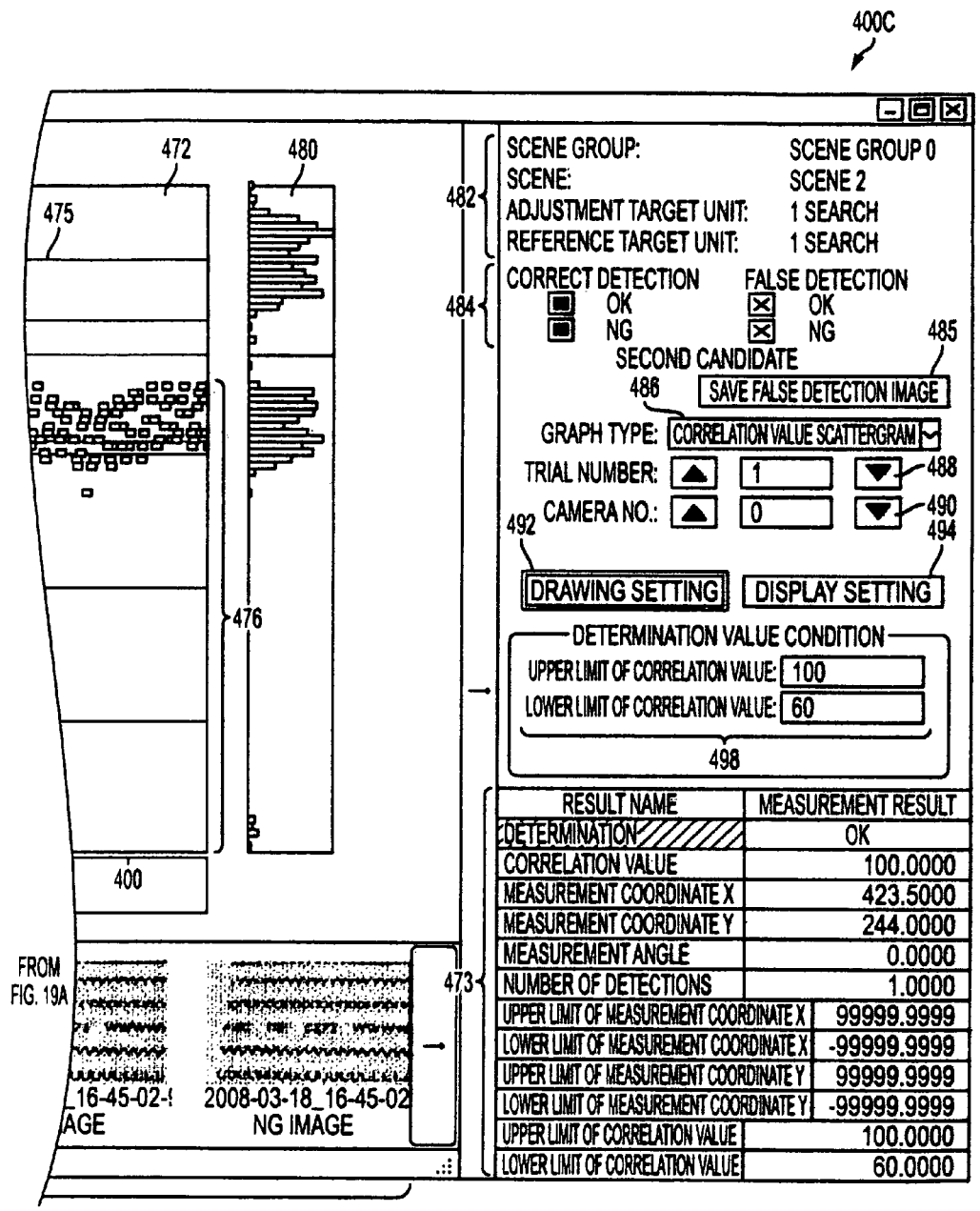

The assisting device 100 according to the present embodiment may display the detailed evaluation result on the parameter candidate. When the user selects one of the values of the trial number field 452 by operating the mouse 104 and the like on the screen shown in FIG. 16, screens shown in FIGS. 17 to 19 are displayed.

Figure 17A:
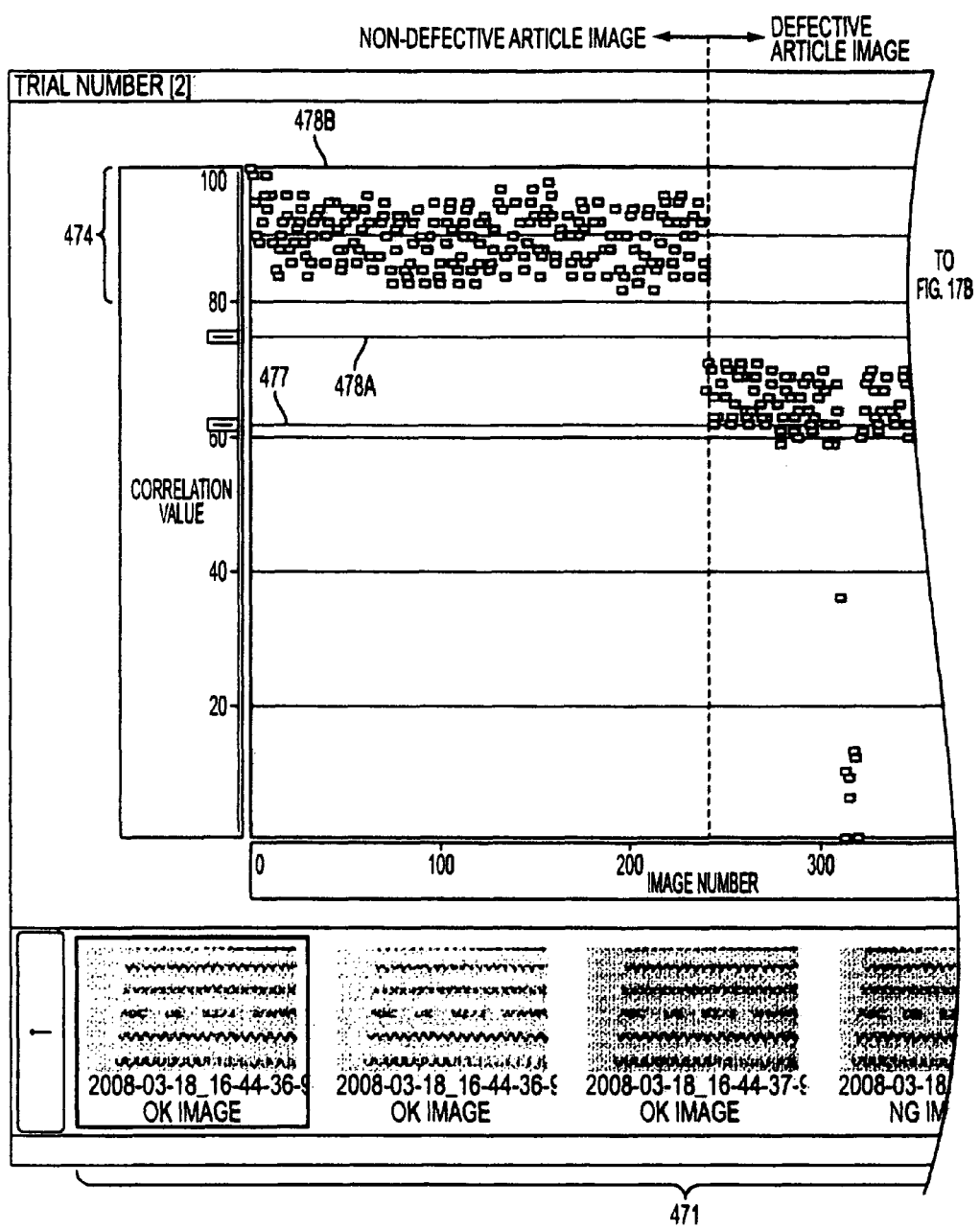
FIGS. 17A and 17B are views showing one example of a user interface in the parameter determination assisting device according to the embodiment of the present invention.
Figure 17B:
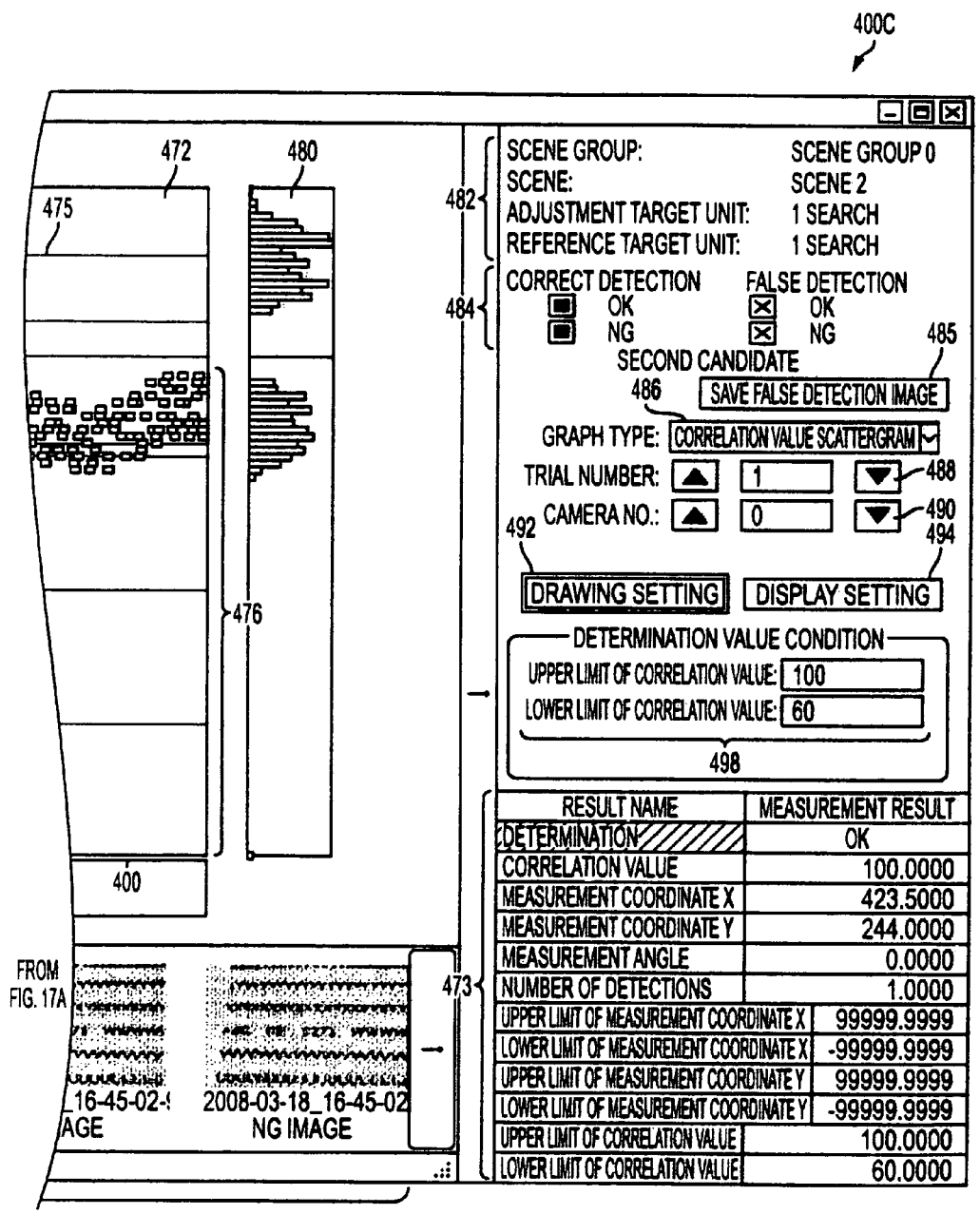

FIG. 17 shows a detailed result screen 400C showing the detailed evaluation result of the trial number "2" shown in FIG. 16. With reference to FIG. 17, a scattergram 472 showing the distribution of the degree of similarity (correlation value), which is the characteristic amount calculated for the selected parameter candidate, is displayed in the detailed result screen 400C. The scattergram is a graph having an image number on the horizontal axis and a correlation value on the vertical axis. The image number is a number assigned in order to the input image data to identify the input image data. FIG. 17 shows one example of a result when 437 image data are input.

In the scattergram 472, the display mode is differed according to matching/non-matching of the processing result (determination on "non-defective article" or "defective article") based on the correlation value of each image data and the corresponding expected result.

More specifically, the correlation value is plotted with the "■" mark for those in which the processing result for the non-defective article image is "non-defective article" (OK), that is, for those in which the processing result and the expected result match. The correlation value is plotted with the "x" mark for those in which the processing result for the non-defective article image is "defective article" (NG), that is, for those in which the processing result and the expected result do not match. Similarly, the correlation value is plotted with the "■" mark for those in which the processing result for the defective article image is "defective article" (NG), that is, for those in which the processing result and the expected result match. The correlation value is plotted with the "x" mark for those in which the processing result for the defective article image is "non-defective article" (OK), that is, for those in which the processing result and the expected result do not match.

To clarify if the determination result is based on the non-defective article image or the defective article image, the color is desirably differed for the same "■" mark or the "x" mark so that the user can easily determine which false detection.

Furthermore, in the scattergram 472, the width of the minimum value and the maximum value of the correlation value measured for the non-defective article image is displayed as a colored band 474 to represent the degree of variation of the entire correlation value measured for the non-defective article image and the defective article image. With the band 474, the average value of the correlation values is displayed as an indication line 475 for a representative value of the correlation values measured for the non-defective article image. Similarly, the width of the minimum value and the maximum value of the correlation values is displayed as a colored band 476 for a representative value of the correlation values measured for the defective article image, and the average value of the correlation values measured for the defective article image is displayed as an indication line 477.

When such a statistical output is displayed in the same graph as the correlation value, to what extent of identification likelihood is present between the characteristic amount measured for the non-defective article image and the characteristic amount measured for the defective article image can be grasped at one glance.

Furthermore, in the scattergram 472, a threshold value (threshold range) serving as a condition for determining whether the "non-defective article image" or the "defective article image" is displayed for the correlation value measured from each image data. Specifically, an indication line 478A indicating the lower threshold value of the correlation value and an indication line 478B indicating the upper threshold value of the correlation value are displayed as threshold values to be determined as "non-defective article" in correspondence to the scattergram 472.

As shown in FIG. 17, the parameter itself related to the process for measuring the characteristic amount is judged as appropriate if the fluctuation range (band 474) of the characteristic amount measured from the non-defective article image and the fluctuation range (band 476) of the characteristic amount measured from the defective article image do not overlap at all on the axis of the characteristic amount (correlation value). If false detection nonetheless occurs, judgment is made that the setting of the threshold value is inappropriate. For instance, the lower threshold value of the correlation value is set to "75%" in FIG. 17, where the defective article image is judged as "non-defective article" if the lower threshold value of the correlation value is set to "60%".

In such a case, only the condition for determining whether the "non-defective article" or the "defective article" needs to be changed, and the characteristic amount does not need to be again measured from the image data. Thus, in the scattergram 472 shown in FIG. 17, the threshold value (threshold range) is configured to be arbitrary changeable by the user. In other words, the user can change the indication line 478A and the indication line 478B along the axis of the correlation value by operating the mouse 104 and the like.

When the threshold value (threshold range) is changed in such a manner, the assisting device 100 compares the respective characteristic amount measured by the trial executed beforehand with the threshold value of after the change to re-execute the determination on whether the "non-defective article" or the "defective article". The determination result obtained by such re-execution is reflected on the scattergram 472, and the display content of the scattergram 472 is updated.

On the contrary, FIG. 18 shows the detailed result screen 400C showing the detailed evaluation result of the trial number "1" shown in FIG. 16, and FIG. 19 shows the detailed result screen 400C showing the detailed evaluation result of the trial number "3" shown in FIG. 16. In trial numbers "1" and "3", a relatively large number of false detection occurs. In the scattergram 472 shown in FIGS. 18 and 19, the fluctuation range (band 474) of the correlation value measured from the non-defective article image and the fluctuation range (band 476) of the correlation value measured from the defective article image are partially overlapped on the axis of the correlation value. Thus, the correlation value existing at the overlapping portion does not separate regardless of how the threshold value is set. Therefore, in such a case, the parameter itself related to the process for measuring the characteristic amount is judged as inappropriate.

Again referring to FIG. 17, a histogram 480 of the characteristic amount (correlation value) is also displayed in the detailed result screen 400C in correspondence to the axis of the characteristic amount (correlation value) of the scattergram 472. The histogram 480 represents the frequency of the measured characteristic amount that exists in each zone for every zone where the correlation value is sectionalized by a predetermined range. With such a histogram 480, the degree of variation of the entire measured correlation value can be checked from a different standpoint.

In the detailed result screen 400C, a control region for changing the display mode of the scattergram 472 and the histogram 480 is provided. More specifically, an area 482 for displaying information related to the result being displayed is provided. Furthermore, an area 484 for performing display and change of the mark displayed in the scattergram 472 is provided. In such an area 484, a list of contents and marks used is displayed such as a mark of a case where the processing result for the non-defective article image is "non-defective article" (OK) and a mark of a case where the processing result for the defective article image is "non-defective article" (OK). Furthermore, the assignment of the mark used can be arbitrary changed by the user.

A button 485 for saving the false detection image is provided, where when such a button 485 is pushed, the image in which false detection occurred is saved to be used to investigate the cause of occurrence etc. of the false detection. The image data used in the trial is preview displayed at the lower level 471 of the detailed result screen 400C.

Graphs other than the scattergram 472 can be displayed by a pull-down menu 486. As hereinafter described, FIGS. 20 to 23 show an example displaying a coordinate distribution diagram. The trial number to be displayed can be set by a numerical box 488, and a retrieving destination of the image data can be set by a numerical box 490.

Furthermore, a button 492 for performing a drawing setting of the scattergram 472 and a button 494 for performing a display setting are arranged. When the button 492 is selected, a dialogue (not shown) etc. for changing such that indication lines 475 and 477 indicating the representative value of the measured correlation value indicate an intermediate value etc. and not the average value of the correlation values measured from the respective image data is displayed. When the button 494 is selected, a dialogue (not shown) etc. for changing such that the bands 474 and 476 indicate a variance width (3a and 5a) measured from the respective image data etc. and not the variation of the measured correlation values is displayed. The histogram 480 may be non-displayed.

The range of the horizontal axis of the scattergram 472 can also be set. More specifically, when the user inputs an image number to be displayed as the scattergram 472, only the correlation value measured from the image data corresponding to the specified image number is displayed in the scattergram 472. Furthermore, selective display such as only the correctly detected result or only the falsely detected result may be carried out.

In the above description, a configuration in which the threshold value (threshold range) is changed by the mouse operation on the indication line 478A and/or 478b displayed on the scattergram 472 has been illustrated, but numerical values may be directly input to the numerical box 498.

A box 473 for numerically displaying the value of each item of the measurement result is also displayed in the detailed result screen 400C.

(5. Detailed Evaluation Result II)

In the search process shown in FIGS. 6 and 7, the measurement range can be set as a condition for determining as matching with the registered model ("OK") (see determination condition setting area 320 of FIG. 7). In such a case, the user can appropriately set the measurement range or the determination condition according to the displayed processing result by displaying the processing result in correspondence to the measurement range. A display example of the detailed evaluation result in such a case will be described below.

Figure 20A:
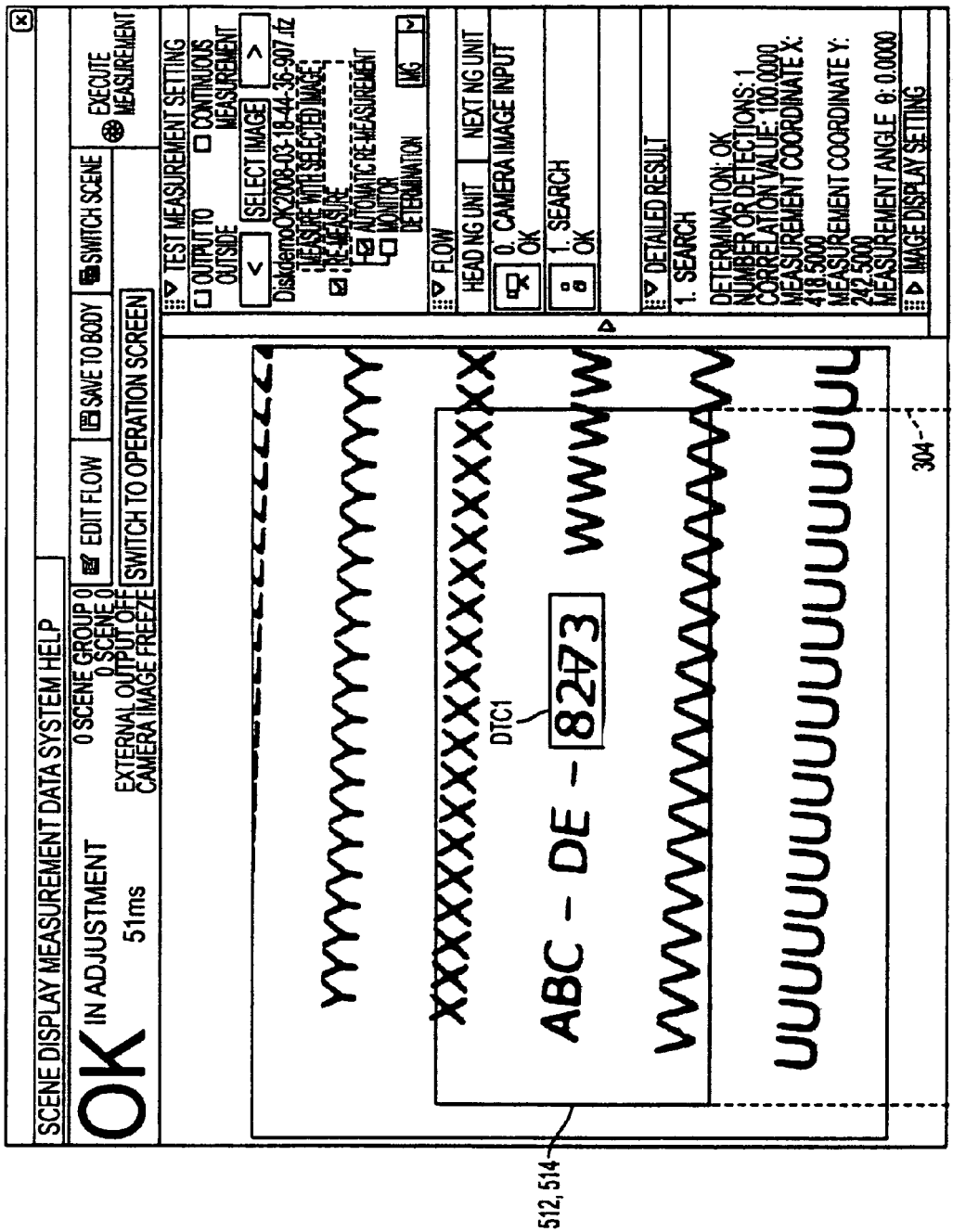
FIGS. 20A and 20B are views showing one example of a user interface in the parameter determination assisting device according to the embodiment of the present invention.

FIG. 20A shows a screen display example in the operation mode when the setting related to the search process is performed on the setting screen 300A shown in FIGS. 6 and 7. In the example shown in FIG. 20A, the model MDL including the character string "8273" is registered in advance, and the result of performing the search process on the model MDL is displayed for the image data acquired by the imaging unit 8. In the example shown in FIG. 20A, the search range 512 and the measurement range 514 or the determination condition are assumed to be set to the same range. The search range 512 is a target region for judging the matching with the model MDL registered in advance, that is, whether or not the region having the highest degree of similarity (correlation value) with the model MDL. The measurement range 514 is a threshold range for judging whether or not the range extracted as a region having the highest degree of similarity (correlation value) with the model is valid.

In other words, when the region having the highest degree of similarity (correlation value) with the model MDL is extracted at any position of the search range 512, determination is made as matching with the registered model ("OK") if the extracted position is within the measurement range. For instance, as a specific application example, whether or not a label of an appropriate content is attached in the production line and the like for attaching a label to a target product can be judged based on whether or not a region having the highest degree of similarity (correlation value) with the model MDL is extracted, and then whether or not the label is attached to an appropriate position can be judged based on whether or not the extracted position is within the measurement range. Thus, the search range 512 and the measurement range 514 may not necessarily need to be matched, and at least the search range 512 needs to be set larger than the measurement range 514.

Therefore, in the above-described search process, the position where a region having the highest degree of similarity (correlation value) with the model MDL registered in advance is extracted is preferably displayed two-dimensionally. In the assisting device 100 according to the present embodiment, a coordinate distribution diagram as shown in FIG. 20B can be displayed.

Figure 20B:
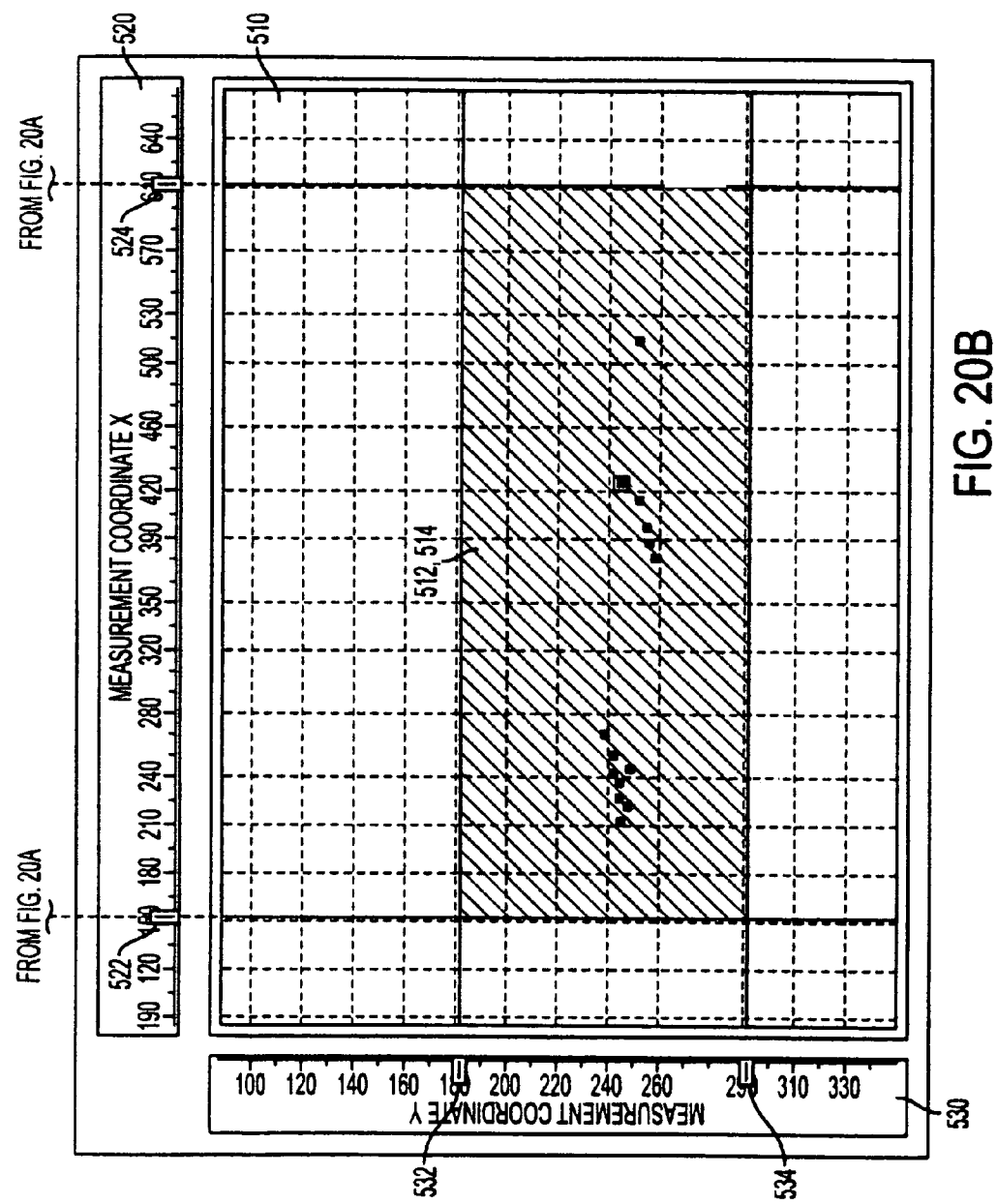

In the coordinate distribution diagram shown in FIG. 20B, the search range 512 set in the target search process is displayed in association with the two-dimensional coordinate 510 (in this example, measurement coordinate X and measurement coordinate Y) in correspondence to the image data input from the imaging unit 8. Specifically, a frame corresponding to the set search range 512 is shown on the two-dimensional coordinate 510. Furthermore, the measurement range 514 set in the target search process is also displayed on the two-dimensional coordinate 510. In FIG. 20B, a case in which the search range 512 and the measurement range 514 are set to the same range is shown.

With regards to the measurement range 514, indication lines 522 and 524 for defining the range in the left and right direction of the plane of drawing, and indication lines 532 and 534 for defining the range in the up and down direction of the plane of drawing are displayed in association. More specifically, a scale 520 indicating the position in the left and right direction is displayed, and a handle for operating the indication lines 522 and 524 is displayed on the upper side of the plane of drawing of the two-dimensional coordinate 510. A scale 530 indicating the position in the up and down direction is displayed, and a handle for operating the indication lines 532 and 534 is displayed on the left side of the plane of drawing of the two-dimensional coordinate 510. When the user operates one of the handles, the measurement range 514 changes according to the operation. One example of the detailed result screen 500 is shown in FIGS. 21 to 23.

Figure 21A:
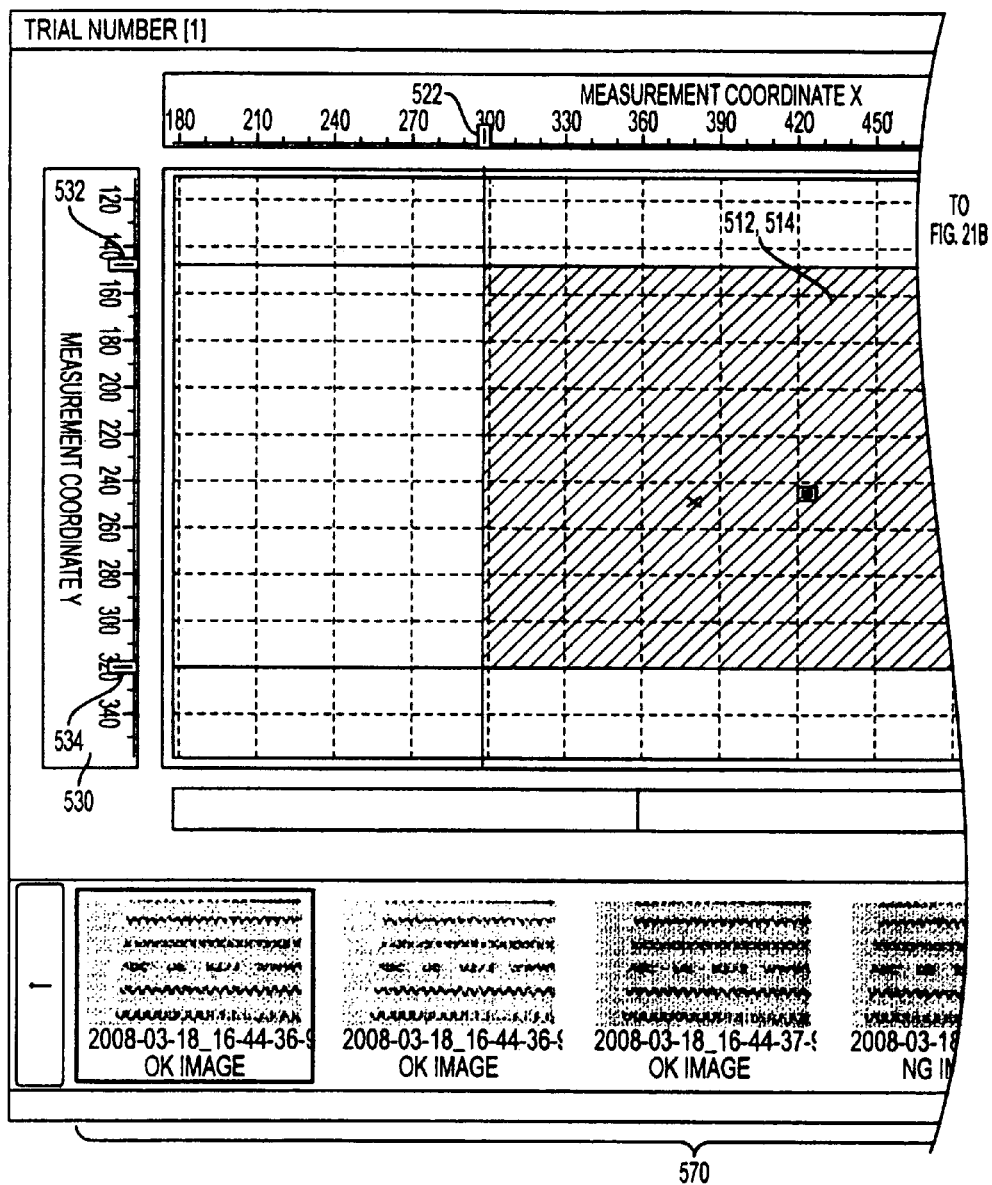
FIGS. 21A and 21B are views showing one example of a user interface in the parameter determination assisting device according to the embodiment of the present invention.
Figure 21B:
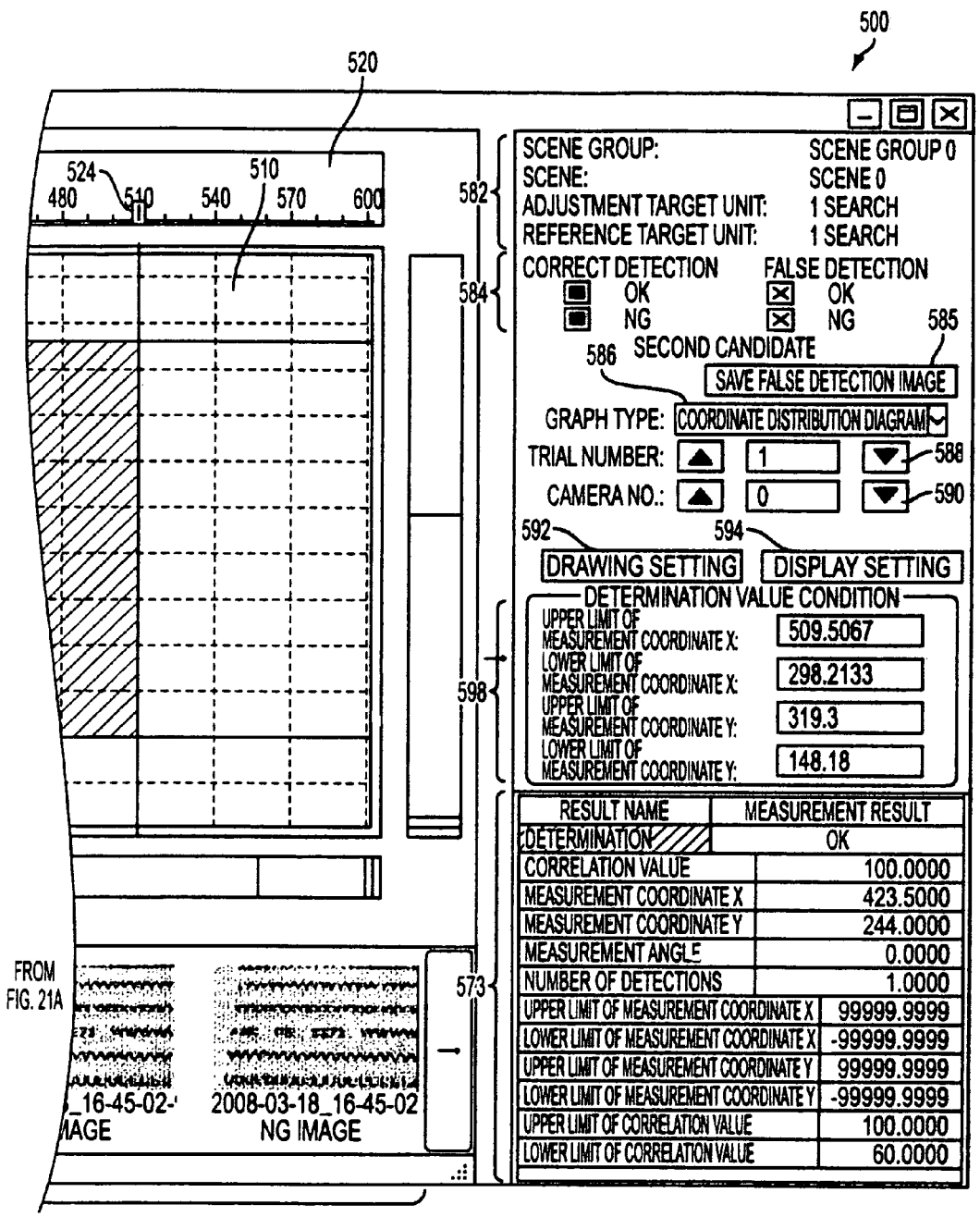

FIG. 21 shows one example of a detailed result screen 500 including the coordinate distribution diagram shown in FIG. 20A. In the coordinate distribution diagram, the position of the region extracted as having the highest degree of similarity (correlation value) with the model MDL registered in advance is plotted, and display is made in different modes according to matching/non-matching of the processing result (determination on "non-defective article" or "defective article") based on the correlation value of each image data and the corresponding expected result, similar to the detailed result screen 400C shown in FIG. 17. In other words, the extracted position is plot displayed on the two-dimensional coordinate using the "■" mark or the "x" mark. To clarify if the determination result is based on the non-defective article image or the defective article image, the color is desirably differed for the same "■" mark or the "x" mark so that the user can easily determine which false detection.

In the detailed result screen 500 shown in FIG. 21, the ranges of the search range 512 and the measurement range 514 are displayed on the common two-dimensional coordinate. When the user operates one of the indication lines 522, 524, 532, and 534, the current value of the measurement range 514 or the determination condition is changed and the range of the measurement range 514 of after the change is displayed on the two-dimensional coordinate.

Figure 22A:
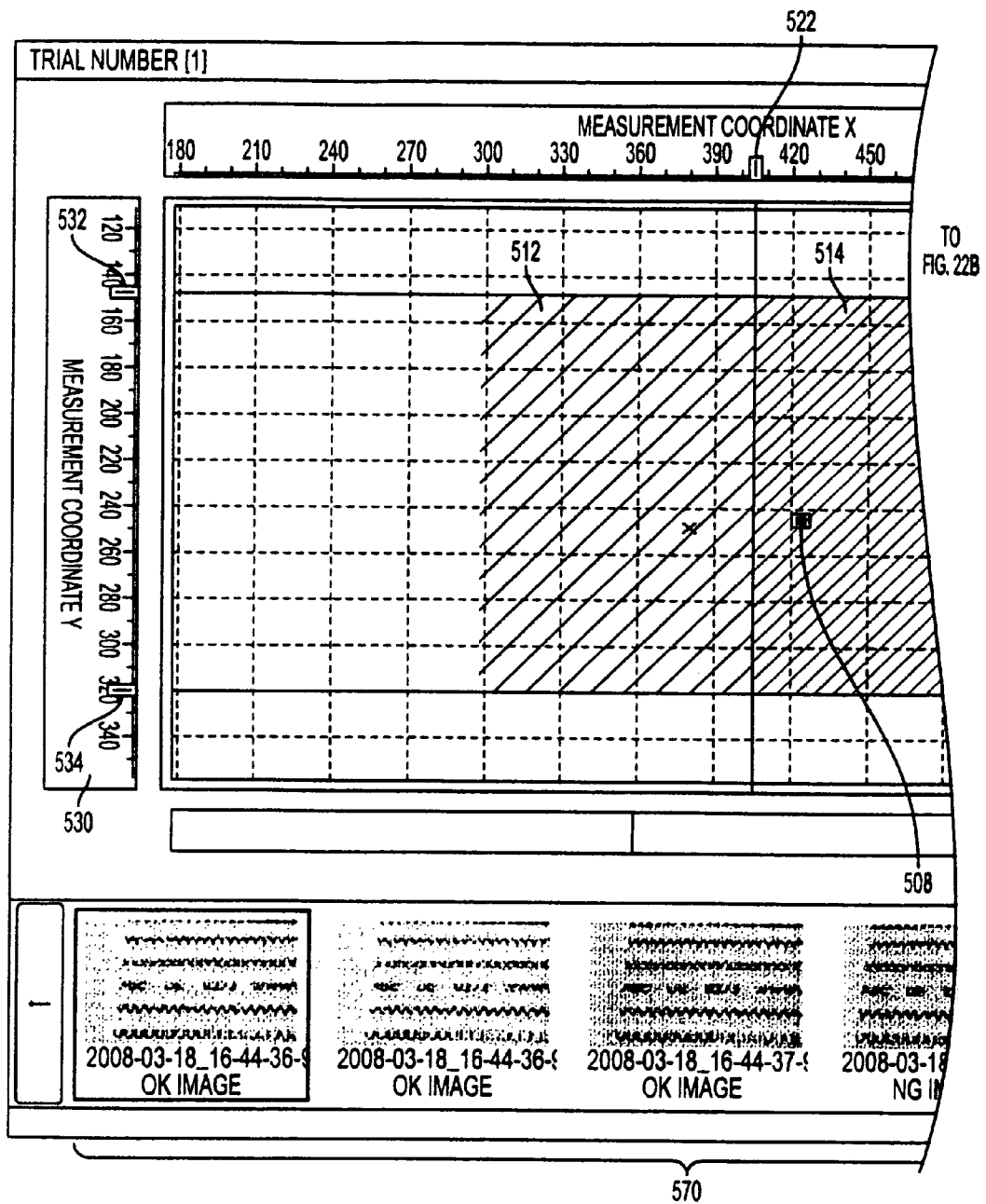
FIGS. 22A and 22B are views showing one example of a user interface in the parameter determination assisting device according to the embodiment of the present invention.
Figure 22B:
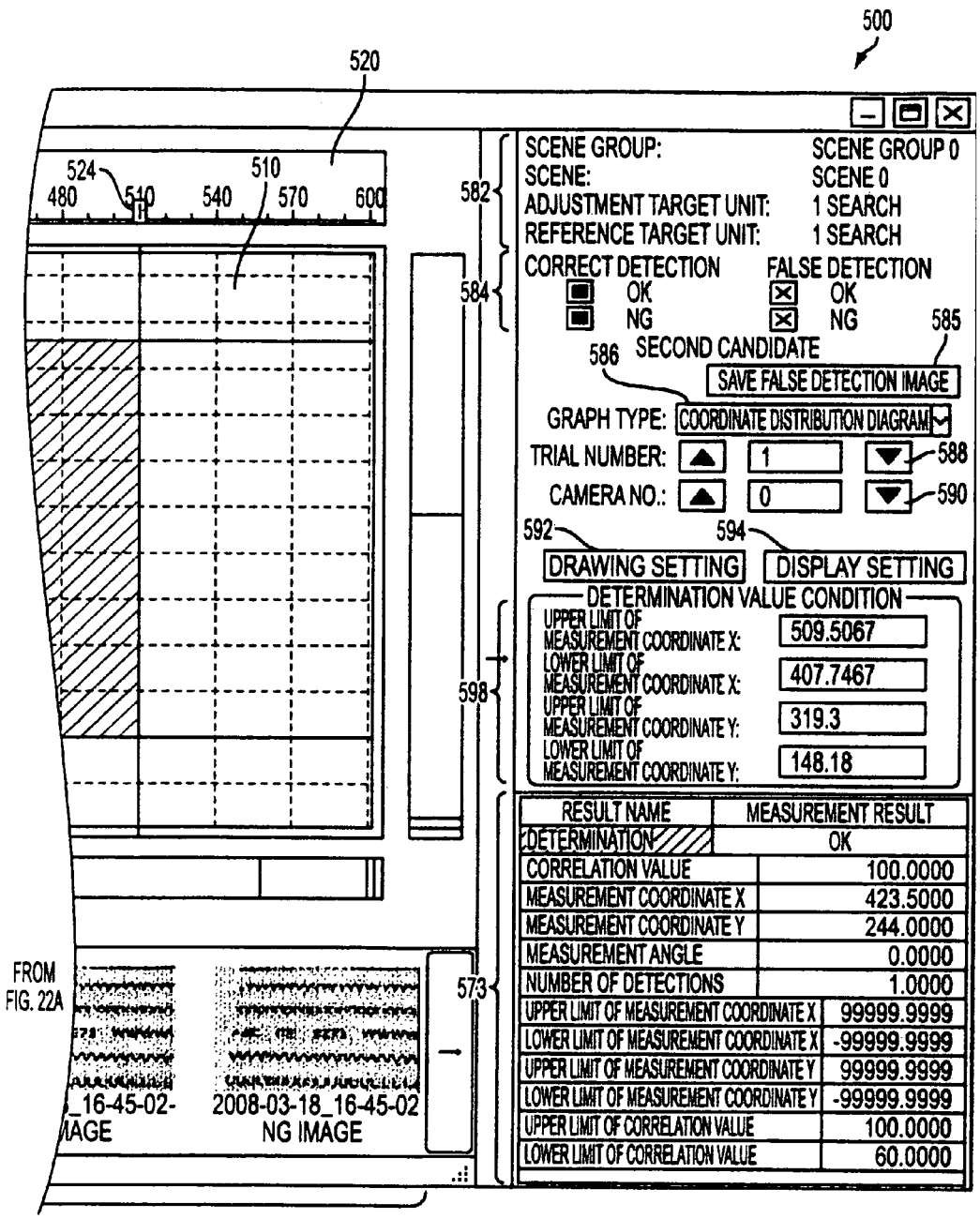
Figure 23A:
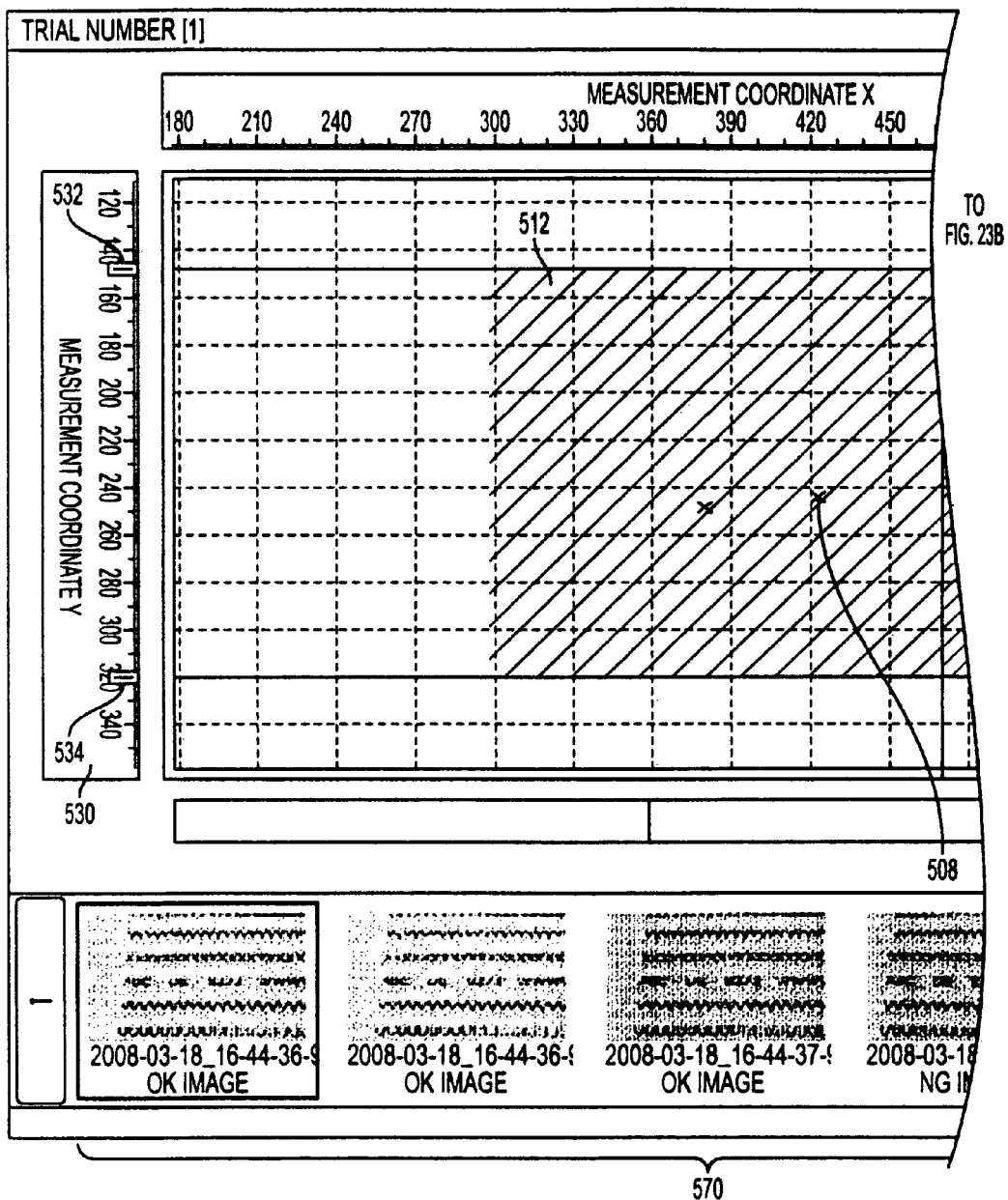
FIGS. 23A and 23B are views showing one example of a user interface in the parameter determination assisting device according to the embodiment of the present invention.
Figure 23B:
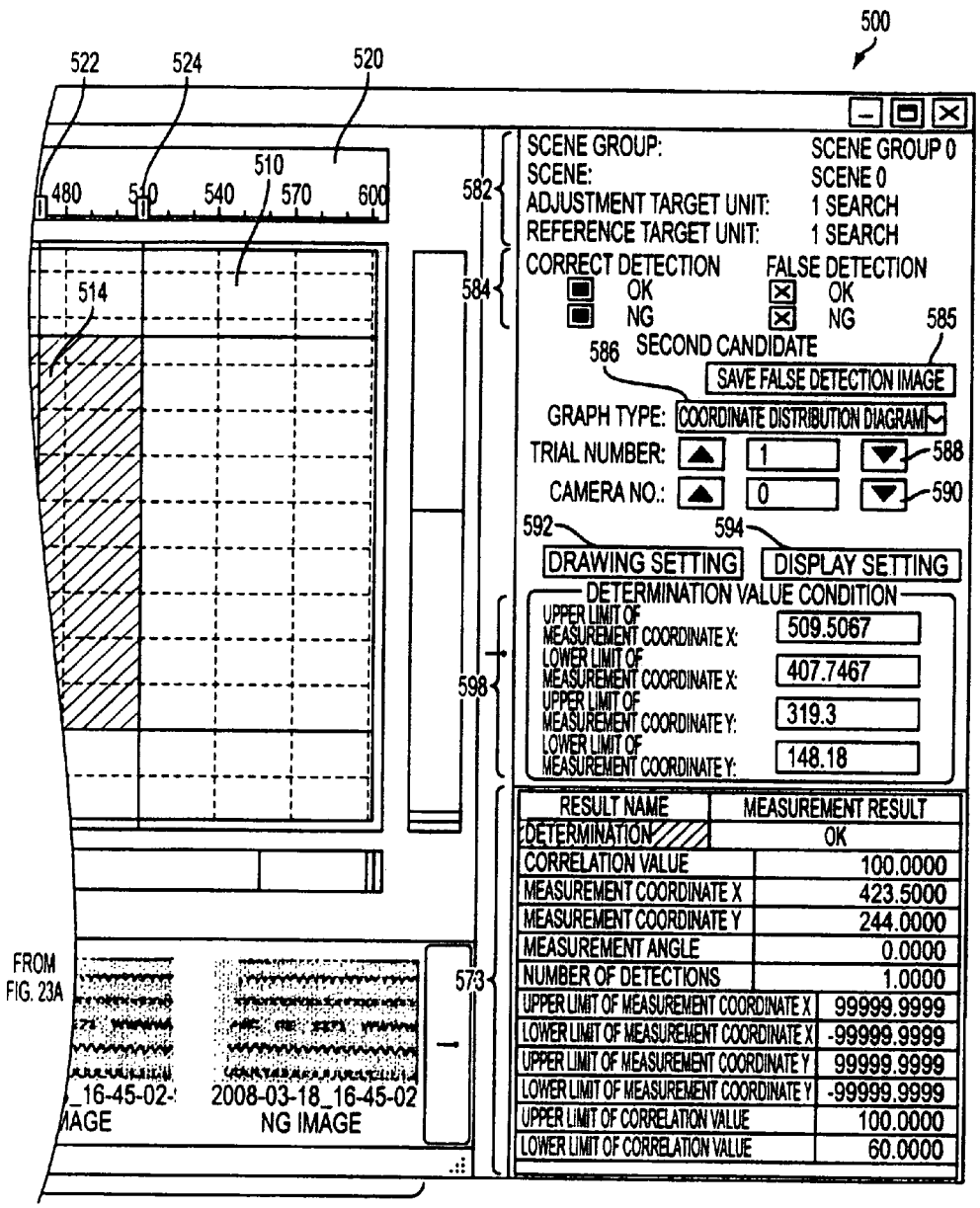

For instance, FIG. 22 shows a state in which the user operates the indication line 522 to reduce the range in the left and right direction in the plane of drawing of the measurement range 514. A state in which the user further operates the indication line 522 to further reduce the range in the left and right direction in the plane of drawing of the measurement range 514 is shown in FIG. 23.

As apparent from comparison between FIGS. 22 and 23, for the processing result 508 positioned near the center of the search range 512, judgment is made as "non-defective article" (OK) if the measurement range 514 is relatively wide, but judgment is made as "defective article" (NG) if the measurement range 514 is relatively narrow. Accompanied therewith, the display is also changed from the "■" mark to the "x" mark.

The user sets the measurement range 514 or the determination condition to an appropriate range while looking at the processing result displayed on the two-dimensional coordinate. In other words, the user adjusts the measurement range 514 so that the number of false detections becomes zero or becomes fewer.

A value indicating the range of the measurement range 514 adjusted by the user is displayed in the determination value condition display area 598.

As described above, in the detailed result screen 500 according to the present embodiment, an optimum measurement range 514 can be easily determined since the measurement range 514 or the determination condition can be visually adjusted in association with the position of the region extracted as having the highest degree of similarity (correlation value) with the model MDL registered in advance. The measurement range 514 is adjusted in the present embodiment, but the search range 512 may be adjusted through a similar operation method.

The detailed result screen 500 includes an area 582 for displaying information related to the result being displayed, an area 584 for performing display and change of the mark displayed in the coordinate distribution diagram, a button 585 for saving the false detection image, a pull-down menu 586, a numerical box 588, a numerical box 590, a button 592 for performing a drawing setting of the coordinate distribution diagram, a button 594 for performing a display setting, and a button 573 for numerically displaying the value of each item of the measurement result. These are similar to the corresponding items displayed in the detailed result screen 400C shown in FIGS. 17 to 19, and thus the detailed description thereof will not be repeated. The image data used in the trial is preview displayed at the lower level 571 of the detailed result screen 500, similar to the detailed result screen 400C shown in FIGS. 17 to 19.

<I. Input Method of Expected Result>

A configuration of providing an attribute of the expected result to the folder name in which the image data is stored has been illustrated as an input method of the expected result corresponding to the image data, but other configurations described below may be adopted.

(1. Configuration Using File Name of Image Data)

The expected result can be provided by embedding a character indicating the expected result to one part of the file name of the image data. For instance, the file name of "OK_xxx.jpg" is given for the non-defective article image, and the file name "NG_xxx.jpg" is given for the defective article image to identify the respective images. Through the use of such a method, the expected result can be individually input for the image data. When having the coordinate position or the measurement value such as the width as the expected result, such an expected result can be input with a similar method.

(2. Configuration Using Header Portion of Image File)

The expected result can be provided by embedding a character indicating the expected result to the header portion of the image data. For instance, since the header portion is provided according to the Exif standard in the jpeg format, the type of expected result (OK or NG), as well as, numerical values, conditions, and the like indicating the expected result can be stored at the relevant portion. More specifically, a flag indicating a non-defective article/defective article is stored for the type of expected result, and numerical value sand units are stored for the actual dimension such as the width.

(3. Configuration Using Definition File)

The expected result can be input by preparing a definition file described with the expected result of each data apart from the image data. The type of expected result (OK or NG), as well as, numerical values, conditions, and the like indicating the expected result are described in the definition file in correspondence to the identification information such as the file name of each image data. When such a definition file is used, a plurality of expected results can be defined on one piece of image data. For instance, considering a case in which the search process of the character string "ABC" and the search process of the character string "DEF" are continuously executed on the same image data, the image data including the character string "ABC" is a non-defective article image for the search process of the character string "ABC" but a defective article image for the search process of the character string "DEF". Therefore, when a plurality of measurement processes and determination processes are executed on the same image data, the expected result needs to be provided by being segmented for every processing item, where use of the definition file in such a case is effective.

(4. Configuration for User to Individually/Collectively Set)

When inputting the expected result of non-defective article/defective article to the image data, this input may be carried out at the time of selection of the image data on the assisting device 100. In other words, the user selects whether the selected file/folder is a non-defective article or a defective article at the time of selection of the target image data. Here, the expected result is individually provided if selected in units of files, and the expected result is collectively provided if selected in units of folders.

<J. Control Structure>

Figure 24:
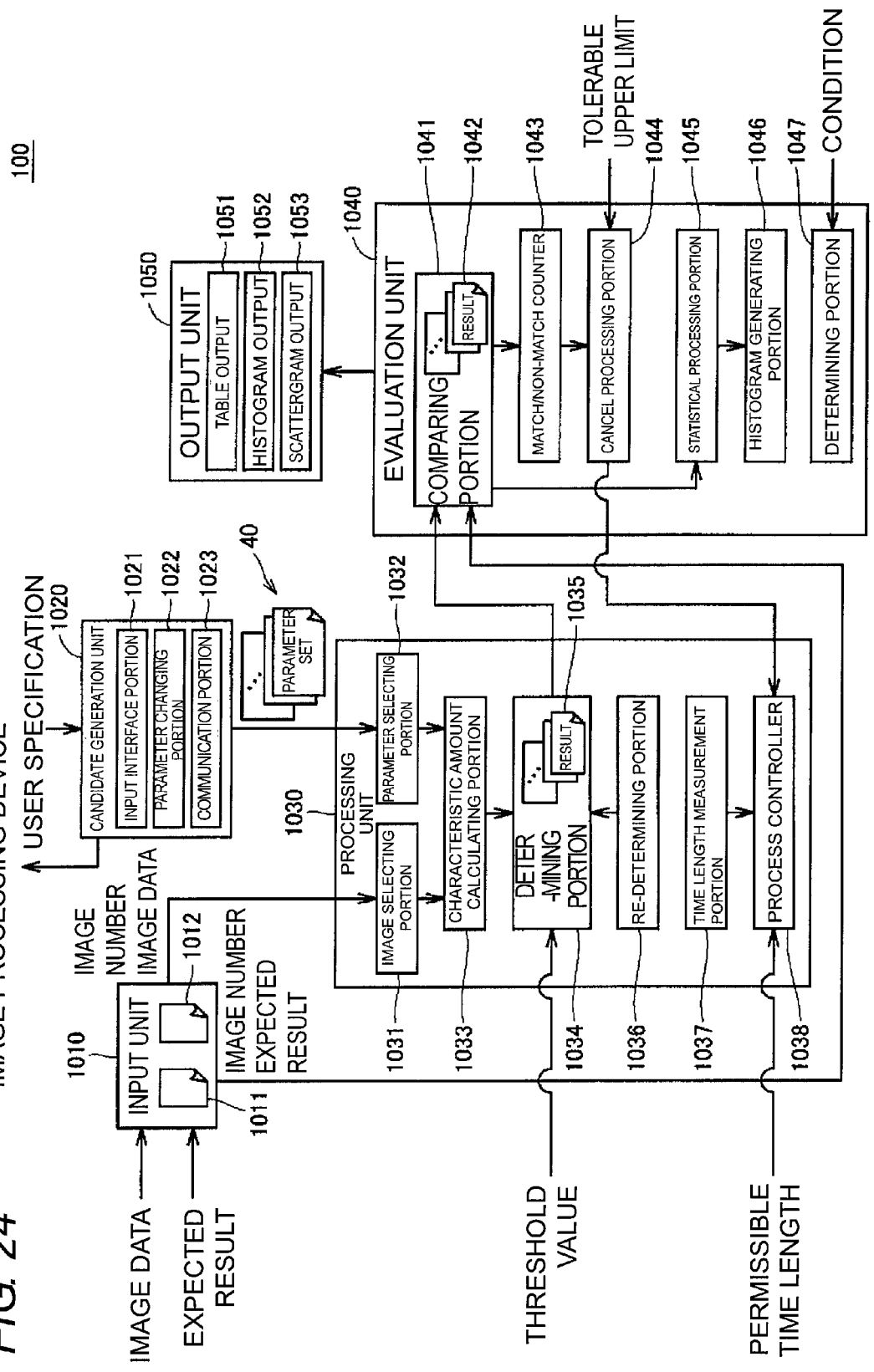
FIG. 24 is a functional block diagram showing a control structure of the parameter determination assisting device according to the embodiment of the present invention.

FIG. 24 is a functional block diagram showing a control structure of the assisting device 100 according to the embodiment of the present invention. The control structure shown in FIG. 24 is typically provided when the CPU 105 of the assisting device 100 executes the program. FIGS. 25A to 25D are diagrams showing a structure of a file generated in the assisting device 100 shown in FIG. 24.

With reference to FIG. 24, the assisting device 100 according to the present embodiment includes for its control structure, an input unit 1010, a candidate generation unit 1020, a processing unit 1030, an evaluation unit 1040, and an output unit 1050.

The input unit 1010 accepts the specification of the target image and the expected result corresponding to the respective image data from the user. The input unit 1010 may copy the specified image data in itself, but acquires the target image data, as necessary, and outputs the entity data to the processing unit 1030 if access can be made to the specified image data. More specifically, the input unit 1010 generates an image list 1011 in which the target image data and the image number used internally are corresponding based on the specification of the image data, and generates an expected result list 1012 in which the image number and the expected result on the corresponding image data are corresponding. As shown in FIG. 25A, the image list 1011 is described with the position where the target image data exists and the file name in correspondence with the image number. As shown in FIG. 25B, the expected result list 1012 is described with the expected result (in this example, non-defective article (OK) or defective article (NG)) in correspondence with the image number.

The candidate generation unit 1020 generates the parameter candidates 40 including a plurality of parameter sets in which at least one parameter value contained in a set of parameters is differed from each other in response to the specification of the user. More specifically, the candidate generation unit 1020 includes an input interface portion 1021, a parameter changing portion 1022, and a communication portion 1023. The input interface portion 1021 displays a dialogue 420 for inputting a condition for generating a parameter candidate to adjust the parameter, as shown in FIG. 12, according to the user operation. The input interface portion 1021 also outputs the content specified by the user for the dialogue 420 to the parameter changing portion 1022. In other words, the input interface portion 1021 accepts the specification of at least one of the fluctuation step and the fluctuation range of the parameter. The parameter changing portion 1022 generates a plurality of parameter candidates according to the item specified by the user and the fluctuation step and/or fluctuation range of the parameter. More specifically, the parameter candidates are sequentially generated by sequentially changing the parameter value of the specified item on the value of the current parameter set by the specified fluctuation step. Such parameter candidates are output to the processing unit 1030.

The communication portion 1023 is configured to be data communicable with the image processing device 200, and acquires the processing item, the value of each parameter, and the like set in the image processing device 200 according to the user operation. The communication portion 1023 can also transfer the parameter set determined in the assisting device 100 to the image processing device 200.

The processing unit 1030 generates a plurality of processing results by performing image processing on the specified image data according to a plurality of parameter candidates. More specifically, the processing unit 1030 includes an image selecting portion 1031, a parameter selecting portion 1032, a characteristic amount calculating portion 1033, a determining portion 1034, a re-determining portion 1036, a time length measurement portion 1037, and a process controller 1038.

The process of each portion in the processing unit 1030 is controlled by the process controller 1038. In other words, when a plurality of image data and the characteristic amount corresponding thereto are input to the input unit, the process controller 1038 appropriately controls the image selecting portion 1031 and the parameter selecting portion 1032 to sequentially output the processing result on each of the plurality of image data for each of the plurality of parameter candidates.

The image selecting portion 1031 sequentially selects the target image from the input unit 1010 according to a command from the process controller 1038, and outputs the same to the characteristic amount calculating portion 1033. The parameter selecting portion 1032 also sequentially selects the target parameter candidate from the candidate generation unit 1020 according to a command from the process controller 1038, and outputs the same to the characteristic amount calculating portion 1033.

The characteristic amount calculating portion 1033 performs image processing according to the parameter candidate selected by the parameter selecting portion 1032 on the image data selected by the image selecting portion 1031 to calculate the characteristic amount on the target image data. The characteristic amount calculating portion 1033 outputs the calculated characteristic amount to the determining portion 1034.

The determining portion 1034 compares the characteristic amount calculated in the characteristic amount calculating portion 1033 with a threshold value defined in advance to generate a processing result on the target image data. Typically, the determining portion 1034 judges that the image data matches the model image if the correlation value, which indicates the extent the image data is similar to the model image, is greater than or equal to the threshold value. The determining portion 1034 generates a determination result list 1035 showing the determination result together with the characteristic amount calculated in the characteristic amount calculating portion 1033. As shown in FIG. 25C, the determination result list 1035 is described with the characteristic amount and the determination result (in this example, OK or NG) of the target image in correspondence with the image number. The determination result list 1035 is generated for every trial-executed parameter candidate.

The re-determining portion 1036 accepts change of the threshold value when the threshold value (indication line 478A and indication line 478B) is changed in the detailed result screen 400C shown in FIGS. 17 to 19. The re-determining portion 1036 compares the characteristic amount on the image data already calculated by the characteristic amount calculating portion 1033 with the changed threshold value to re-generate the determination result. The updated determination result is reflected on the determination result list 1035. As hereinafter described, the display of the detailed result screen 400C is updated based on the content of the determination result list 1035.

The time length measurement portion 1037 measures the time length required for the process in the characteristic amount calculating portion 1033 for each parameter candidate. In other words, the time length measurement portion 1037 measures the processing time length required to generate the processing result of one piece of image data at a certain parameter candidate. The processing time length measured in the time length measurement portion 137 is displayed in the maximum measurement time length field 462 and the like of the evaluation result screen 400B shown in FIG. 16. The time length measurement portion 1037 also outputs the measured processing time length to the process controller 1038.

The process controller 1038 gives a command to the image selecting portion 1031 and the parameter selecting portion 1032 according to the execution of trial on the parameter candidate. When accepting the permissible time length specified by the user, and the processing time length exceeding the permissible time length is measured by the time length measurement portion 1037 during the generation of the processing result on the image data for any parameter candidate, the process controller 1038 cancels the generation of the processing result on the remaining image data for the relevant parameter candidate. The permissible time length is set according to the tact time and the like of the production line where the target image processing device is arranged. In other words, even with the parameter candidates capable of performing stable image processing, the parameter candidate for which processing time length is too long cannot be applied to the actual production line and thus further evaluation does not need to be performed. Therefore, the time length required for the entire trial can be reduced by canceling the trial on the parameter candidate that is clearly inappropriate based on the request of the application destination.

The evaluation unit 1040 then generates an evaluation result for each of the plurality of processing results by comparing each of the plurality of processing results with the corresponding expected result. More specifically, the evaluation unit 1040 includes a comparing portion 1041, a match/non-match counter 1043, a cancel processing portion 1044, a statistical processing portion 1045, a histogram generating portion 1046, and a determining portion 1047.

The comparing portion 1041 compares the expected result on each image data acquired from the input unit 1010 with the determination result generated by the determining portion 1034, and evaluates whether or not the contents match. More specifically, the comparing portion 1041 generates an evaluation result list 1042 showing the evaluation result in correspondence with the image number. As shown in FIG. 25D, the evaluation result list 1042 is described with a correspondence relationship of the determination result and the expected result of the target image data in correspondence with the image number. A description example includes "OK-OK" indicating that the evaluation result on the image data given the expected result of non-defective article (OK) is non-defective article (OK), and "OK-NG" indicating that the evaluation result on the image data given the expected result of non-defective article (OK) is a defective article (NG). Only either match or non-match may be described, but if the contents do not match, that is, when erroneous determination occurs, the details thereof cannot be analyzed and thus the type thereof is preferably recorded. The evaluation result list 1042 is generated for every parameter candidate for which trial has been executed.

The match/non-match counter 1043 calculates the degree of coincidence with the corresponding expected result for the evaluation result contained in a plurality of evaluation result list 1042 generated by the comparing portion 1041. More specifically, the match/non-match counter 1043 counts the number of evaluation results that do not match the corresponding expected result (falsely detected) of the evaluation results contained in the evaluation result list 1042. The number of times the image data of "non-defective article" (OK) is erroneously determined as "defective article" (NG) and the number of times the image data of "defective article" (NG) is erroneously determined as "non-defective article" (OK) are preferably counted in a distinguished manner.

When accepting the tolerable upper limit specified by the user, and the number of processing results that do not match the corresponding expected result exceeds the specified tolerable upper limit during the generation of the processing result on the image data for any parameter candidate, the cancel processing portion 1044 cancels the generation of the processing result on the remaining image data for the relevant parameter candidate. The tolerable upper limit is set according to the stability and the like required on the target image processing device. In other words, since judgment can be made as a parameter candidate that cannot perform a stable image processing when the number of false detections exceeds the tolerable upper limit, further evaluation does not need to be performed. Therefore, the time length required for the entire trial can be reduced by canceling the trial on the parameter candidate that is clearly inappropriate based on the request of the application destination. The cancel processing portion 1044 gives a cancel instruction to the process controller 1038 of the processing unit 1030.

The statistical processing portion 1045 calculates a statistical output for the evaluation result calculated in the processing unit 1030. More specifically, the statistical processing portion 1045 calculates the statistic value (e.g., average value, intermediate value, maximum value, minimum value, variance value, standard deviation, etc.) of the correlation value contained in the determination result list 1035 calculated by the characteristic amount calculating portion 1033 for every parameter candidate.

The histogram generating portion 1046 generates data of the histogram (frequency distribution), in which the characteristic amount is segmented into zones defined in advance based on the statistic value calculated by the statistical processing portion 1045, for every parameter candidate.

The determining portion 1047 determines the most appropriate parameter candidate out of the parameter candidates generated by the candidate generation unit 1020 according to the condition specified by the user. More specifically, the determining portion 1047 accepts the condition to be satisfied by the evaluation result, and determines the processing result that is most adapted to the specified condition out of the processing results generated by performing the process according to each of the plurality of parameter candidates. The process of the determining portion 1047 will be described later.

The output unit 1050 outputs the evaluation result generated by the evaluation unit 1040 for each of a plurality of parameter candidates. More specifically, the output unit 1050 is prepared with various types of output modes, examples of which are table output function (FIG. 16), histogram output function (FIGS. 17 to 19), and scattergram output function (FIGS. 17 to 19). Such output modes are appropriately switched according to the user operation. The output unit 1050 outputs the degree of coincidence with the corresponding expected result on the evaluation result calculated by the match/non-match counter 1043 and the number of processing results that do not match the corresponding expected result for the table output function. The output unit 1050 also outputs the measured processing time length together with the evaluation result for the table output function.

The output unit 1050 outputs the processing result contained in the processing result group so as to be comparable for each of the corresponding image data for the scattergram output function. In other words, the output unit 1050 outputs the distribution of the characteristic amount (correlation value) on the processing result with the target image data on either axis for a certain parameter candidate. In this case, the output unit 1050 outputs the processing result based on each characteristic amount in a different display mode according to the match/non-match with the corresponding expected result in the output scattergram. The output unit 1050 also outputs the threshold value (threshold range) given to the determining portion 1034 in correspondence with the scattergram. In the scattergram, the user can change the threshold value (threshold range), where when the determination result is re-generated by the re-determining portion 1036 in response to the change of the threshold value, such a re-generated determination result is reflected on the scattergram.

The output unit 1050 may further output the parameter candidate in which the characteristic amount (correlation value) contained in the corresponding processing result group is relatively high of the plurality of parameter candidates in a mode different from other parameter candidates for the table output function. In other words, the parameter candidate having the highest average value of the correlation value is preferably output so as to stand out by displaying in red, flash displaying, and the like. This is to urge the user to preferentially select such a parameter candidate since a high characteristic amount (correlation value) means that the characteristics of the image data can be satisfactorily extracted by image processing according to the relevant parameter candidate.

<K. Condition Specification>

One example of an input interface of the condition for the determining portion 1047 (FIG. 24) of the evaluation unit 1040 to select the most appropriate parameter candidate out of the parameter candidates will be described with reference to FIG. 26.

After the setting on the parameter candidates on the dialogue 420 shown in FIG. 12, the user sets which item to prioritize in the dialogue 499 shown in FIG. 26. In the dialogue 499, a list of items to be output to the evaluation result screen 400B shown in FIG. 16 is displayed, where the user sets priority indicating whether to prioritize on the necessary items by operating the pull-down menu. In the example shown in FIG. 26, the priority "1" is set to "number of false detections: few", and the priority "2" is set to "maximum measurement time length: short".

When the condition shown in FIG. 26 is set, the determining portion 1047 searches for the parameter candidate with the fewest number of false detections with reference to the evaluation result for every generated parameter candidate. If narrowed to one as a result of the search, the relevant parameter candidate is determined as the optimum parameter set. If not narrowed to one with only the condition on the number of false detections, the parameter candidate having the shortest maximum measurement time length among the parameter candidates is extracted as the optimum parameter set.

The method of setting conditions by the user may adopt various methods other than the method by user interface shown in FIG. 26.

<L. Processing Procedure>

Figure 27:
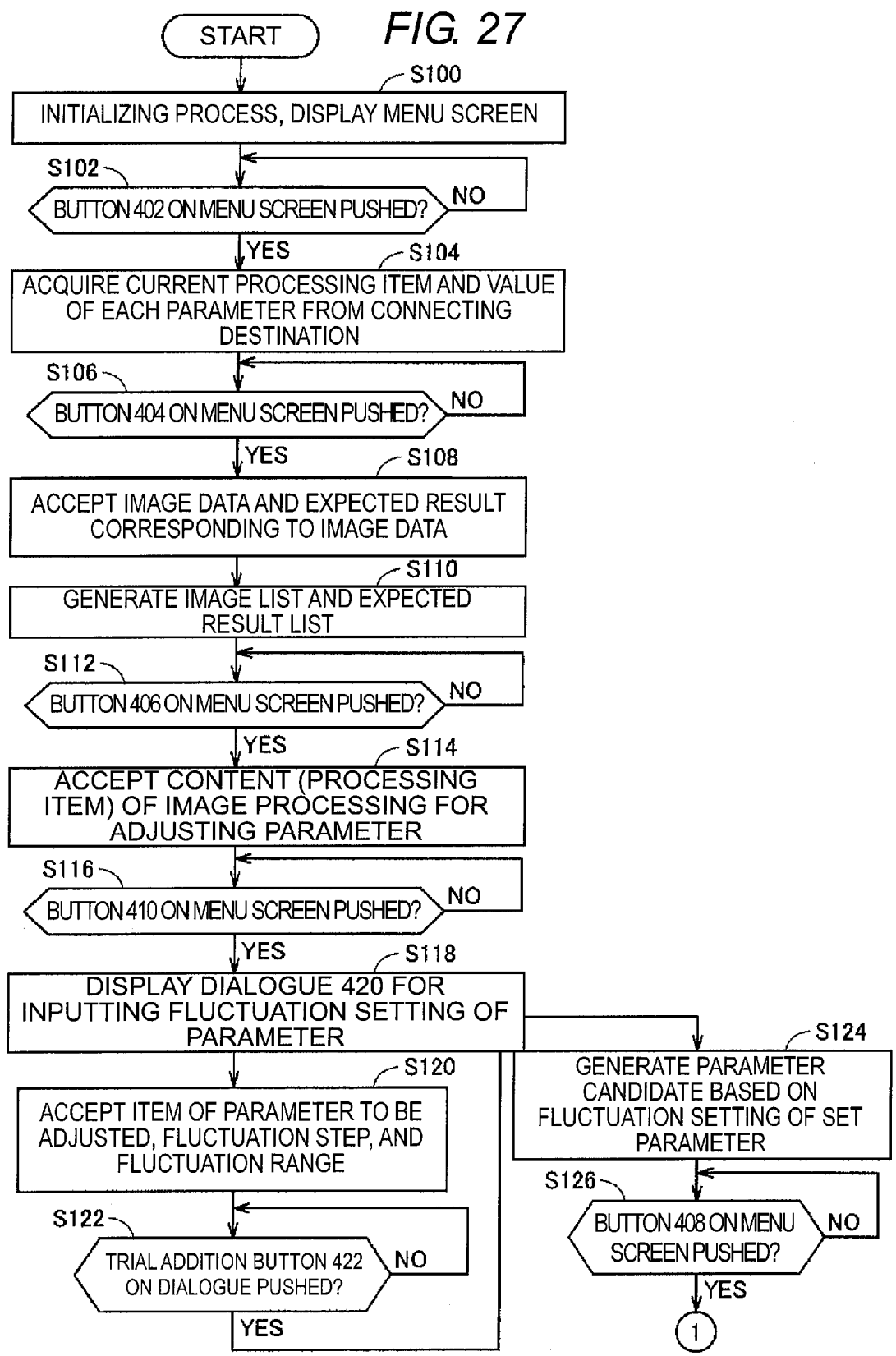
FIG. 27 is a flowchart (I) showing an overall process in the parameter determination assisting device according to the embodiment of the present invention.
Figure 28:
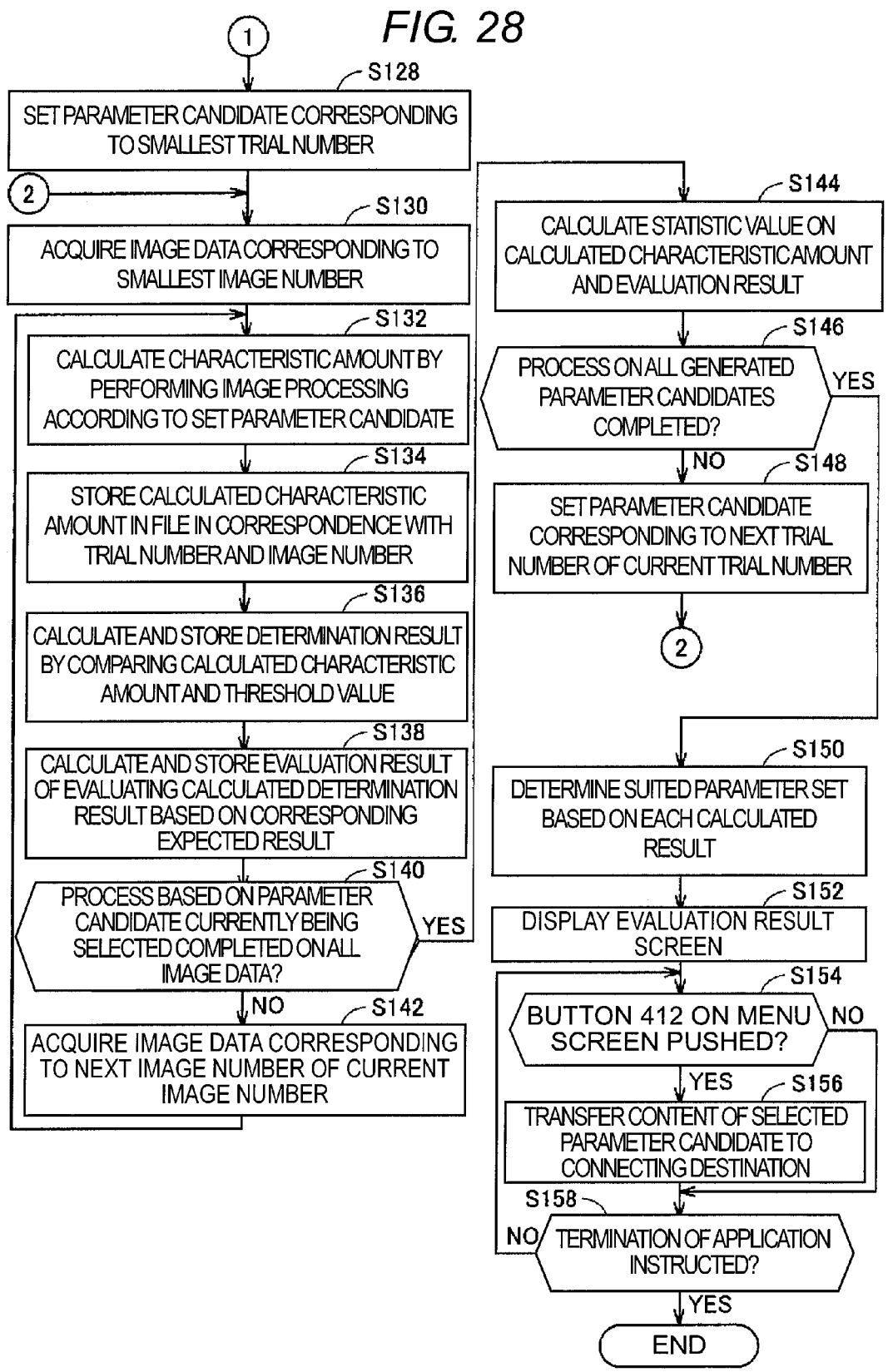
FIG. 28 is a flowchart (II) showing an overall process in the parameter determination assisting device according to the embodiment of the present invention.

FIGS. 27 and 28 are flowcharts showing the overall process in the assisting device 100 according to the embodiment of the present invention. The flowcharts shown in FIGS. 27 and 28 are implemented when the CPU 105 reads out a program stored in advance in the fixed disk 107 and the like to the memory 106, and executes the program.

With reference to FIGS. 27 and 28, the CPU 105 displays a menu screen (FIG. 10) on the monitor 102 after the execution of the initializing process (step S100). The CPU 105 then judges whether or not the button 402 on the menu screen is pushed (step S102). If the button 402 is pushed (YES in step S102), the CPU 105 acquires the current processing item, the value of each parameter and the like from the image processing device 200 of the connecting destination (or simulator functioning as a virtual image processing device) (step S104). Thereafter, the process proceeds to step S106. If the button 402 is not pushed (NO in step S102), the process of step S102 is repeated.

The CPU then judges whether or not the button 404 on the menu screen is pushed (step S106). If the button 404 is pushed (YES in step S106), the CPU 105 displays a dialogue 414 and the like on the monitor 102, and accepts the target image and the expected result corresponding to the image data (step S108). The CPU 105 generates an image list in which the target image data and the image number used internally are corresponding based on the specification of the image data, and generates an expected result list in which the image number and the expected result on the corresponding image data are corresponding (step S110). The process then proceeds to step S112. If the button 404 is not pushed (NO in step S106), the process of step S106 is repeated.

The CPU 105 then judges whether or not the button 406 on the menu screen is pushed (step S112). If the button 406 is pushed (YES in step S112), the CPU 105 displays a dialogue and the like on the monitor 102, and accepts the content (processing item) of the image processing for adjusting the parameter (step S114). The process then proceeds to step S116. If the button 406 is not pushed (NO in step S112), the process of step S112 is repeated.

The CPU 105 then judges whether or not the button 410 on the menu screen is pushed (step S116). If the button 410 is pushed (YES in step S116), the CPU 105 displays a dialogue 420 for inputting the fluctuation setting of the parameter on the monitor 102 based on the content (processing item) of the selected image processing (step S118). The CPU 105 accepts the item of the parameter to be adjusted, and the fluctuation step and the fluctuation range thereof, which are input to the dialogue 420 (step S120). Then, the CPU 105 judges whether or not the trial addition button 422 on the dialogue is pushed (step S122). If the trial addition button 422 is pushed (YES in step S122), the CPU 105 generates parameter candidates based on the fluctuation setting of the set parameter (step S124). In this case, the CPU 105 assigns a trial number to the generated parameter. The process then proceeds to step S126. If the trial addition button 422 is not pushed (NO in step S122), the process of step S122 is repeated. The CPU 105 closes the dialogue 420 when the close button 424 on the dialogue 420 is pushed.

The CPU 105 then judges whether or not the button 408 on the menu screen is pushed (step S126). If the button 408 is not pushed (NO in step S126), the process of step S126 is repeated.

If the button 408 is pushed (YES in step S126), the CPU 105 starts the trial, which is the evaluation of the value on each parameter candidate. Specifically, the CPU 105 sets the parameter candidate corresponding to the smallest trial number (trial number [0]) (step S128). The CPU 105 acquires the image data corresponding to the smallest image number (trial number [0]) (step S130). The CPU 105 calculates the characteristic amount by performing image processing on the acquired image data according to the set parameter candidate (step S132). Thereafter, the CPU 105 stores the calculated characteristic amount in the file in correspondence with the trial number and the image number (step S134). The CPU 105 then compares the calculated characteristic amount with the threshold value set in advance, calculates the determination result on the target image data and stores the same in the file (step S136), and furthermore, calculates the evaluation result of evaluating the calculated determination result based on the expected result corresponding to the target image data, and stores the same in the file (step S138).

Thereafter, the CPU 105 judges whether or not the process based on the parameter candidate currently being selected is completed on all image data (step S140). If not completed on all image data (NO in step S140), the CPU 105 acquires the image data corresponding to the next image number of the current image number (step S142). The processes after step S132 are then repeated.

If completed on all image data (YES in step S140), the CPU 105 calculates the statistic value on the characteristic amount calculated for the current trial number and the evaluation result (step S144). The CPU 105 then judges whether or not the processes on all the generated parameter candidates is completed (step S146). If there is a generated parameter candidate on which the process is not completed (NO in step S146), the parameter candidate corresponding to the next trial number of the current trial number is set (step S148). The processes after step S130 are repeated.

If the process on the generated parameter candidate is completed (YES in step S146), the CPU 105 determines the suited parameter set based on each result calculated in advance (step S150). The CPU 105 then displays the evaluation result screen shown in FIG. 16 on the monitor 102 (step S152).

The CPU 105 judges whether or not the button 412 on the menu screen is pushed (step S154). If the button 412 is pushed (YES in step S154), the CPU 105 transfers the content of the selected parameter candidate to the image processing device 200 of the connecting destination (or simulator functioning as a virtual image processing device) (step S156). If the button 412 is not pushed (NO in step S154), the CPU 105 judges whether or not termination of the application is instructed (step S158). If the termination is instructed (YES in step S158), the CPU 105 terminates the process. If the termination is not instructed (NO in step S158), the process of step S154 is repeated.

<M. First Variant>

In the flowchart showing the overall process in the assisting device 100 according to the embodiment described above, the procedure of sequentially executing the process on the target image data after setting the respective parameter candidates has been described, but the process may be executed on each parameter candidate after reading out the target image data beforehand. This method is effective in an environment where time is required for reading out and transferring the image data, and when performing the evaluation of the parameter candidates in parallel while generating new image data by imaging the work flowing the production line.

Figure 29:
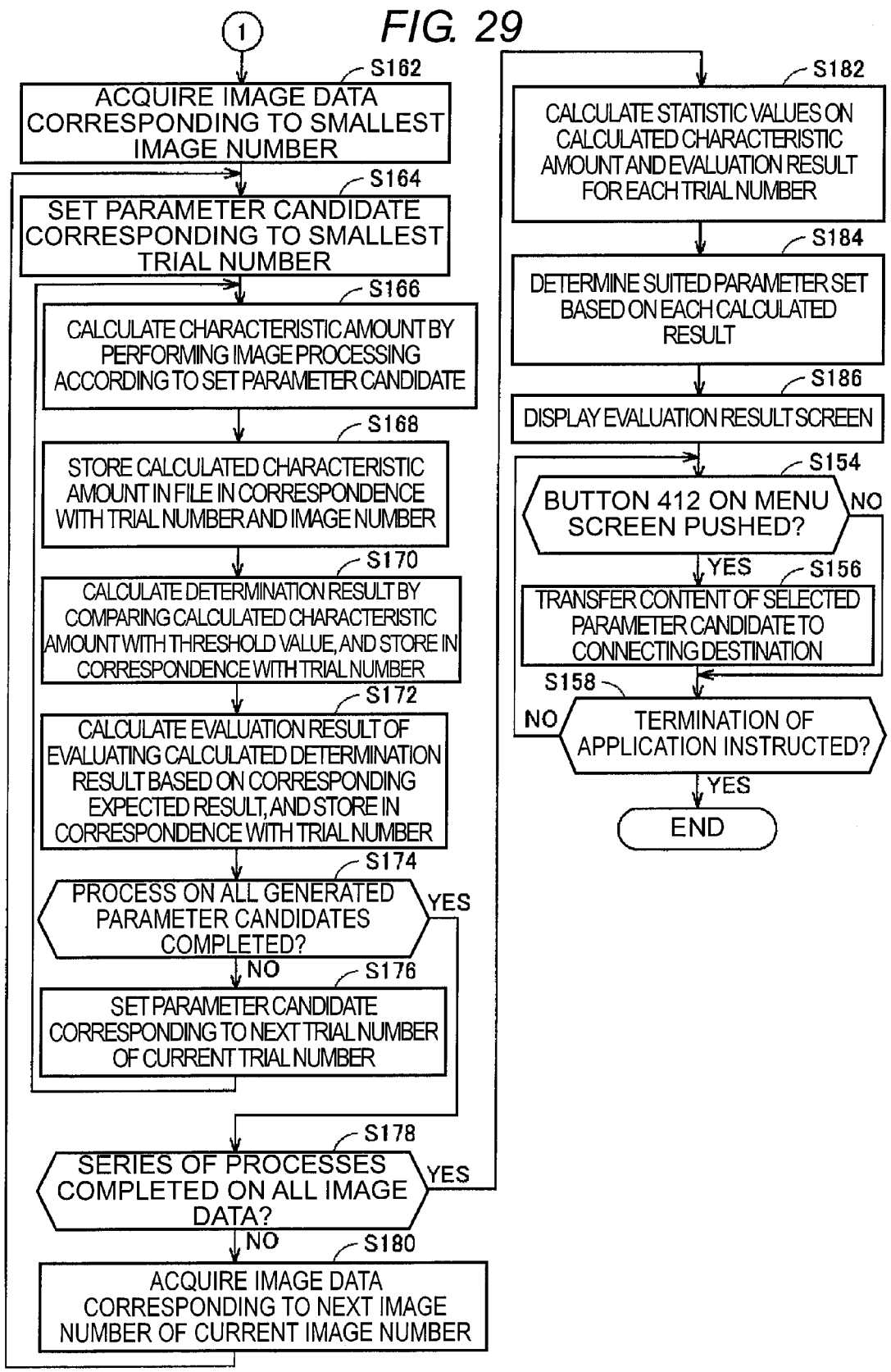
FIG. 29 is a flowchart showing an overall process in the parameter determination assisting device according to a first variant of the embodiment of the present invention.

The first half of the overall process according to the first variant is similar to the flowchart shown in FIG. 27, but the second half is the processing procedure shown in the flowchart of FIG. 29. The description on the content shown in FIG. 27 is not repeated.

With reference to FIG. 29, if the button 408 on the menu screen is pushed (YES in step S126), the CPU 105 starts the trial, which is the evaluation of the value on each parameter candidate. Specifically, the CPU 105 acquires the image data corresponding to the smallest image number (trial number [0]) (step S162). The CPU 105 sets the parameter candidate corresponding to the smallest trial number (trial number [0]) (step S164).

The CPU 105 calculates the characteristic amount by performing image processing on the acquired image data according to the set parameter candidate (step S166). Thereafter, the CPU 105 stores the calculated characteristic amount in the file in correspondence with the trial number and the image number (step S168). The CPU 105 then compares the calculated characteristic amount with the threshold value set in advance, calculates the determination result on the target image data and stores the same in the file in correspondence with the trial number (step S170), and furthermore, calculates the evaluation result of evaluating the calculated determination result based on the expected result corresponding to the target image data, and stores the same in the file in correspondence with the trial number (step S172).

Thereafter, the CPU 105 judges whether or not the process on all generated parameter candidates is completed (step S174). If there is a generated parameter candidate on which the process is not completed (NO in step S174), the parameter candidate corresponding to the next trial number of the current trial number is set (step S176). The processes after step S166 are repeated.

If the process on the generated parameter candidates is completed (YES in step S174), the CPU 105 judges whether or not a series of processes is completed on all image data (step S178). If a series of process is not yet completed on all image data (NO in step S178), the CPU 105 acquires the image data corresponding to the next image number of the current image number (step S180). The processes after step S164 are repeated.

If a series of processes is completed on all image data (YES in step S178), the CPU 105 calculates the statistic value on the characteristic amount calculated for the current trial number and the evaluation result (step S182). The CPU 105 then determines the suited parameter set based on each result calculated in advance (step S184). The CPU 105 then displays the evaluation result screen shown in FIG. 16 on the monitor 102 (step S186).

The CPU 105 judges whether or not the button 412 on the menu screen is pushed (step S154). If the button 412 is pushed (YES in step S154), the CPU 105 transfers the content of the selected parameter candidate to the image processing device 200 of the connecting destination (or simulator functioning as a virtual image processing device) (step S156). If the button 412 is not pushed (NO instep S154), the CPU 105 judges whether or not termination of the application is instructed (step S158). If the termination is instructed (YES in step S158), the CPU 105 terminates the process. If the termination is not instructed (NO in step S158), the process of step S154 is repeated.

<N. Second Variant>

Figure 30:
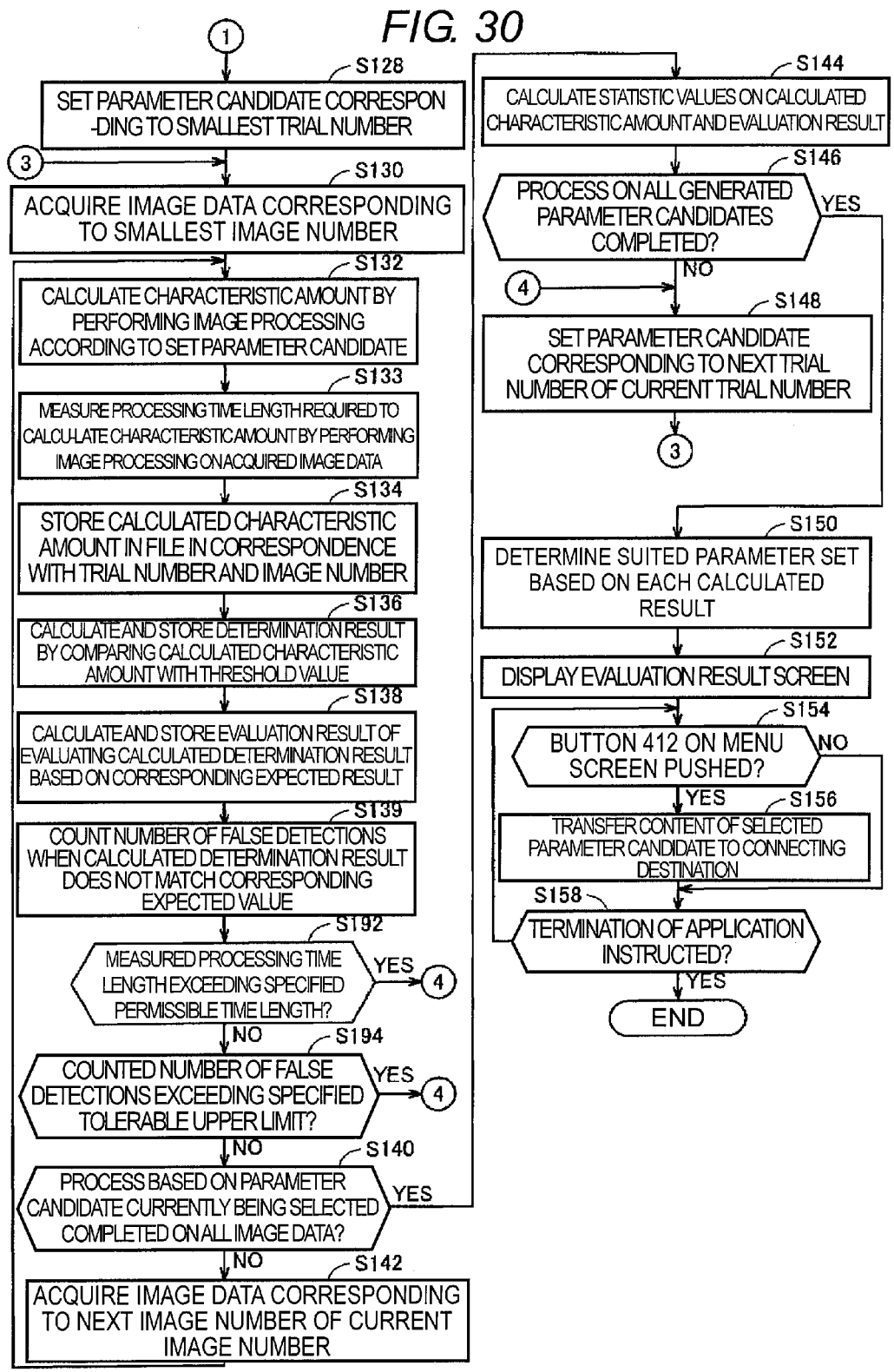
FIG. 30 is a flowchart showing an overall process in the parameter determination assisting device according to a second variant of the embodiment of the present invention.

The processing procedure of a case where the process of canceling the trial on the parameter candidate considered inappropriate according to the measurement time length and/or the number of false detections in each process is added is described in the flowchart shown in FIG. 30. In this case as well, the processing procedure of the first half is similar to the flowchart shown in FIG. 27, and thus the detailed description thereof will not be repeated.

FIG. 30 is a flowchart (second half) showing the overall process in the assisting device 100 according to a second variant of the embodiment of the present invention. The flowchart shown in FIG. 30 has the processes of steps S133, S139, S192, and S194 added to the flowchart shown in FIG. 28.

After the execution of step S132, the CPU 105 measures the processing time length required to calculate the characteristic amount by performing image processing on the acquired image data according to the set parameter candidate (step S133).

After the execution of step S138, the CPU 105 counts the number of false detections when the calculated determination result does not match the expected result corresponding to the target image data (step S139). The CPU 105 subsequently judges whether or not the processing time length measured in step S134 exceeds the specified permissible time length (step S192).

If the measured processing time length exceeds the set permissible time length (YES in step S192), the CPU 105 cancels the generation of the processing result on the remaining image data for the currently set parameter candidate. More specifically, the CPU 105 executes the process of step S148.

If the measured processing time length does not exceed the set permissible time length (NO in step S192), the CPU 105 judges whether or not the number of false detections counted in step S139 exceeds a specified tolerable upper limit (step S194).

If the counted number of false detections exceeds the specified tolerable upper limit (YES in step S194), the CPU 105 cancels the generation of the processing result on the remaining image data for the currently set parameter candidate. More specifically, the CPU 105 executes the process of step S148.

If the counted number of false detections does not exceed the specified tolerable upper limit (NO in step S194), the process proceeds to step S140.

The processes in other steps of the processes shown in FIG. 30 are similar to FIG. 27, and thus the detailed description thereof will not be repeated.

<O. Two-Stage Adjustment>

If there are many types for the parameters contained in the parameter set, which parameter to adjust may not be easily found. In such a case, a method of judging the parameter to be adjusted in rough adjustment, and then fine tuning the optimum value thereof is also effective.

In such a case, the assisting device 100 first generates a first parameter candidate group for rough adjustment including a plurality of parameter candidates. The user then judges which parameter item to adjust based on the evaluation result on the first parameter candidate group. When the judgment content is input to the assisting device 100, the assisting device 100 generates a second parameter candidate group for fine adjustment having a fluctuation step smaller than the fluctuation step between the parameter candidates contained in the first parameter candidate group. An appropriate parameter set is searched based on the evaluation result on the second parameter candidate group.

Optimization is realized by performing in two or more stages without mistaking the direction even on an enormous number of parameters.

<P. Continuous Execution Process>

The continuous execution process shown in FIG. 3C will be described below.

Figure 31:
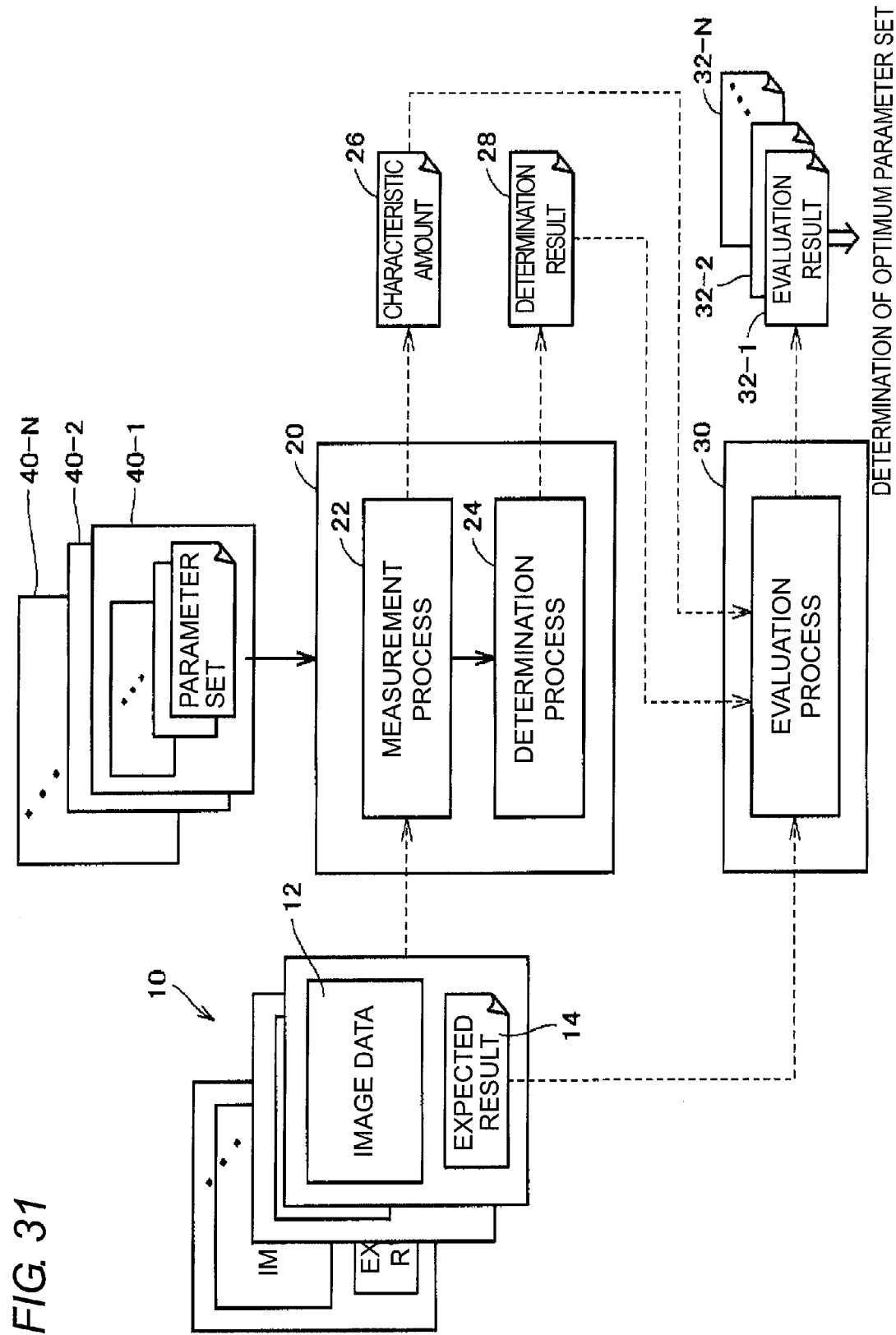
FIG. 31 is a diagram for describing an outline of the continuous execution process in the parameter determination assisting device according to the embodiment of the present invention.

FIG. 31 is a diagram for describing the outline of the continuous execution process in the parameter determination assisting device according to the embodiment of the present invention. FIG. 32 is a diagram showing one example of the user interface at the time of the continuous execution process in the parameter determination assisting device according to the embodiment of the present invention. FIG. 33 is a flowchart at the time of the continuous execution process in the parameter determination assisting device according to the embodiment of the present invention.

The outline of the process on the continuous execution process according to the present embodiment will be described first with reference to FIG. 31. As shown in FIG. 31, at the time of the continuous execution process, parameter candidates 40-1, 40-2, ..., and 40-N including a plurality of parameter sets to be evaluated are respectively set for each of the works (or image processing) to be a trial target.

More specifically, the user sequentially generates the parameter candidates on each work (or image processing) using the user interface shown in FIGS. 10 to 13. In other words, the user repeats the operations shown in FIGS. 10 to 12 at least by the number of target works. The parameter candidates set by the user are saved as a file. Thereafter, the user selects the parameter candidates (each includes a plurality of parameter sets to be the trial target) to be the targets of the continuous execution process using a continuous trial execution setting dialogue 600 as shown in FIG. 32.

The continuous trial execution setting dialogue 600 includes a box 602 where the parameter candidates that are already created are displayed in a list, and a box 606 where the parameter candidates selected as the targets of the continuous execution process are displayed in a list. In the example shown in FIG. 32, each data having an extension "bak" displayed in the box 602 corresponds to one parameter candidate including a plurality of parameter sets. The user selects a file name corresponding to the parameter candidate to be the target of the continuous execution process on the box 602, and then pushes the add button 604. The selected file (parameter candidate) is then added to the box 606.

Through the above operations, the trial process starts when the user determines the parameter candidate to be the target of the continuous execution process and then pushes an execute button 608. The process is canceled when the user pushes a cancel button 610.

Buttons 612 and 614 for changing the execution order are displayed in association with the box 606. When the user buttons the button 612 or 614 after selecting the file (parameter candidate) displayed in the box 606, the selected file moves to the upper side or the lower side in correspondence with the other files. The order of files displayed in the box 606 corresponds to the execution order of the trial, and the file displayed at higher level is executed earlier.

With reference again to FIG. 31, the image processing application 20 repeatedly executes the measurement process 22 and the determination process 24 on all the parameter candidates 40-1, 40-2, ..., and 40-N set in advance. In parallel thereto, the evaluation processing application 30 evaluates the characteristic amount 26 and/or the determination amount 28 obtained by processing the respective image data based on the expected result 14 corresponding to each image data.

Through such processes, a plurality of evaluation results 32-1, 32-2, . . . , 32-N corresponding to the plurality of parameter candidates 40-1, 40-2, . . . , and 40-N are generated. The user sequentially determines the optimum parameter set by performing the operations shown in FIGS. 16 to 19 and FIGS. 21 to 23 for each of the plurality of evaluation results 32-1, 32-2, . . . , 32-N.

A button 412 for reflecting the selected parameter candidate on the image processing device 200 and the like is selectably displayed in the input screen 400A shown in FIGS. 10 and 11. In the input screen 400A, the parameter candidate as a trial target and the image processing setting (of image processing device 200 and the like) corresponding to the parameter candidate are associated, where each value of the parameter set adjusted by the user is reflected on a corresponding specific image processing flow of the image processing device 200 by pushing the button 412. Thus, even if a plurality of image processing lows is set for a plurality of works in the same image processing device 200, the drawback in that the user mistakenly reflects the value of the parameter set for a certain work as the value of the parameter set for a different work can be avoided.

The processing procedure at the time of the continuous execution process according to the present embodiment will be described with reference to FIG. 33. The flowchart shown in FIG. 33 is implemented when the CPU 105 reads out the program stored in advance in the fixed disk 107 and the like, and executes the program.

First, the CPU 105 displays a menu screen (FIG. 10) on the monitor 102 after the execution of the initialization process (step S200). The CPU 105 then judges whether or not acquisition of image processing (image processing flow by works) set in the target image processing device 200 (or simulator functioning as virtual image processing device) is requested (step S202). If acquisition of image processing (image processing flow by works) set in the target image processing device 200 (or simulator) is requested (YES in step S202), the process proceeds to step S204. If acquisition of image processing (image processing flow by works) set in the target image processing device 200 (or simulator) is not requested (NO in step S202), the process of step S202 is repeated.

In step S204, the CPU 105 connects to the target image processing device 200 (or simulator), and acquires the set image processing (image processing flow by works). Here, the user sets the image processing (image processing flow by works) to adjust in the target image processing device 200 (or simulator). In this process, one or one of a plurality of image processing registered in advance in the image processing device 200 (or simulator) is selected and read out.

The CPU 105 then executes the processes similar to steps S102 to S124 shown in FIG. 27 (step S206). The detailed description of such processes will not be repeated. The process then proceeds to step S208.

In step S208, the CPU 105 saves data defining the parameter candidates (a plurality of parameter sets) generated by the process of step S206. In other words, one of a plurality of files having an extension of "bak" shown in FIG. 32 is generated. The process then proceeds to step S212.

The CPU 105 judges whether or not generation of a new parameter candidate is requested (step S212). In other words, the CPU 105 judges whether or not the user instructed generation of another further parameter candidate. If generation of a new parameter candidate is requested (YES in step S212), the process of step S204 is repeated. In this case, the user sets a different image processing (image processing flow by works) desired to be contained in the same continuous execution process as the image processing (image processing flow by works) set to be adjusted in advance in the target image processing device 200 (or simulator).

If generation of a new parameter candidate is not requested (NO in step S212), the process proceeds to step S214.

The CPU 105 then displays a screen (continuous trial execution setting dialogue 60 shown in FIG. 32) for selecting the parameter candidate to be the target of the continuous execution process on the monitor 102 (step S214). The CPU 105 selects the parameter candidate to be the target of the continuous execution process according to the user operation (step S216). The CPU 105 then judges whether or not the execute button 608 on the continuous trial execution setting dialogue 600 is pushed (step S218). If the execute button 608 is pushed (YES in step S218), the process proceeds to step S220. If the execute button 608 is not pushed (NO in step S218), the process of step S216 is repeated.

In step S220, the CPU 105 selects the first parameter candidate out of the parameter candidates set as the targets of the continuous execution process, and executes processes similar to steps S128 to S150 shown in FIG. 28 (step S222). The detailed description of such processes will not be repeated. Thereafter, the process proceeds to step S224.

In step S224, the CPU 105 judges whether or not trial on all parameter candidates set as the targets of the continuous execution process is completed. If the trial on all the parameter candidates set as the targets of the continuous execution process is not completed (NO in step S224), the process proceeds to step S226. If the trial on all the parameter candidates set as the targets of the continuous execution process is completed (YES instep S224), the process proceeds to step S228.

In step S226, the CPU 105 selects the next parameter candidate out of the parameter candidates set as the targets of the continuous execution process, and repeats the process of step S222.

In step S228, the CPU 105 displays the evaluation result screen (see FIG. 16) on the first parameter candidate out of the parameter candidates set as the targets of the continuous execution process on the monitor 102.

The CPU 105 then judges whether or not the button 412 on the menu screen is pushed (step S230). If the button 412 is pushed (YES in step S230), the CPU 105 transfers the content of the selected parameter candidate to the image processing device 200 (or simulator functioning as virtual image processing device) of the connecting destination (step S232). After step S232 or if the button 412 is not pushed (NO in step S230), the CPU 105 judges whether or not the display of the evaluation result on the next parameter candidate out of the parameter candidates set as the targets of the continuous execution process is instructed (step S234). If the display of the evaluation result on the next parameter candidate out of the parameter candidates set as the targets of the continuous execution process is instructed (YES in step S234), the CPU 105 displays the evaluation result screen (see FIG. 16) on the next parameter candidate out of the parameter candidates set as the targets of the continuous execution process (step S236). The process of step S230 is thereafter repeated. If the display of the evaluation result on the next parameter candidate out of the parameter candidates set as the targets of the continuous execution process is not instructed (NO in step S234), the process proceeds to step S238.

In step S238, the CPU 105 judges whether or not termination of the application is instructed. If the termination is instructed (YES in step S238), the CPU 105 terminates the process. If the termination is not instructed (NO in step S238), the process of step S230 is repeated.

<Q. Effects of Present Embodiment>

According to the embodiment of the present invention, the user can obtain a list of evaluation results on the parameter candidate obtained by combining the values of each parameter by simply setting the item of the parameter to be adjusted, the fluctuation step of the parameter, and the fluctuation range of the parameter. The user thus can easily select the optimum parameter candidate based on the evaluation results displayed in a list.

In other words, the user does not need to perform the adjustment over a long period of time at the site since the content to be adjusted merely needs to be set and other processes are automatically executed by the parameter determination assisting device. Thus, even with the parameter set including great number of parameters, the optimum value thereof can be rapidly and easily determined.

According to the embodiment of the present invention, the user can check the details of the content after the determination result on the parameter candidate is output. Furthermore, since the threshold value used for determining the result can be ex-post changed, the user may adopt a method of optimizing the parameters used in the calculation process of the characteristic amount, and then further adjusting the threshold value contained in the determination condition.

Other Embodiments

The program according to the present invention may include calling a necessary module, of the program modules provided as part of the operating system (OS) of the computer, with a predetermined array and at a predetermined timing and executing the process. In such a case, the module is not contained in the program itself, and the process is executed in cooperation with the OS. The program not including the module is also encompassed in the program of the present invention.

The program according to the present invention may be provided by being incorporated in one part of other programs. In such a case as well, the program itself does not include the module contained in other programs, and the process is executed in cooperation with other programs. The program incorporated in such other programs is also encompassed in the program of the present invention.

The program product to be provided is executed by being installed in a program storage unit such as a hard disk. The program product includes the program itself and the recording medium on which the program is stored.

Some or all of the functions implemented by the program of the present invention may be configured by dedicated hardware.

The embodiments disclosed herein are illustrative in all aspects and should not be construed as being restrictive. The scope of the invention is defined by the claims rather than by the above description, and all modifications equivalent in meaning to the claims and within the scope thereof are intended to be encompassed therein.

What is claimed is:

1. A parameter determination assisting device for an image processing device configured to obtain a processing result by performing a process using a set of parameters defined in advance on image data obtained by imaging a measuring target object, the parameter determination assisting device comprising:
an input unit configured to accept the image data and an expected result corresponding to the image data, wherein the expected results each includes an expected class indicating whether the corresponding measuring target object is a non-defective article or a defective article;
a candidate generation unit configured to generate a plurality of parameter candidates in which at least one parameter value contained in the set of parameters is different from each other, wherein at least one of the plurality of the parameter candidates is length of processing time;
an acquiring unit configured to acquire a plurality of processing results respectively using the plurality of parameter candidates on the image data according to a condition;
an evaluation unit configured to generate an evaluation result for each of the plurality of processing results by comparing each of the plurality of processing results with the corresponding expected result; and
an output unit configured to output the evaluation result for each of the plurality of parameter candidates,
wherein
the input unit is configured to accept the plurality of image data respectively acquired from a plurality of measuring target objects and the expected results respectively corresponding to the plurality of image data, and
the acquiring unit is configured to acquire a processing result group including the evaluation results on the plurality of image data for the plurality of parameter candidates respectively,
the acquiring unit includes:
a portion configured to calculate a characteristic amount on the image data by performing the process on the image data; and
a portion configured to generate the processing result by comparing the characteristic amount with a threshold value provided in advance, and
the output unit is configured to output the condition; output the evaluation result with a mark indicating a match between the processing result and the expected result in a different manner from a mark indicating a mismatch between the processing result and the expected result; and output an area for displaying the mark indicating the match between the processing result and the expected result in a different manner from another area.

2. The parameter determination assisting device according to claim 1, wherein the evaluation unit includes:
a portion configured to accept the condition to be satisfied by the evaluation result; and
a portion configured to determine a processing result most adapted to the condition out of the plurality of processing results respectively using the plurality of parameter candidates, and
the output unit configured to output the determined processing result.

3. The parameter determination assisting device according to claim 1, wherein the candidate generation unit includes:
a portion configured to accept a specification of at least one of a fluctuation step and a fluctuation range of the parameter value; and
a portion configured to generate the plurality of parameter candidates according to the specified fluctuation step and/or the fluctuation range of the parameter value.

4. The parameter determination assisting device according to claim 3, wherein the candidate generation unit is configured to accept a specification only on a specific parameter defined in advance out of the parameter values contained in the set of parameters.

5. The parameter determination assisting device according to claim 3, wherein
the image processing device is configured to provide a user interface for accepting a setting of the set of parameters on the process performed on the image data, the parameters contained in the set of parameters being displayed in a visually sectionalized manner on the user interface, and
the candidate generation unit is configured to display each of the parameters contained in the set of parameters so as to correspond to a visual section displaying the parameter in the user interface.

6. The parameter determination assisting device according to claim 1, wherein
the acquiring unit is configured to output a value indicating either the non-defective article or the defective article as the processing result,
the evaluation unit includes a portion configured to calculate a degree of coincidence with the corresponding expected class out of the plurality of processing results contained in each of the processing result group, and
the output unit is configured to output the degree of coincidence.

7. The parameter determination assisting device according to claim 6, wherein the degree of coincidence is the number of processing results that do not match the corresponding expected class out of the plurality of processing results contained in each of the processing result group.

8. The parameter determination assisting device according to claim 7, wherein, when the number of processing results that do not match the corresponding expected class exceeds a tolerable upper limit defined in advance during generation of the processing result group for one of the parameter candidates, the evaluation unit is configured to cancel generation of the processing result on the remaining image data for the parameter candidate.

9. The parameter determination assisting device according to claim 1, wherein the evaluation unit is configured to calculate a statistic value on the processing result contained in the corresponding processing result group for each of the plurality of parameter candidates.

10. The parameter determination assisting device according to claim 1, wherein the output unit is configured to output the processing result contained in the processing result group for each of the corresponding image data.

11. The parameter determination assisting device according to claim 1, wherein
the acquiring unit includes a portion configured to measure a processing time length required to generate the processing result; and
the output unit is configured to output the measured processing time length together with the evaluation result.

12. The parameter determination assisting device according to claim 11, wherein, when the processing time length exceeding a permissible time length provided in advance is measured during the process on the plurality of image data for one of the parameter candidates, the acquiring unit is configured to cancel acquisition of the processing result on the remaining image data for the parameter candidate.

13. The parameter determination assisting device according to claim 1, wherein
the processing result contains information indicating a portion that matches an image pattern defined in advance in the image data, and
the output unit is configured to display a position extracted as the portion that matches the image pattern on a two-dimensional coordinate corresponding to the image data.

14. The parameter determination assisting device according to claim 1, wherein the acquiring unit is configured to repeat the process of acquiring the processing result on each of the plurality of image data for each of the plurality of parameter candidates by the number of the plurality of parameter candidates.

15. The parameter determination assisting device according to claim 1, wherein the acquiring unit is configured to repeat the process of acquiring the processing result on each of the plurality of parameter candidates for each of the plurality of image data by the number of the plurality of image data.

16. The parameter determination assisting device according to claim 1, wherein
the candidate generation unit includes a portion configured to generate a first parameter candidate group including a plurality of parameter candidates, and a second parameter candidate group having a fluctuation step smaller than a fluctuation step between the parameter candidates contained in the first parameter candidate group, and
the acquiring unit is configured to determine a parameter value to be a fluctuation target out of the acquired processing results after acquiring the processing result on the parameter candidate contained in the first parameter candidate group, and to acquire the processing result on the parameter candidate contained in the second parameter candidate group corresponding to the determined parameter value.

17. The parameter determination assisting device according to claim 1, wherein
the input unit is configured to accept image data of a first group obtained by imaging a first measuring target object and an expected result of a first group corresponding to the image data of the first group, and image data of a second group obtained by imaging a second measuring target object and an expected result of a second group corresponding to the image data of the second group,
the candidate generation unit is configured to generate a plurality of parameter candidates of a first group in which at least one parameter value contained in a set of first parameters related to a process performed on the image data of the first group is different from each other, and to generate a plurality of parameter candidates of a second group in which at least one parameter value contained in a set of second parameters related to a process performed on the image data of the second group is different from each other,
the acquiring unit and the evaluation unit are configured to acquire a plurality of processing results of a first group using each of the plurality of parameter candidates of the first group on the image data of the first group, and to generate a first evaluation result on the plurality of processing results of the first group by comparing each of the plurality of processing results of the first group with the corresponding expected result out of the expected results of the first group; and then to acquire a plurality of processing results of a second group using the plurality of parameter candidates of the second group on the image data of the second group, and to generate a second evaluation result on the plurality of processing results of the second group by comparing each of the plurality of processing results of the second group with the corresponding expected result out of the expected results of the second group, and the output unit is configured to output at least one of the first evaluation result and the second evaluation result after the processes by the acquiring unit and the evaluation unit are completed.

18. A program determination assisting method for obtaining a processing result by performing a process using a set of parameters defined in advance on image data obtained by imaging a measuring target object, the parameter determination assisting method comprising:
accepting, at an input unit, the image data and an expected result corresponding to the image data, wherein the expected results each includes an expected class indicating whether the corresponding measuring target object is a non-defective article or a defective article;
generating, at a candidate generation unit, a plurality of parameter candidates in which at least one parameter value contained in the set of parameters is different from each other, wherein at least one of the plurality of the parameter candidates is length of processing time;
acquiring, at an acquiring unit, a plurality of processing results respectively using the plurality of parameter candidates on the image data according to a condition;
generating, at an evaluation unit, an evaluation result for each of the plurality of generated processing results by comparing each of the plurality of generated processing results with the expected result; and
outputting, from an output unit, the evaluation result for each of the plurality of parameter candidates,
wherein
the input unit is configured to accept the plurality of image data respectively acquired from a plurality of measuring target objects and the expected results respectively corresponding to the plurality of image data, and the acquiring unit is configured to acquire a processing result group including the evaluation results on the plurality of image data for the plurality of parameter candidates respectively,
the acquiring unit includes:
a portion configured to calculate a characteristic amount on the image data by performing the process on the image data; and
a portion configured to generate the processing result by comparing the characteristic amount with a threshold value provided in advance, and
the output unit is configured to output the condition; output the evaluation result with a mark indicating a match between the processing result and the expected result in a different manner from a mark indicating a mismatch between the processing result and the expected result; and output an area for displaying the mark indicating the match between the processing result and the expected result in a different manner from another area a representation of a distribution state of the characteristic amounts corresponding to the processing results contained in the processing result group on a display based on selection of output mode from more than one output modes by a user.

* * * * *